United States Patent
Cheng et al.

(10) Patent No.: US 11,651,229 B2
(45) Date of Patent: May 16, 2023

(54) METHODS AND SYSTEMS FOR FACE RECOGNITION

(71) Applicant: ZHEJIANG DAHUA TECHNOLOGY CO., LTD., Zhejiang (CN)

(72) Inventors: Fuyun Cheng, Hangzhou (CN); Jingsong Hao, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 442 days.

(21) Appl. No.: 16/879,793

(22) Filed: May 21, 2020

(65) Prior Publication Data

US 2020/0327308 A1    Oct. 15, 2020

Related U.S. Application Data

(63) Continuation of application No. PCT/CN2017/114140, filed on Nov. 30, 2017.

(30) Foreign Application Priority Data

Nov. 22, 2017  (CN) .......................... 201711174440.9
Nov. 22, 2017  (CN) .......................... 201711174490.7
Nov. 22, 2017  (CN) .......................... 201711176849.4

(51) Int. Cl.
*G06N 3/08*      (2023.01)
*G06N 3/084*     (2023.01)
(Continued)

(52) U.S. Cl.
CPC ............. *G06N 3/084* (2013.01); *G06N 3/045* (2023.01); *G06V 10/454* (2022.01);
(Continued)

(58) Field of Classification Search
CPC .... G06V 40/168; G06V 10/446; G06V 10/56; G06V 10/763; G06V 10/764;
(Continued)

(56) References Cited

U.S. PATENT DOCUMENTS 7,321,670 B2 * 1/2008 Yoon ................... G06V 40/168
                                                    382/118
10,074,028 B2 * 9/2018 Gupta ...................... G06K 9/00
(Continued)

FOREIGN PATENT DOCUMENTS

CN      104899579 A     9/2015
CN      105138993 A    12/2015
(Continued)

OTHER PUBLICATIONS

Hsu, C-C., et al., "CNN-Based Joint Clustering and Representation Learning with Feature Drift Compensation for Large-Scale Image Data", IEEE Transactions on Multimedia, 2017, published Aug. 2017.*

(Continued)

*Primary Examiner* — Xuemei G Chen
(74) *Attorney, Agent, or Firm* — Metis IP LLC

(57) ABSTRACT

Systems and methods for face recognition are provided. The systems may perform the methods to obtain a neural network comprising a first sub-neural network and a second sub-neural network; generate a plurality of preliminary feature vectors based on an image associated with a human face, the plurality of preliminary feature vectors comprising a color-based feature vector; obtain at least one input feature vector based on the plurality of preliminary feature vectors; generate a deep feature vector based on the at least one input feature vector using the first sub-neural network; and recognize the human face based on the deep feature vector.

20 Claims, 19 Drawing Sheets

(51) Int. Cl.
| | |
|---|---|
| *G06V 40/16* | (2022.01) |
| *G06N 3/045* | (2023.01) |
| *G06V 10/762* | (2022.01) |
| *G06V 10/764* | (2022.01) |
| *G06V 10/80* | (2022.01) |
| *G06V 10/82* | (2022.01) |
| *G06V 10/44* | (2022.01) |
| *G06V 10/46* | (2022.01) |
| *G06V 10/50* | (2022.01) |

(52) U.S. Cl.
CPC ............ *G06V 10/462* (2022.01); *G06V 10/50* (2022.01); *G06V 10/763* (2022.01); *G06V 10/764* (2022.01); *G06V 10/806* (2022.01); *G06V 10/82* (2022.01); *G06V 40/168* (2022.01); *G06V 40/172* (2022.01)

(58) Field of Classification Search
CPC .... G06V 10/806; G06V 10/82; G06V 10/454; G06V 10/462; G06V 10/50; G06V 40/172; G06N 3/0454; G06N 3/084; G06N 3/0481; G06K 9/6223; G06K 9/629
See application file for complete search history.

(56) References Cited

U.S. PATENT DOCUMENTS

| | | | | |
|---|---|---|---|---|
| 2014/0022997 | A1* | 1/2014 | Xue | H04W 24/10 370/328 |
| 2015/0199963 | A1* | 7/2015 | Maaninen | G10L 15/16 704/232 |
| 2015/0347820 | A1 | 12/2015 | Yin et al. | |
| 2016/0148080 | A1* | 5/2016 | Yoo | G06N 3/0454 382/118 |
| 2017/0109599 | A1* | 4/2017 | Gupta | G06F 18/00 |
| 2017/0132821 | A1* | 5/2017 | Valliani | G06V 10/764 |
| 2017/0294010 | A1* | 10/2017 | Shen | G06T 7/0002 |
| 2017/0357029 | A1* | 12/2017 | Lakshmanan | G06Q 10/04 |
| 2019/0012568 | A1* | 1/2019 | Kumar | G06V 40/161 |
| 2019/0026538 | A1* | 1/2019 | Wang | G06V 10/82 |
| 2019/0183429 | A1 | 6/2019 | Sung et al. | |

FOREIGN PATENT DOCUMENTS

| | | |
|---|---|---|
| CN | 105426860 A | 3/2016 |
| CN | 105447441 A | 3/2016 |
| CN | 106204267 A | 12/2016 |
| CN | 106339702 A | 1/2017 |
| CN | 106373397 A | 2/2017 |
| CN | 106485266 A | 3/2017 |
| CN | 106529447 A | 3/2017 |
| CN | 106599797 A | 4/2017 |
| CN | 106599883 A | 4/2017 |
| CN | 106709568 A | 5/2017 |
| CN | 106778584 A | 5/2017 |
| CN | 107153916 A | 9/2017 |
| CN | 107239583 A | 10/2017 |
| CN | 107368887 A | 11/2017 |
| WO | 2016086330 A1 | 6/2016 |

OTHER PUBLICATIONS

Tan Xiaoyang et al., Enhanced Local Texture Feature Sets for Face Recognition Under Difficult Lighting Conditions, IEEE Transactions on Image Processing, 19(6), 2010, 15 pages.
Yann Lecun et al., Gradient-Based Learning Applied to Document Recognition, Proceedings of the IEEE, 86(11), 1998, 46 pages.
Yi Sun et al., Deep Learning Face Representation from Predicting 10,000 Classes, Proceedings of the IEEE Conference on Computer Vision and Pattern Recognition, 2014, 8 pages.
Yaniv Taigman et al., DeepFace: Closing the Gap to Human-Level Performance in Face Verification, Computer Vision and Pattern Recognition (CVPR), 2014, 8 pages.
Ying Cai et al., Multiclass Classification Based on A Deep Convolutional Network for Head Pose Estimation, Frontiers of Information Technology & Electronic Engineering, 16(11): 930-939, 2015.
Timo Ojala et al., Multiresolution Gray-Scale and Rotation Invariant Texture Classification with Local Binary Patterns, IEEE Transaction on Pattern Analysis and Machine Intelligence, 24(7): 971-987, 2002.
Taskeed Jabid et al., Local Directional Pattern (LDP) for Face Recognition, IEEE International Conference on Image Processing, 17:329-330, 2010.
Cheng Fuyun, Face Recognition Based on Deep Learning, Dalian University of Technology, 2016, 61 pages.
Dong Xishuang et al., Short-Term Load Forecasting in Smart Grid: A Combined CNN and K-Means Clustering Approach, IEEE Transactions on Image Processing, 2017, 7 pages.
International Search Report in PCT/CN2017/114140 dated Aug. 28, 2018, 4 pages.
Written Opinion in PCT/CN2017/114140 dated Aug. 28, 2018, 4 pages.
First Office Action in Chinese Application No. 201711176849.4 dated Sep. 19, 2019, 24 pages.
First Office Action in Chinese Application No. 201711174490.7 dated Oct. 28, 2019, 10 pages.
Zhang, Wuming et al., Improving Heterogeneous Face Recognition with Conditional Adversarial Networks, arXiv:1709.02848v2 [csCV], 2017, 13 pages.
Simon Marc Oliu et al., Improved RGB-D-T Based Face Recognition, IET Biometrics, 5(4): 297-304, 2016.
Jiang, Xiaoyue et al., Local Feature Hierarchy for Face Recognition Across Pose and Illumination, IEEE, 2016, 5 pages.
Freitas Tiago et al., A Comparative Analysis of Deep and Shallow Features for Multimodal Face Recognition in a Novel RGB-D-1R Dateset, International Symposium on Visual Computing, Advances in Visual Computing, 2016, 12 pages.
Peng, Min et al., NIRFaceNet: A Convolutional Neural Network for Near-Infrared Face Identification, Information, 2016, 14 pages.

\* cited by examiner

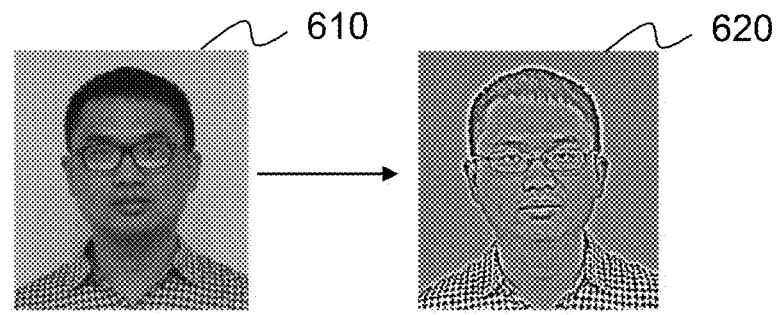
FIG. 6
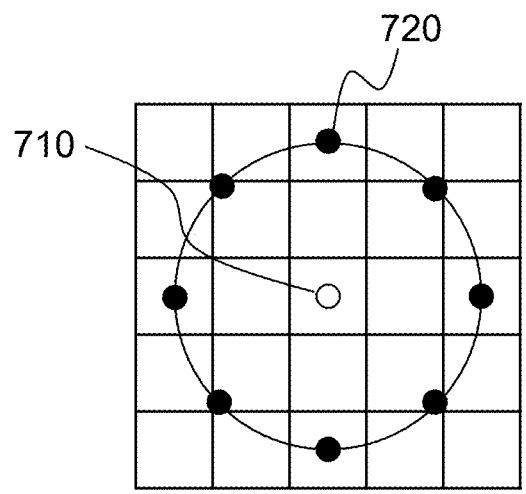
$R = 2.0, \quad N = 8$
FIG. 7-a
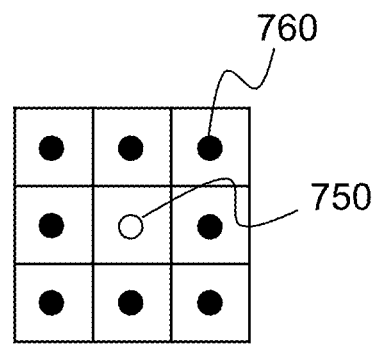
FIG. 7-b $$M_0 = \begin{bmatrix} 5 & 5 & -3 \\ 5 & 0 & -3 \\ -3 & -3 & -3 \end{bmatrix} \quad M_1 = \begin{bmatrix} 5 & 5 & 5 \\ -3 & 0 & -3 \\ -3 & -3 & -3 \end{bmatrix} \quad M_2 = \begin{bmatrix} -3 & 5 & 5 \\ -3 & 0 & 5 \\ -3 & -3 & -3 \end{bmatrix} \quad M_3 = \begin{bmatrix} -3 & -3 & 5 \\ -3 & 0 & 5 \\ -3 & -3 & 5 \end{bmatrix}$$

$$M_4 = \begin{bmatrix} -3 & -3 & -3 \\ -3 & 0 & 5 \\ -3 & 5 & 5 \end{bmatrix} \quad M_5 = \begin{bmatrix} -3 & -3 & -3 \\ -3 & 0 & -3 \\ 5 & 5 & 5 \end{bmatrix} \quad M_6 = \begin{bmatrix} -3 & -3 & -3 \\ 5 & 0 & -3 \\ 5 & 5 & -3 \end{bmatrix} \quad M_7 = \begin{bmatrix} 5 & -3 & -3 \\ 5 & 0 & -3 \\ 5 & -3 & -3 \end{bmatrix}$$

FIG. 8

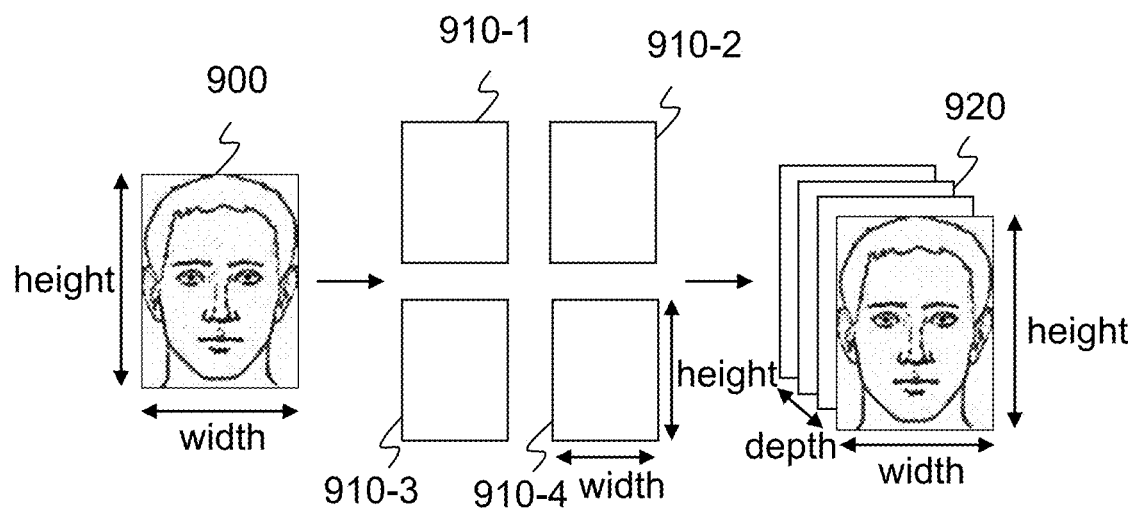
FIG. 9-a
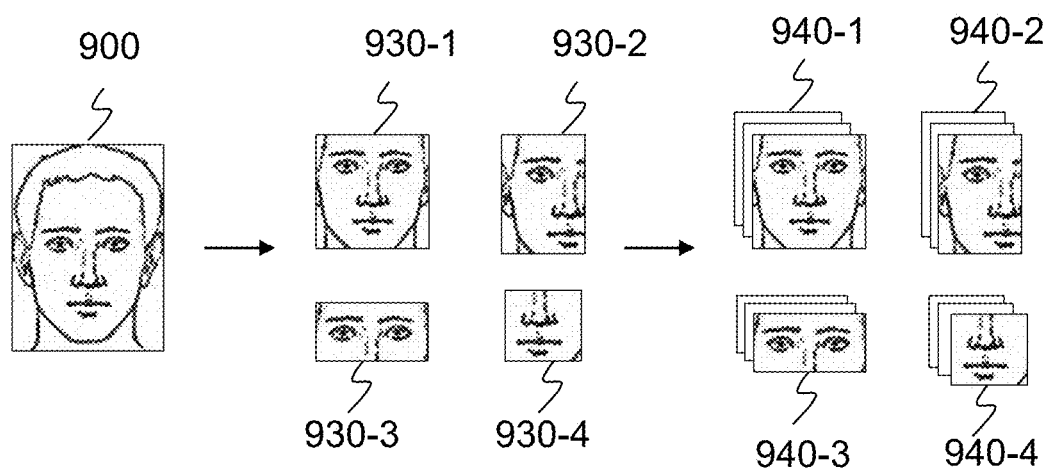
FIG. 9-b

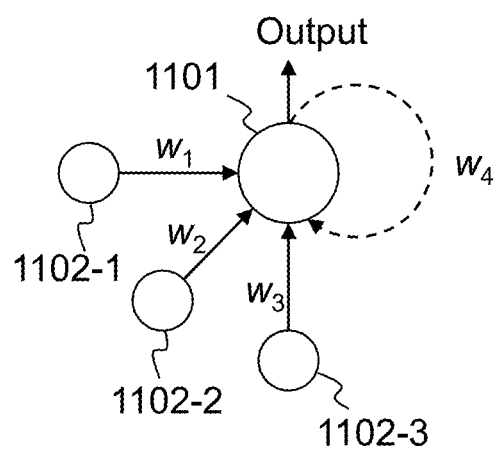
FIG. 11
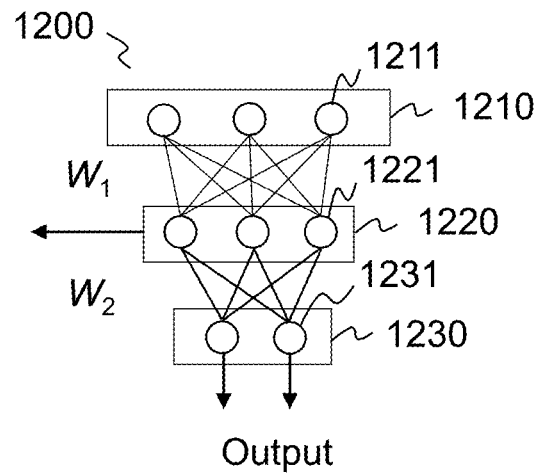
FIG. 12
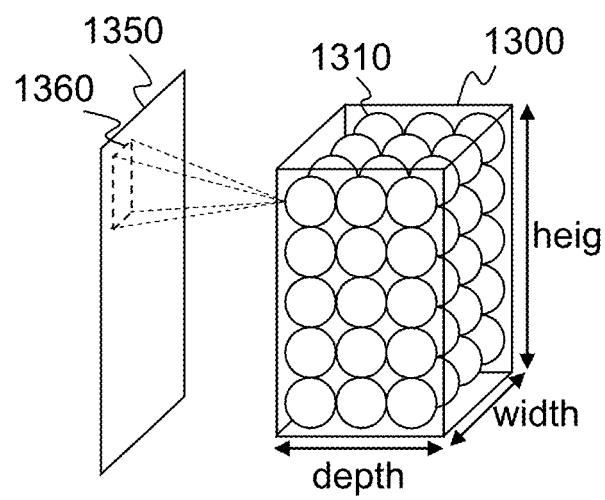
FIG. 13-a
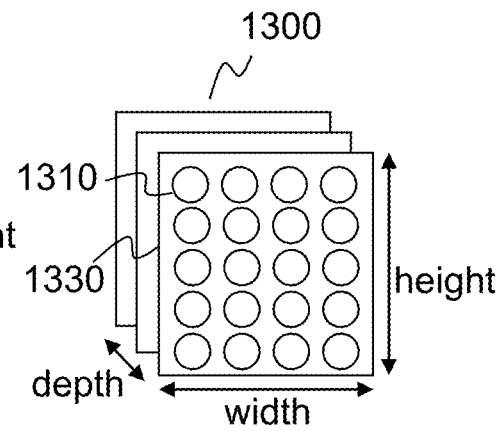
FIG. 13-b

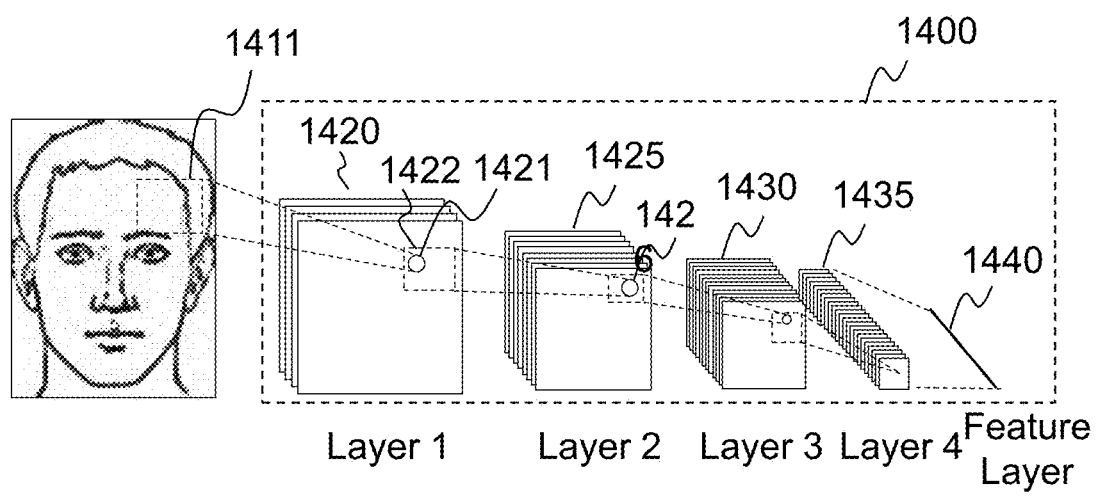
FIG. 14-a
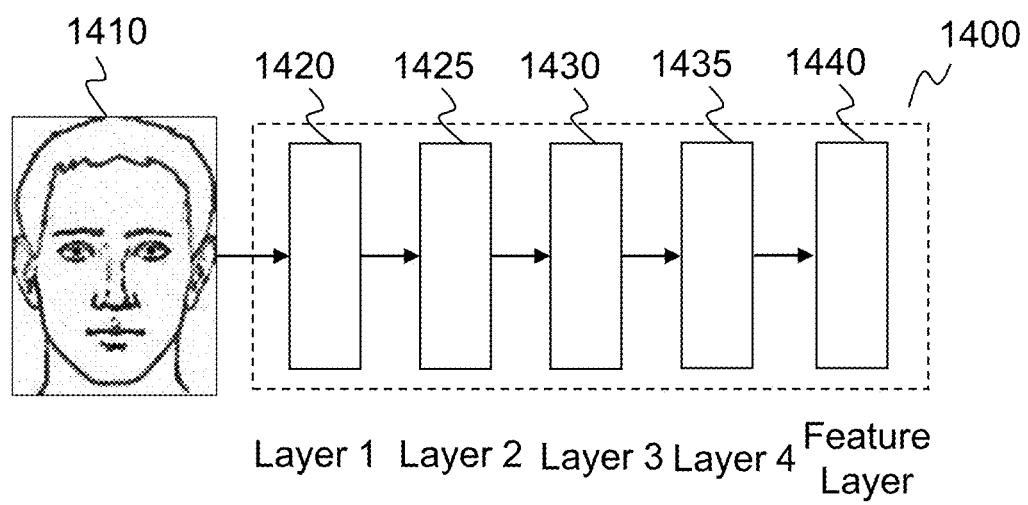
FIG. 14-b

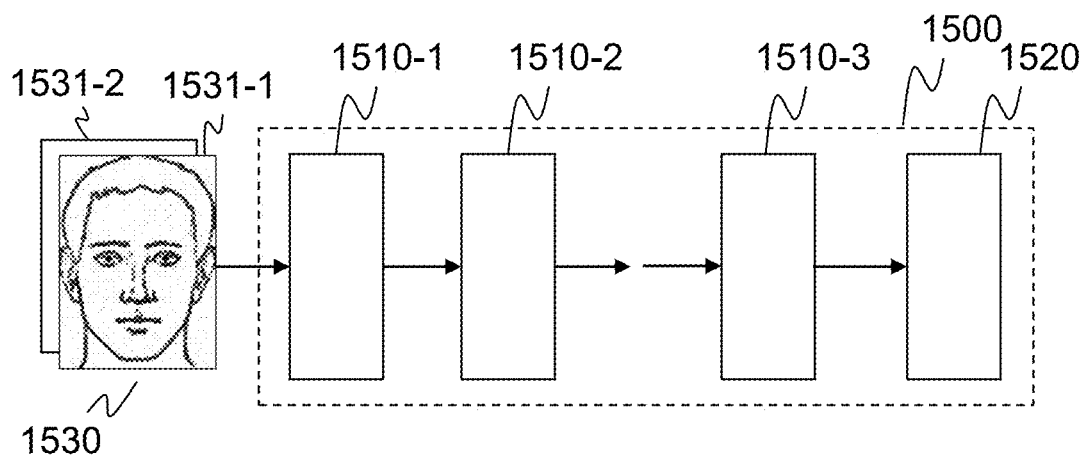
FIG. 15-a
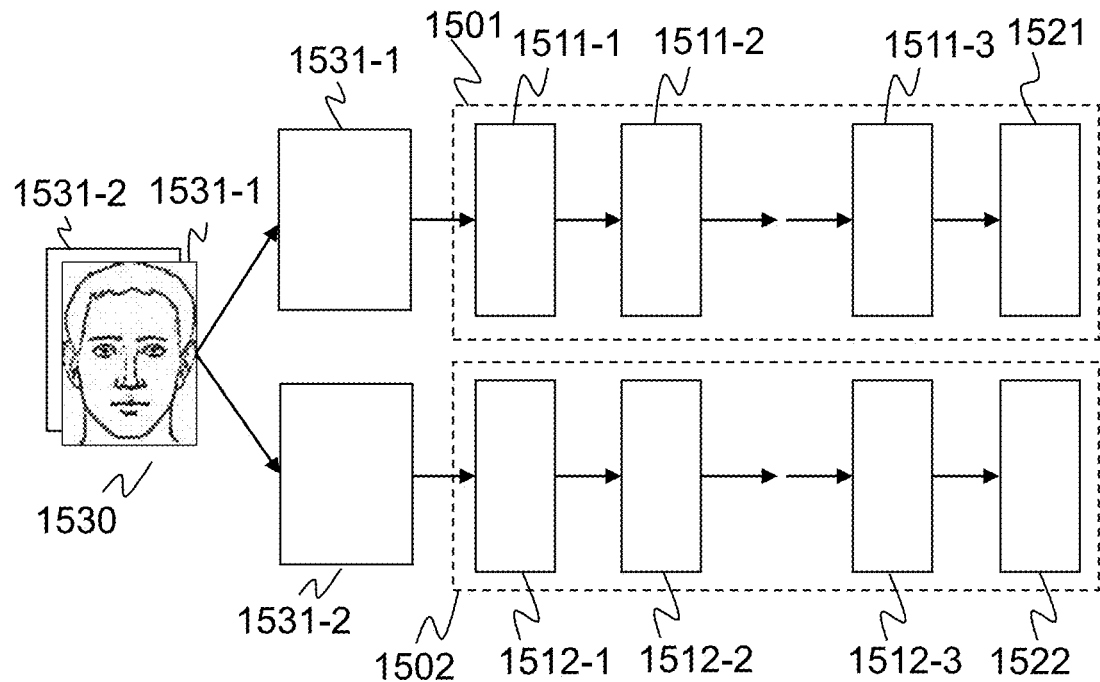
FIG. 15-b

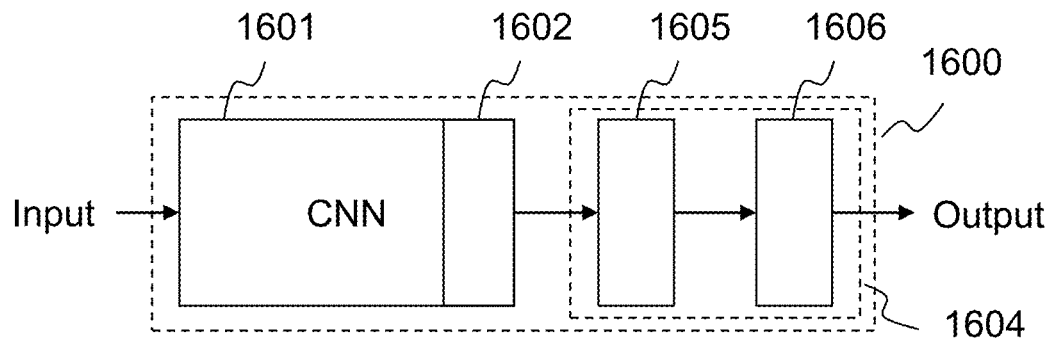
FIG. 16-a
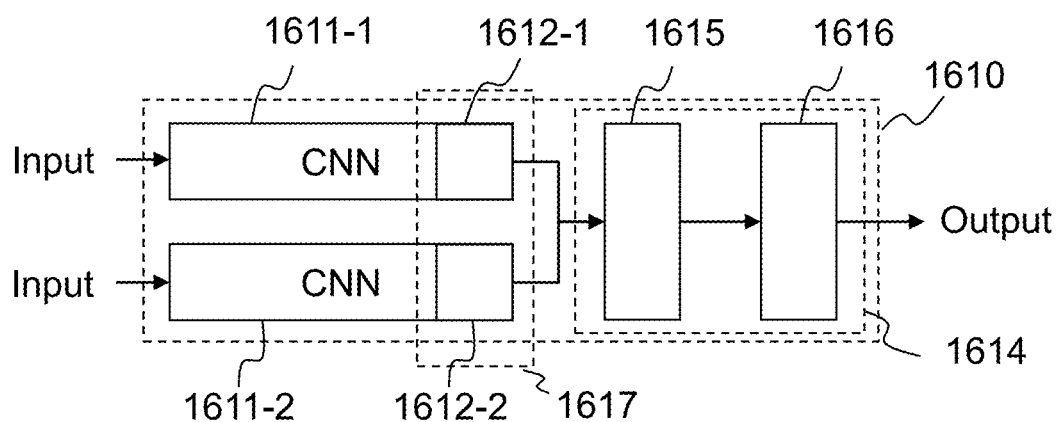
FIG. 16-b
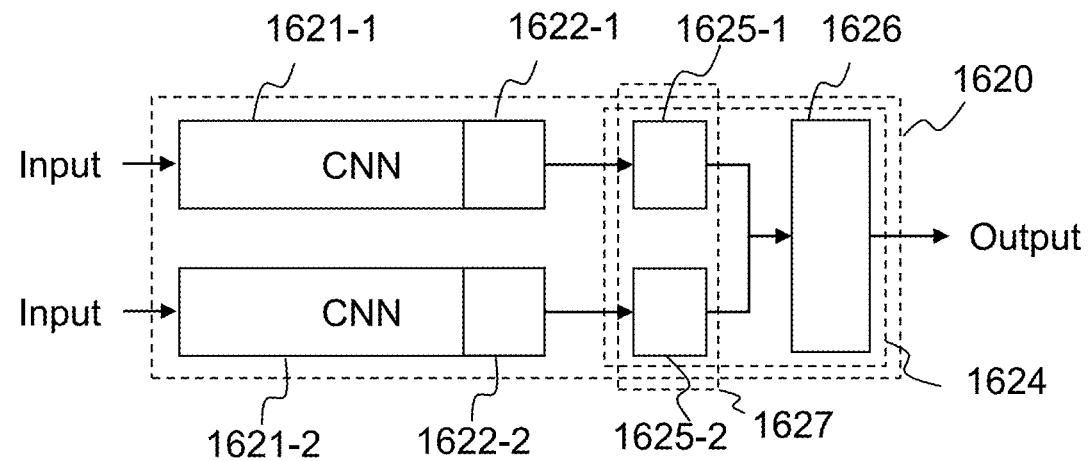
FIG. 16-c

METHODS AND SYSTEMS FOR FACE RECOGNITION

CROSS REFERENCE

This application is a continuation of International Application No. PCT/CN2017/114140, filed on Nov. 30, 2017, which claims priority to Chinese Application No. 201711174490.7 filed on Nov. 22, 2017, Chinese Application No. 201711176849.4 filed on Nov. 22, 2017, and Chinese Application No. 201711174440.9 filed on Nov. 22, 2017, the entire contents of each of which are hereby incorporated by reference.

TECHNICAL FIELD

The present disclosure relates to methods and systems for face recognition, and in particular, methods and methods for face recognition using machine learning technologies.

BACKGROUND

A Convolutional Neural Network (CNN) is a deep learning network model that may be used in face recognition and face identification applications. Some existing CNN processing methods may take solely greyscale images or RGB images as inputs. These methods may not be able to process images obtained under special circumstances (e.g., low light conditions) with acceptable performance. Some CNN processing methods may take sub-images representing different parts of greyscale images or RGB images as inputs, use a plurality of CNNs to process these inputs, and fuse feature vectors at the feature layers. These methods may generate redundant features thus reduce the efficiency and increase the cost. Some other CNN processing methods may take some simple feature vectors generated from an image as inputs. These methods usually don not take complementary feature vectors into consideration and may not have a wide application.

SUMMARY

According to an aspect of the present disclosure, a method is provided. The method may include obtaining a neural network comprising a first sub-neural network and a second sub-neural network; generating a plurality of preliminary feature vectors based on an image associated with a human face, the plurality of preliminary feature vectors comprising a color-based feature vector; obtaining at least one input feature vector based on the plurality of preliminary feature vectors; generating a deep feature vector based on the at least one input feature vector using the first sub-neural network; and recognizing the human face based on the deep feature vector.

In some embodiments, the recognizing the human face based on the deep feature vector may further comprise generating an output using the second sub-neural network based on the deep feature vector; and recognizing the human face based on the output.

In some embodiments, the recognizing the human face based on the deep feature vector may further comprise determining a pose of the human face based on the output.

In some embodiments, the first sub-neural network may include one or more secondary sub-neural networks with convolutional network architecture. In some embodiments, the secondary sub-neural networks may include a feature layer configured to generate the deep feature vector.

In some embodiments, the feature layer may be fully connected to a layer within at least one of the secondary sub-neural networks.

In some embodiments, the obtaining the at least one input feature vector based on the plurality of preliminary feature vectors may further comprise using at least one of the plurality of preliminary feature vectors as the at least one input feature vector.

In some embodiments, the plurality of preliminary feature vectors may include at least one of a texture-based feature vector or a gradient-based feature vector.

In some embodiments, the obtaining the at least one input feature vector based on the plurality of preliminary feature vectors may comprise generating a combined preliminary feature vector by stacking at least two of the plurality of preliminary feature vectors; and using the combined preliminary feature vector as the at least one input feature vector.

In some embodiments, the plurality of preliminary feature vectors may include at least one of a first texture-based feature vector or a second texture-based feature vector.

In some embodiments, the method may further comprise training the neural network by performing a backpropagation operation. In some embodiments, the training the neural network by performing a backpropagation operation may further comprise determining an error at the feature layer of a plurality of secondary sub-neural networks, the first sub-neural network may comprise the plurality of secondary sub-neural networks; dividing the error into a plurality of error portions, the number of the error portions may correspond to the number of the secondary sub-neural networks; and performing the backpropagation operation on the secondary sub-neural networks based on the plurality of error portions.

In some embodiments, the method may further comprise dividing the error into the plurality of error portions based on the number of neural units of the feature layer of the secondary sub-neural networks.

In some embodiments, the generating the output using the second sub-neural network based on the deep feature vector may further comprise fusing the deep feature vector to form an ultimate feature vector; and generating the output using at least one of the second sub-neural networks based on the ultimate feature vector.

In some embodiments, the output may comprise at least one posing parameter, and the posing parameter may comprise at least one of a yaw parameter or a pitch parameter.

In some embodiments, the method may further comprise obtaining a first image; generating a plurality of first sub-images based on the first image, the plurality of first sub-images may correspond to a plurality of parts of the first image; generating a plurality of first preliminary feature vectors based on at least one of the plurality of the first sub-images; obtaining at least one first input feature vector based on the plurality of first preliminary feature vectors; generating a first deep feature vector based on at least one first input feature vector using the first sub-neural network; and generating the output using the second sub-neural network based on the first deep feature vector.

In some embodiments, the method may further comprise obtaining a second image; generating a plurality of second sub-images based on the second image, the plurality of second sub-images may correspond to a plurality of parts of the second image; generating a plurality of second preliminary feature vectors based on at least one of the plurality of second sub-images; obtaining at least one second input feature vector based on the plurality of the second preliminary feature vectors; generating a second deep feature vector based on the at least one second input feature vector through the first sub-neural network; and generating the output using the second sub-neural network based on the first deep feature vector and the second deep feature vector.

In some embodiments, the generating the output using the second sub-neural network based on the first deep feature vector and the second deep feature vector may further comprise generating a first intermediate associated with at least one of the plurality of second sub-images based on the first deep feature vector and the second deep feature vector; generating a second intermediate based on the first intermediates associated with the at least one of the second sub-images; and generating the output based on the second intermediate.

In some embodiments, the plurality of first preliminary feature vectors and the plurality of second preliminary feature vectors may include a normalization-based feature vector.

In some embodiments, the method may further comprise training at least part of the neural network comprising the first sub-neural network and the second sub-neural network; and tuning the at least part of the neural network.

In some embodiments, the tuning the at least part of the neural network may further comprise obtaining a plurality of second features at a first feature layer of the first sub-neural network or a layer connecting to the feature layer; obtaining a plurality of normalized features by normalizing the plurality of second features; clustering the normalized features into at least one cluster, the cluster comprising a feature determined as a centroid; and tuning the at least part of the neural network based on at least one centroid.

According to another aspect of the present disclosure, a system is provided. The system may include at least one storage medium and at least one processor configured to communicate with the at least one storage medium. The at least one storage medium may include a set of instructions for processing at least one service request for an on-demand service. When the at least one processor executes the set of instructions, the at least one processor may be directed to perform one or more of the following operations. The at least one processor may obtain a neural network comprising a first sub-neural network and a second sub-neural network. The at least one processor may generate a plurality of preliminary feature vectors based on an image associated with a human face, the plurality of preliminary feature vectors comprising a color-based feature vector. The at least one processor may obtain at least one input feature vector based on the plurality of preliminary feature vectors. The at least one processor may generate a deep feature vector based on the at least one input feature vector using the first sub-neural network; and the at least one processor may recognize the human face based on the deep feature vector.

In some embodiments, to recognize the human face based on the deep feature vector, the at least one processor may further generate an output using the second sub-neural network based on the deep feature vector; and recognize the human face based on the output.

In some embodiments, to recognize the human face based on the deep feature vector, the at least one processor may further determine a pose of the human face based on the output.

In some embodiments, the first sub-neural network may include one or more secondary sub-neural networks with convolutional network architecture. In some embodiments, the secondary sub-neural networks may include a feature layer configured to generate the deep feature vector.

In some embodiments, the feature layer may be fully connected to a layer within at least one of the secondary sub-neural networks.

In some embodiments, to obtain the at least one input feature vector based on the plurality of preliminary feature vectors, the at least one processor may further use at least one of the plurality of preliminary feature vectors as the at least one input feature vector.

In some embodiments, the plurality of preliminary feature vectors may include at least one of a texture-based feature vector or a gradient-based feature vector.

In some embodiments, to obtain the at least one input feature vector based on the plurality of preliminary feature vectors, the at least one processor may further generate a combined preliminary feature vector by stacking at least two of the plurality of preliminary feature vectors; and use the combined preliminary feature vector as the at least one input feature vector.

In some embodiments, the plurality of preliminary feature vectors may include at least one of a first texture-based feature vector or a second texture-based feature vector.

In some embodiments, the at least one processor may further train the neural network by performing a backpropagation operation. In some embodiments, to train the neural network by performing a backpropagation operation, the at least one processor may further determine an error at the feature layer of a plurality of secondary sub-neural networks, the first sub-neural network may comprise the plurality of secondary sub-neural networks; divide the error into a plurality of error portions, the number of the error portions may correspond to the number of the secondary sub-neural networks; and perform the backpropagation operation on the secondary sub-neural networks based on the plurality of error portions.

In some embodiments, the at least one processor may further divide the error into the plurality of error portions based on the number of neural units of the feature layer of the secondary sub-neural networks.

In some embodiments, to generate the output using the second sub-neural network based on the deep feature vector, the at least one processor may further fuse the deep feature vector to form an ultimate feature vector; and generate the output using at least one of the second sub-neural networks based on the ultimate feature vector.

In some embodiments, the output may comprise at least one posing parameter, and the posing parameter may comprise at least one of a yaw parameter or a pitch parameter.

In some embodiments, the at least one processor may further obtain a first image; generate a plurality of first sub-images based on the first image, the plurality of first sub-images may correspond to a plurality of parts of the first image; generate a plurality of first preliminary feature vectors based on at least one of the plurality of the first sub-images; obtain at least one first input feature vector based on the plurality of first preliminary feature vectors; generate a first deep feature vector based on at least one first input feature vector using the first sub-neural network; and generate the output using the second sub-neural network based on the first deep feature vector.

In some embodiments, the at least one processor may further obtain a second image; generate a plurality of second sub-images based on the second image, the plurality of second sub-images may correspond to a plurality of parts of the second image; generate a plurality of second preliminary feature vectors based on at least one of the plurality of second sub-images; obtain at least one second input feature vector based on the plurality of the second preliminary feature vectors; generate a second deep feature vector based on the at least one second input feature vector through the first sub-neural network; and generate the output using the second sub-neural network based on the first deep feature vector and the second deep feature vector.

In some embodiments, to generate the output using the second sub-neural network based on the first deep feature vector and the second deep feature vector, the at least one processor may further generate a first intermediate associated with at least one of the plurality of second sub-images based on the first deep feature vector and the second deep feature vector; generate a second intermediate based on the first intermediates associated with the at least one of the second sub-images; and generate the output based on the second intermediate.

In some embodiments, the plurality of first preliminary feature vectors and the plurality of second preliminary feature vectors may include a normalization-based feature vector.

In some embodiments, the at least one processor may further train at least part of the neural network comprising the first sub-neural network and the second sub-neural network; and tune the at least part of the neural network.

In some embodiments, to tune the at least part of the neural network, the at least one processor may further obtain a plurality of second features at a first feature layer of the first sub-neural network or a layer connecting to the feature layer; obtain a plurality of normalized features by normalizing the plurality of second features; cluster the normalized features into at least one cluster, the cluster comprising a feature determined as a centroid; and tune the at least part of the neural network based on at least one centroid.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in more detail with reference to the drawings. These embodiments are non-limiting exemplary embodiments, in which like reference numerals represent similar structures throughout the several views of the drawings, and wherein:

FIG. 6 illustrates a diagram of an exemplary normalization-based feature vector and a corresponding greyscale vector according to some embodiments of the present disclosure;

Figure 10:
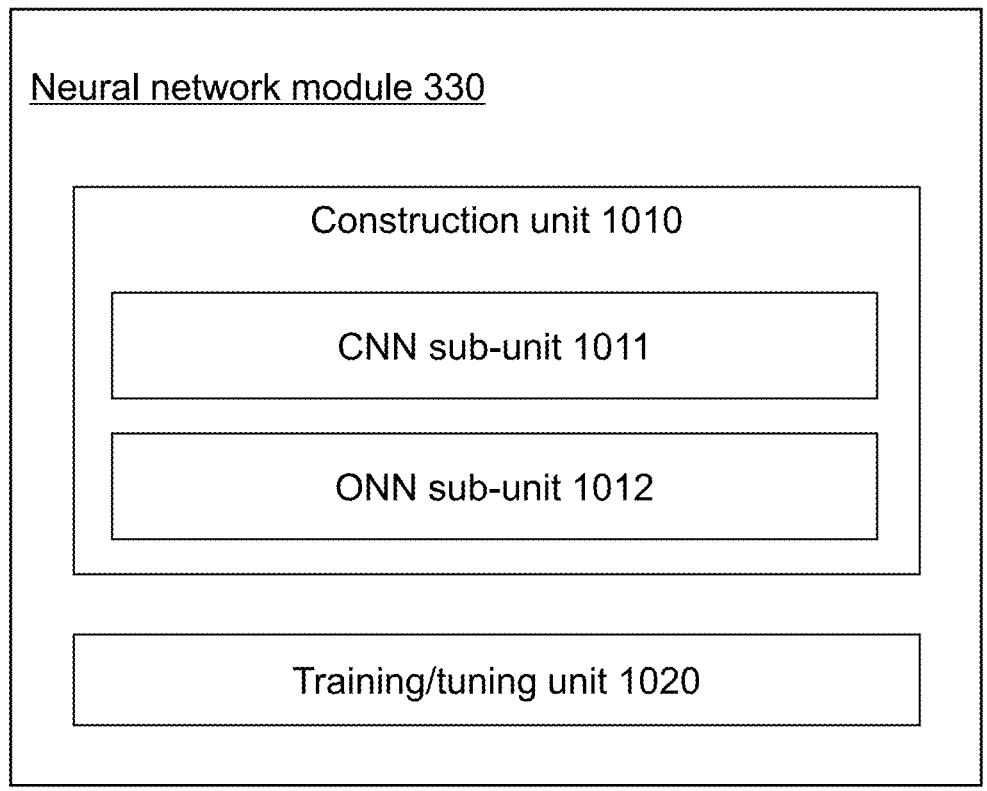
Figure 17:
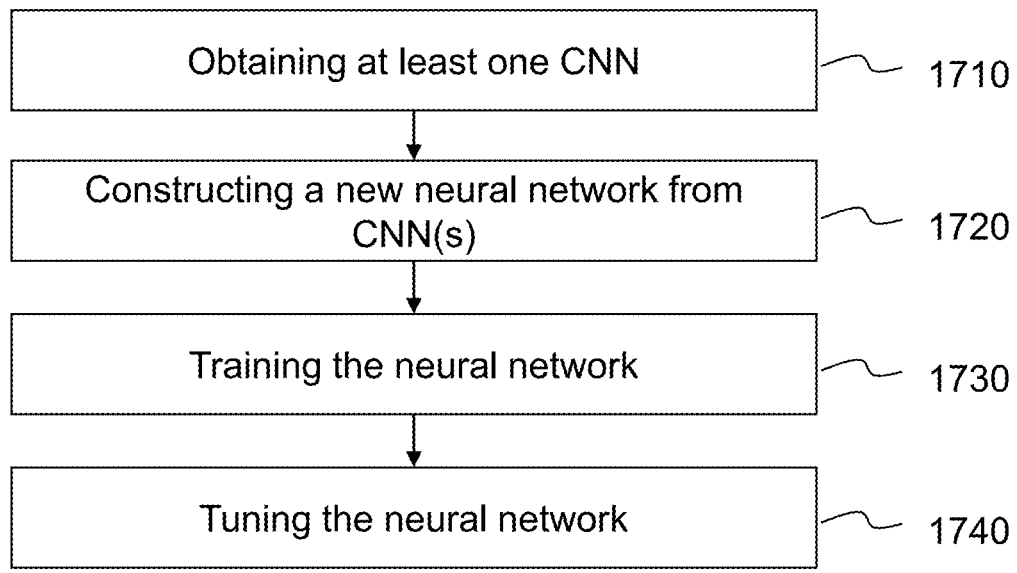
Figure 18:
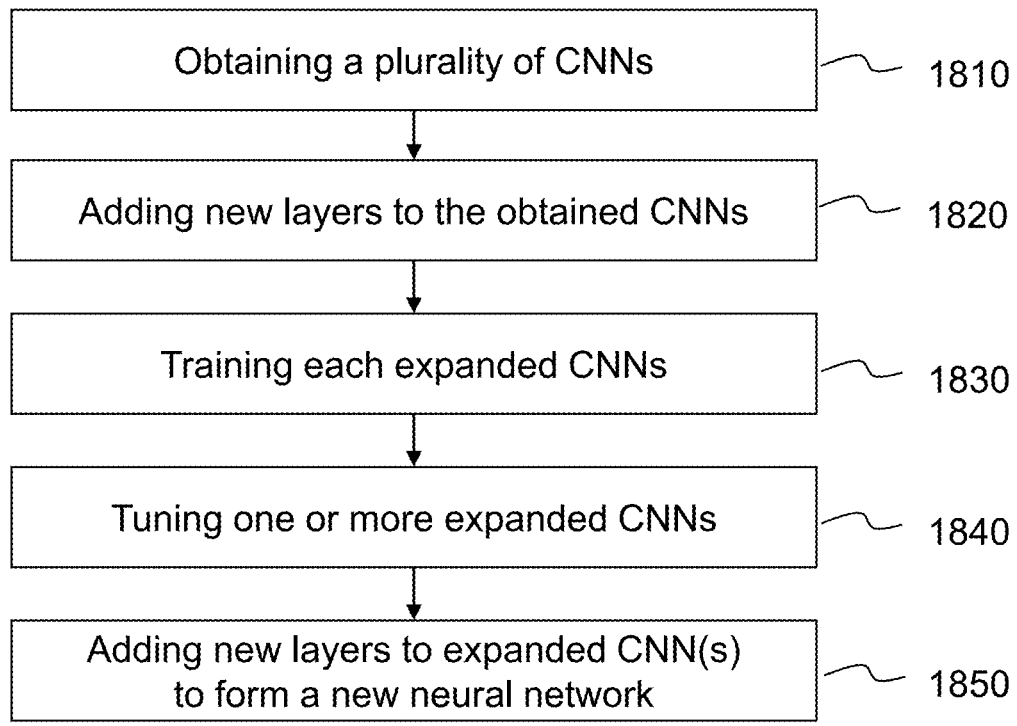
Figure 19:
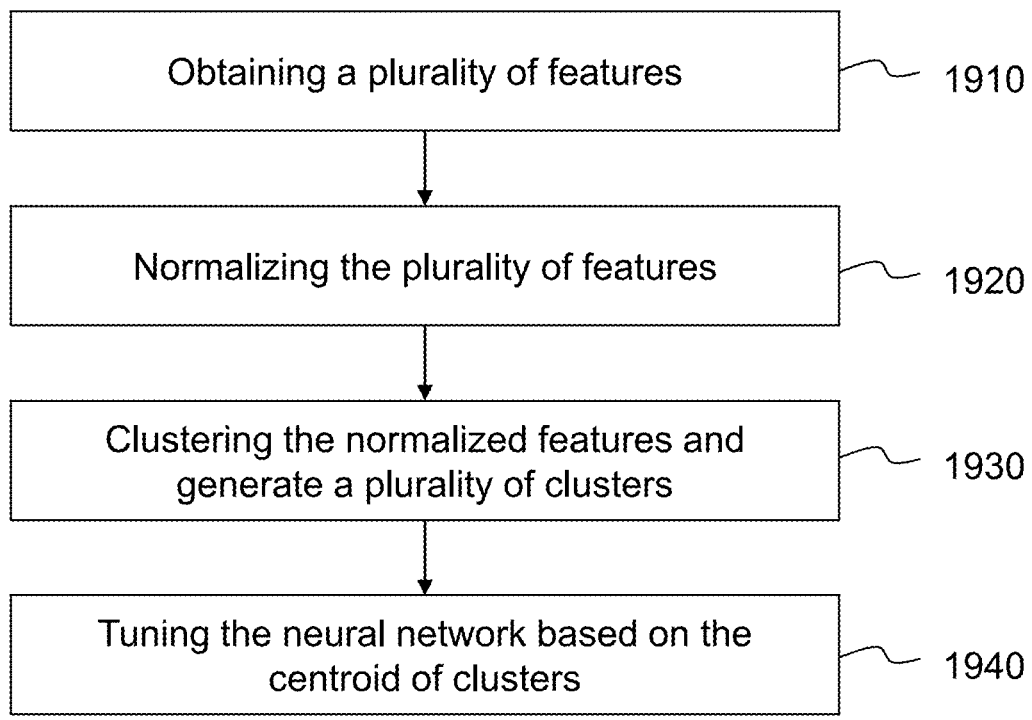
Figure 20:
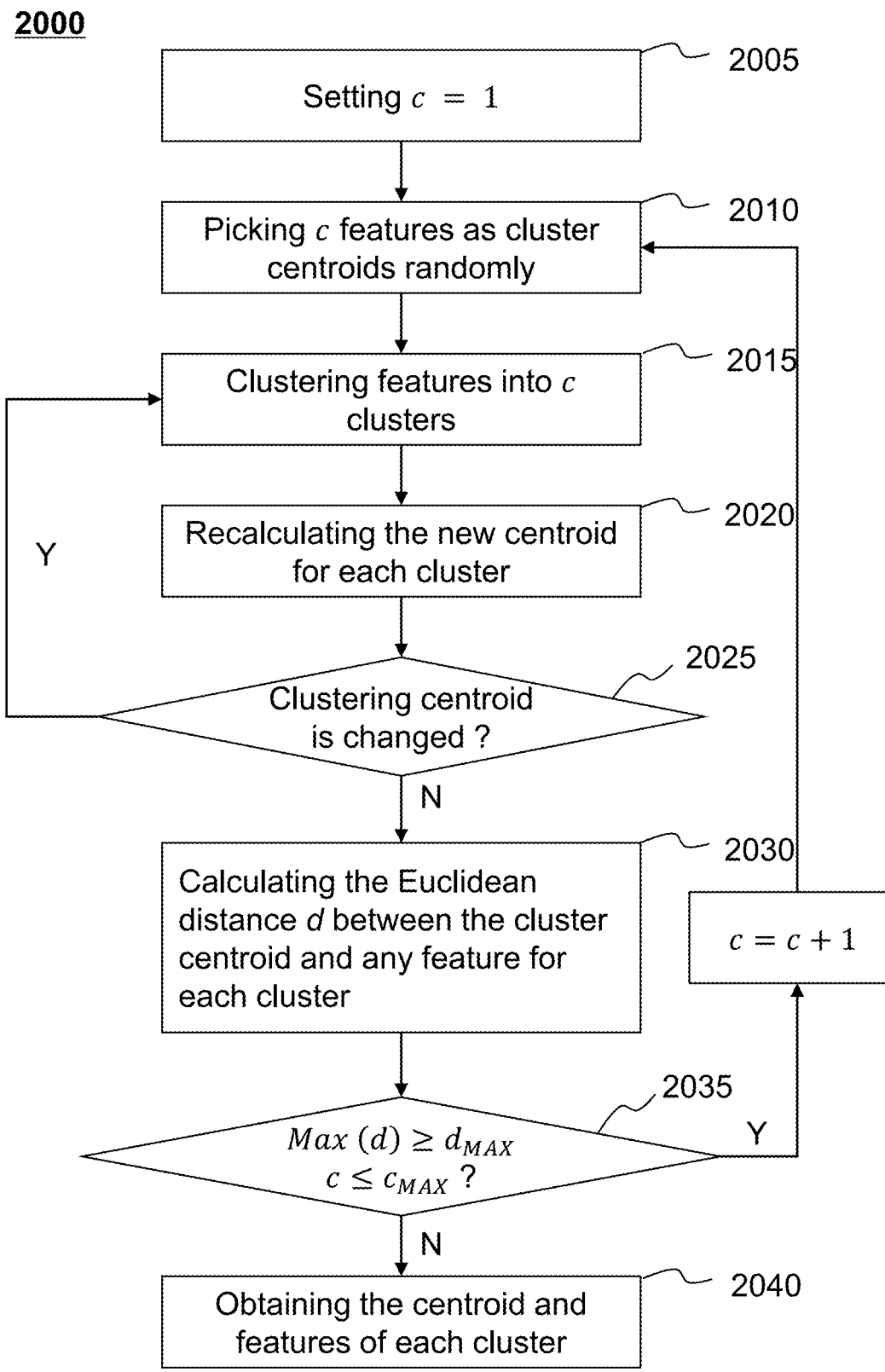
Figure 21:
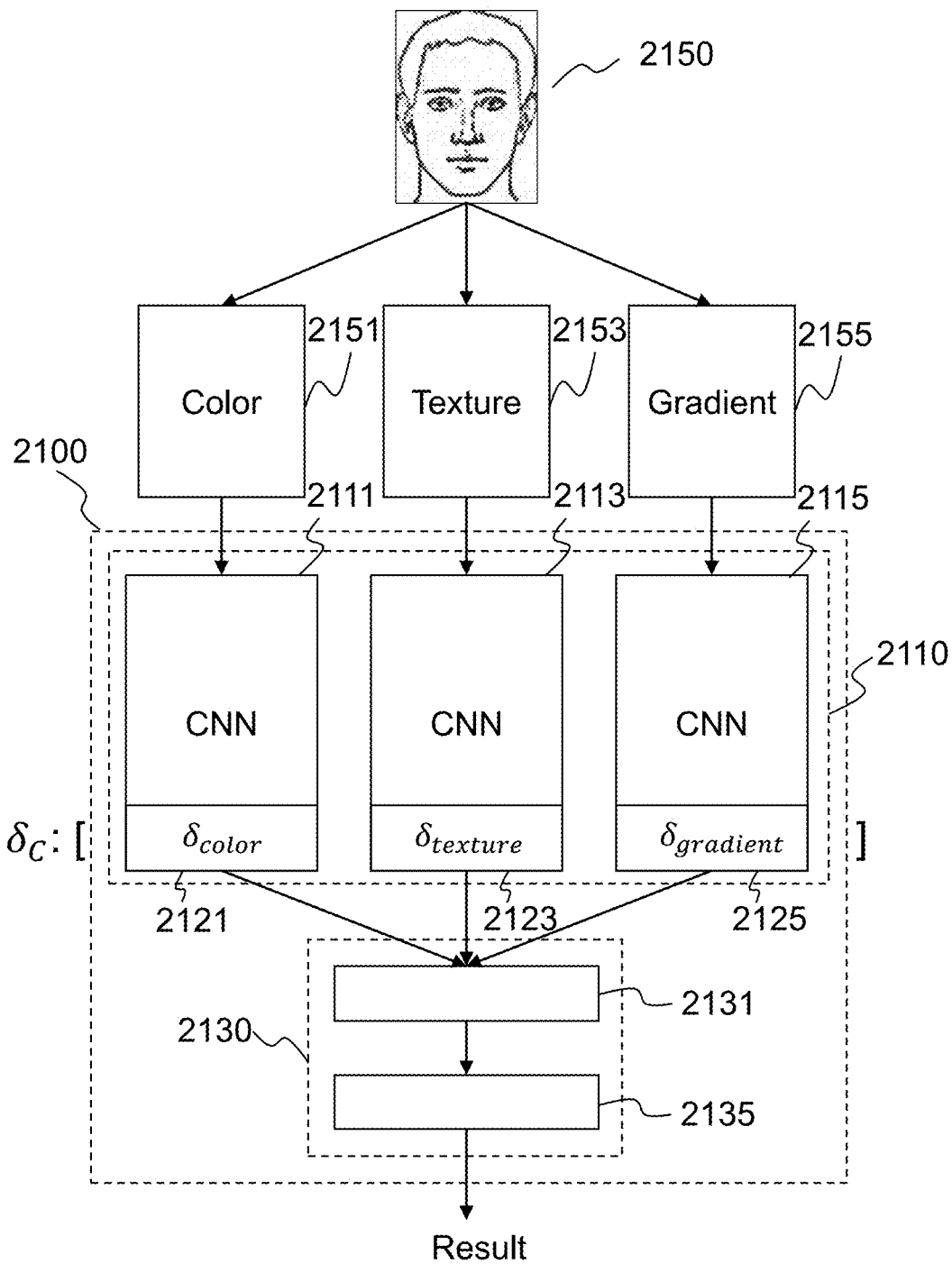
Figure 22:
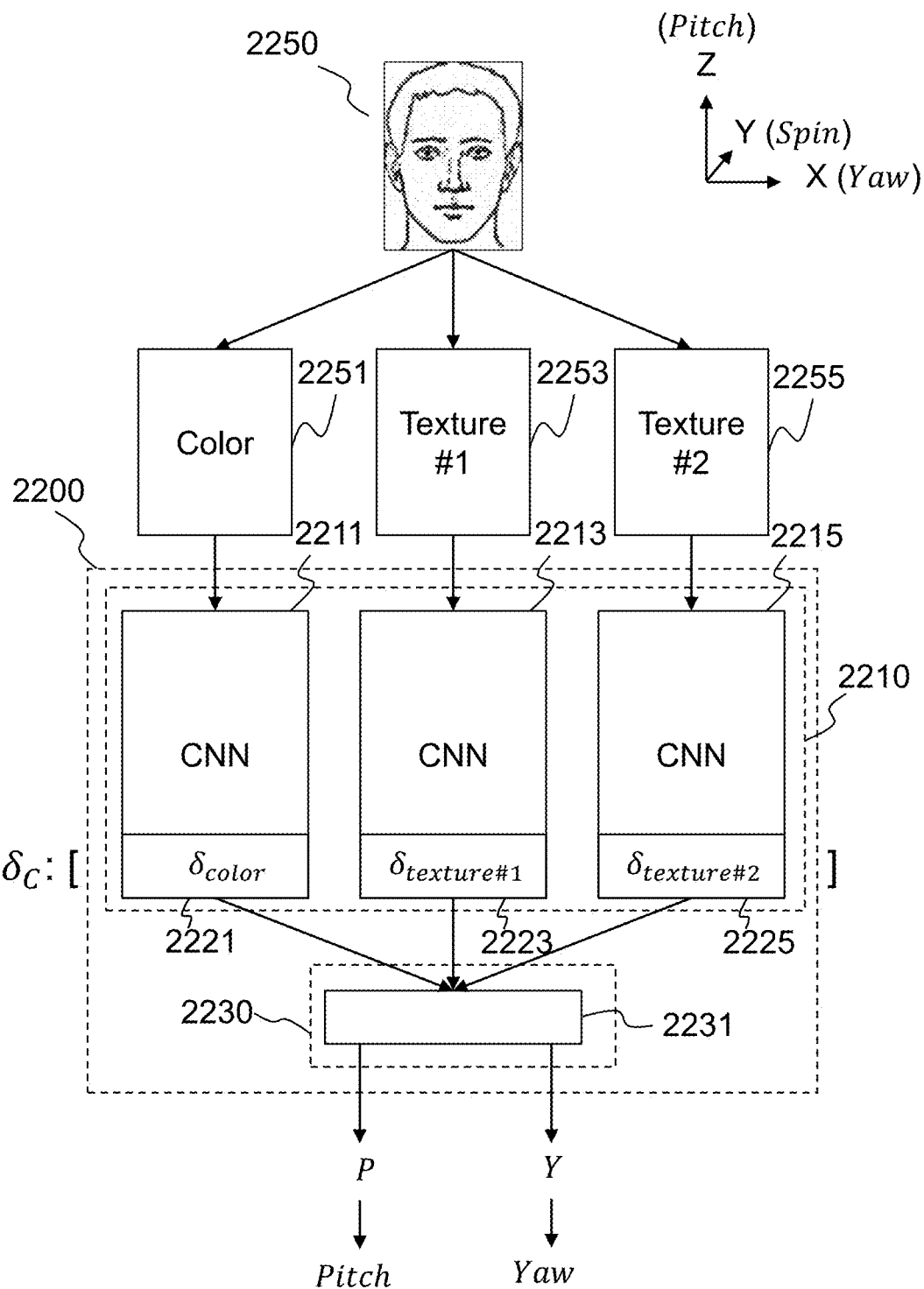
Figure 23:
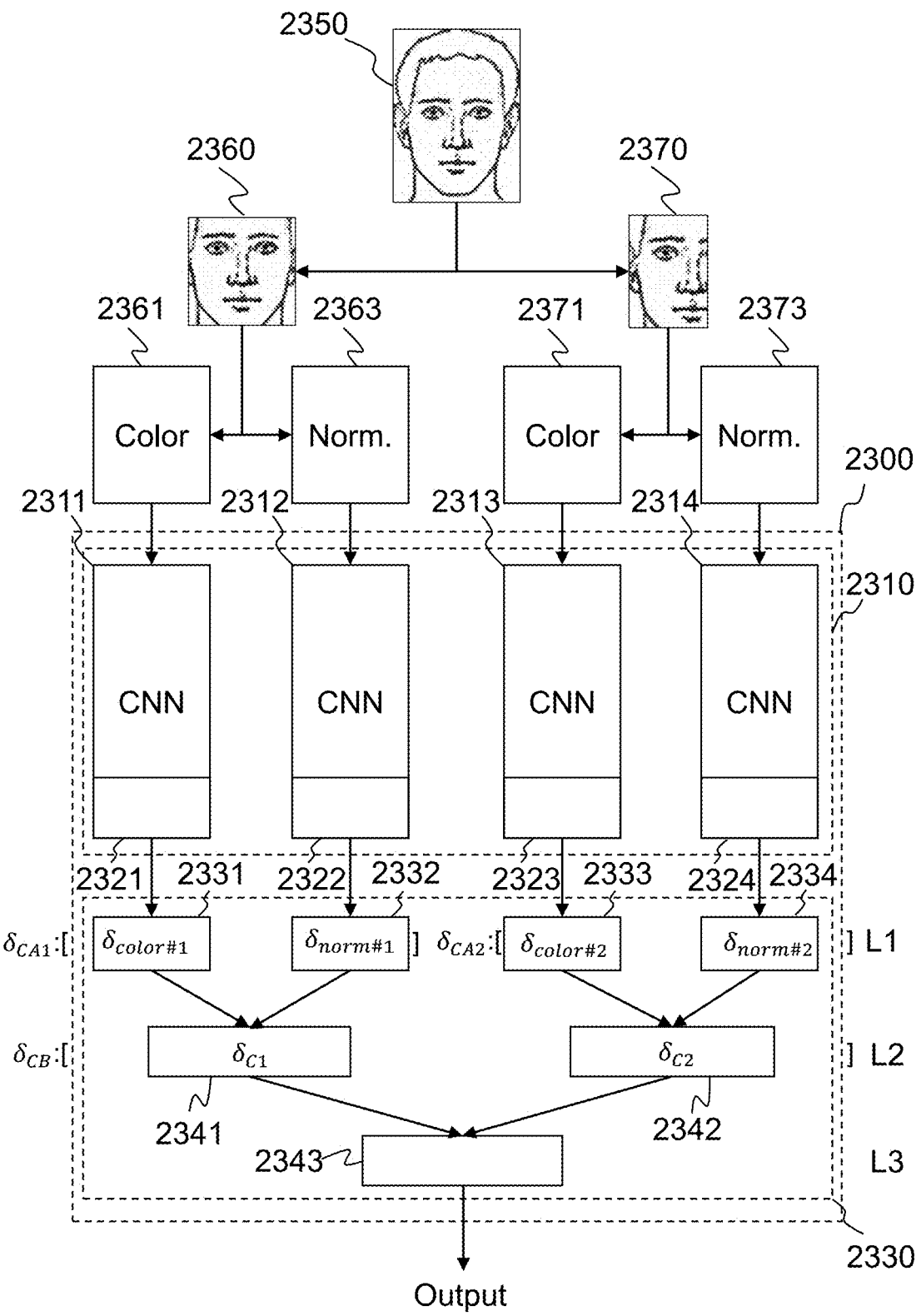

FIG. 7-a illustrates a diagram of an exemplary central pixel and the corresponding neighboring pixels according to some embodiments of the present disclosure;

FIG. 7-b illustrates a diagram of an exemplary central pixel and the corresponding neighboring pixels according to some embodiments of the present disclosure;

FIG. 8 illustrates a diagram of exemplary Kirsch masks according to some embodiments of the present disclosure;

FIG. 9-a illustrates an exemplary method for generating preliminary feature vectors according to some embodiments of the present disclosure;

FIG. 9-b illustrates an exemplary method for generating preliminary feature vectors according to another embodiment of the present disclosure;

FIG. 10 illustrates a block diagram of an exemplary neural network module according to some embodiments of the present disclosure;

FIG. 11 illustrates an exemplary neural unit according to some embodiments of the present disclosure;

FIG. 12 illustrates an exemplary neural network according to some embodiments of the present disclosure;

FIGS. 13-a and 13-b illustrate an exemplary layer of a CNN according to some embodiments of the present disclosure;

FIGS. 14-a and 14-b illustrate an exemplary sub-network with a convolutional neural network (CNN) architecture according to some embodiments of the present disclosure;

FIG. 15-a illustrates an exemplary method about a sub-network with a CNN architecture processing an input vector with multiple sub-vectors according to some embodiments of the present disclosure;

FIG. 15-b illustrates an exemplary method about a sub-network with a CNN architecture processing an input vector with multiple sub-vectors according to some embodiments of the present disclosure;

FIG. 16-a illustrates an exemplary linking method between one or more convolutional sub-neural-network parts and an output-generating-neural-network part to form a neural network according to some embodiments of present disclosure;

FIG. 16-b illustrates an exemplary linking method between one or more convolutional sub-neural-network parts and an output-generating-neural-network part to form a neural network according to some embodiments of the present disclosure;

FIG. 16-c illustrates an exemplary diagram of a linking method between one or more convolutional sub-neural-network parts and one output-generating-neural-network part to form a neural network according to some embodiments of the present disclosure;

FIG. 17 illustrates a flowchart of an exemplary process for determining a neural network according to some embodiments of the present disclosure;

FIG. 18 illustrates a flowchart of an exemplary process for determining a neural network according to some embodiments of the present disclosure;

FIG. 19 illustrates a flowchart of an exemplary process for tuning a neural network according to some embodiments of the present disclosure;

FIG. 20 illustrates a flowchart of an exemplary process for clustering a plurality of normalized features during the tuning of neural network according to some embodiments of the present disclosure;

FIG. 21 illustrates an exemplary structure of a neural network according to some embodiments of the present disclosure;

FIG. 22 illustrates an exemplary structure of a neural network according to some embodiments of the present disclosure; and FIG. 23 illustrates an exemplary structure of a neural network according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, sections, or assemblies of different levels in ascending order. However, the terms may be displaced by other expressions if they may achieve the same purpose.

It will be understood that when a device, unit, engine, module, or block is referred to as being "on," "connected to," or "coupled to," another device, unit, engine, module, or block, it may be directly on, connected or coupled to, or communicate with another device, unit, engine, module, or block, or an intervening device, unit, engine, module, or block may be present, unless the context clearly indicates otherwise. As used herein, the term "and/or" includes any and all combinations of one or more of the associated listed items.

Figure 2:
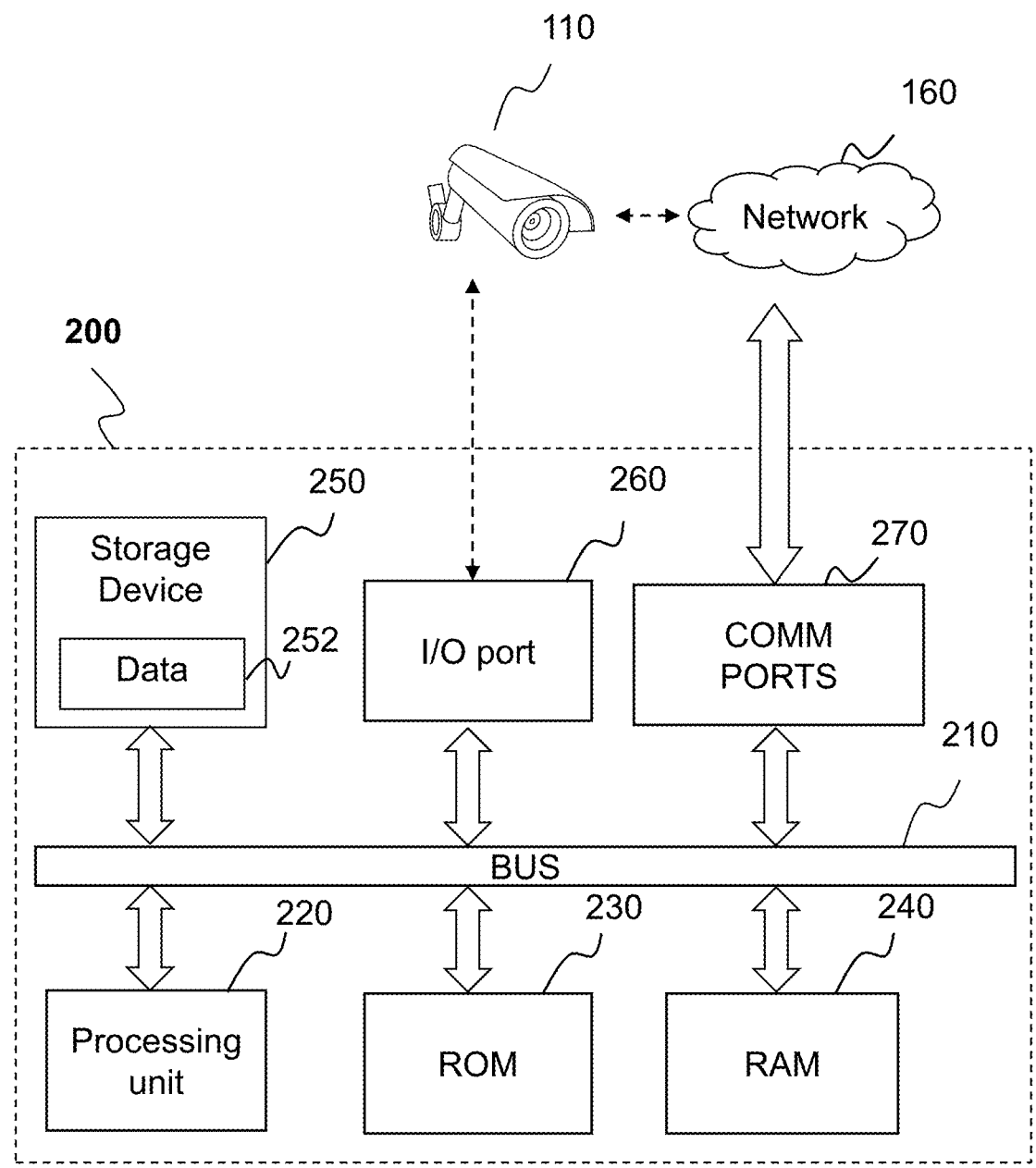
FIG. 2 illustrates a schematic diagram of an exemplary hardware and/or software components of an exemplary computing device according to some embodiments of the present disclosure.

Generally, the word "module" or "unit" as used herein, refers to logic embodied in hardware or firmware, or to a collection of software instructions. A module or a unit described herein may be implemented as software and/or hardware and may be stored in any type of non-transitory computer-readable medium or other storage device. In some embodiments, a software module/unit may be compiled and linked into an executable program. It will be appreciated that software modules can be callable from other modules/units or from themselves, and/or may be invoked in response to detected events or interrupts. Software modules/units configured for execution on computing devices (e.g., processor 220 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units may be included in connected logic components, such as gates and flip-flops, and/or can be included of programmable units, such as programmable gate arrays or processors. The modules/units or computing device functionality described herein may be implemented as software modules/units, but may be represented in hardware or firmware. In general, the modules/units described herein refer to logical modules/units that may be combined with other modules/units or divided into sub-modules/sub-units despite their physical organization or storage. The description may be applicable to a system, an engine, or a portion thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure.

Figure 1:
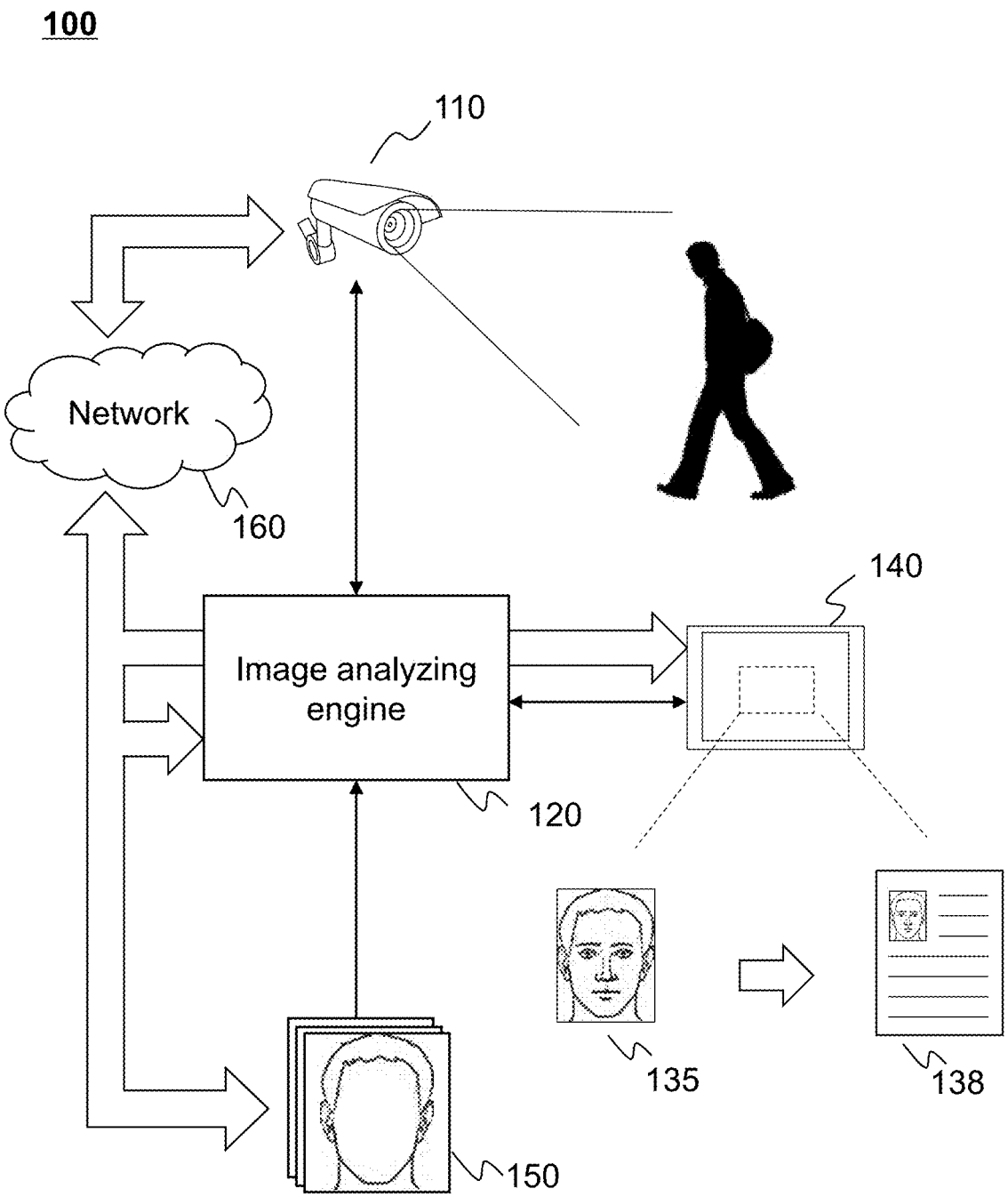
FIG. 1 illustrates a schematic diagram of an exemplary information processing system according to some embodiments of the present disclosure.

FIG. 1 illustrates a schematic diagram of an exemplary information processing system according to some embodiments of the present disclosure. As shown in FIG. 1, information processing system 100 may include an imaging device 110, an image analyzing engine 120, a Human Interface Device (HID) 140, and a network 160.

Imaging device 110 may be configured to obtain data of a target. Term data used herein may be any information including, for example, number, text, signal, voice, images, video, parameters, code, formula, file, algorithms, program, or the like, or any combination thereof. Imaging device 110 may be a single device, or a group of devices of the same kind or of different kinds. Imaging device 110 may capture data though radio wave, microwave, visible light, infrared radiation, ultraviolet, X-ray, gamma ray, nuclear magnetic resonance (NMR), or the like, or any combination thereof. Imaging device 110 may include a normal camera, a surveillance camera, a mobile phone camera, a webcam, a vidicon, a DV (digital video), a thermal imager, a scanner, a medical imaging equipment, a telescope, a microscope, a robot eye, or the like, or any combination thereof. Imaging device 110 may be an independent device, or a component of Human Interface Device (HID) 140.

In some embodiments, a region of interest (e.g., a human face, a fingerprint, a voice, etc.) may be required. For example, a human face may be included in some images or videos obtained by imaging device 110. In some embodiments, imaging device 110 may be capable of recognizing a human face and then obtain an image or video including that face. In some embodiments, imaging device 110 may be capable of detecting a moving object and then obtain an image including that moving object. In some embodiments, imaging device 110 may be capable of detecting a living body and then obtain an image including that living body. In some embodiments, imaging device 110 may continuously record video or take photos periodically over a certain region. That face may be analyzed by image analyzing engine 120.

Image analyzing engine 120 may be configured to analyze data obtained by imaging device 110. Merely by way of example, images (e.g. photos) or videos (e.g., surveillance videos) may be analyzed. The analyzing may include analyzing a face in the image or video, which may include face detection, face representation, face identification, expression analysis, physical classification, or the like, or any combination thereof. Information may be obtained based on the analyzing result.

The images or videos to be analyzed may be generated by image analyzing engine 120 from data obtained by imaging device 110, generated directly by imaging device 110, acquired from network 160, or input into image analyzing engine 120 from a computer readable storage media by a user. The images or videos may be two-dimensional or three-dimensional. Image analyzing engine 120 may control imaging device 110. For example, the shooting coverage, shooting angle, shooting speed, shooting time, focal distance, aperture, imaging quality, etc., may be controlled or adjusted by image analyzing engine 120. The control or adjustment may be manual, automatic, or semi-automatic.

Image analyzing engine 120 may perform a preprocessing for the data to be analyzed. The preprocessing may include image dividing, feature extracting, image registration, format converting, cropping, snapshotting, scaling, denoising, rotating, recoloring, subsampling, background elimination, normalization, or the like, or any combination thereof. During the preprocessing procedure, an image 135 focusing on a human face may be obtained from the image or video to be analyzed. Image 135 may be a color image, a grey image, or a binary image. Image 135 may be two-dimensional or three-dimensional.

Image 135 may be further processed and then analyzed by image analyzing engine 120 to obtain information 138. Information 138 may include numbers, text, signal, voice, image, video, parameter, code, formula, file, algorithm, program, or the like, or any combination thereof. In some embodiments, information 138 may relate to the identity of a face owner, e.g., name, gender, age, citizenship, address, phone number, career, title, criminal record, background, or the like, or any combination thereof. In some embodiments, information 138 may represent information relating to the facial features including, e.g., expression, pose, race, attractiveness, possible health state, possible age, etc. In some embodiments, information 138 may represent a feature vector.

In the present disclosure, a feature vector may relate to an n-dimensional vector of numerical features that represent the face. A numerical feature may relate to individual measurable property of a phenomenon being observed (e.g., a face in the present disclosure). The numerical feature may include, for example, geometrical feature, algebraic feature, texture feature, numerical feature, or the like, or any combination thereof. The numerical feature may be extracted from one or more of facial features as described elsewhere in the present disclosure. The feature vector may be used for face detection, face identification, expression analysis, physical classification, or the like, or any combination thereof. In the following text, the term "feature" may relate to a numerical feature.

In some embodiments, information processing system 100 and/or image analyzing engine 120 may belong to an artificial intelligent device, the feature vector (e.g., information 138) may be used for the artificial intelligent device to memorize the owner of the face and may not be displayed by HID 140.

A neural network may be implemented by image analyzing engine 120 to acquire information 138. In some embodiments, one neural network may be implemented by image analyzing engine 120 to analyze image 135 under different kinds of situations. In some embodiments, multiple neural networks may be implemented by image analyzing engine 120 to analyze. The factors influential to the type of neural network applied may include race, gender, age, expression, posture of the face owner, lighting condition, and/or image quality of image 135. For example, a neural network may be used to analyze a full-face image representing an Asian male under low light conditions.

In some embodiments, a database 150 may be accessed to obtain information 138. Database 150 may include a plurality of images representing faces of different people with corresponding information (e.g., information 138). Database 150 may be obtained from a local host of information processing system 100, or from a remoter server (not shown in FIG. 1) through network 160. The images in database 150 may represent normal citizens, people of certain career, criminals, deceased people, missing people, etc. The images in database 150 may be matched to image 135 by a neural network and information 138 may be accessed according to the matching result.

Image analyzing engine 120 may be implemented by one or more computing devices 200 as shown in FIG. 2 and/or a network constructed by organizing a plurality of computing devices 200. Image analyzing engine 120 may include a plurality of components including, for example, functional modules, sub-modules, units, or sub-units. The plurality of components will be illustrated in FIGS. 3, 5, 7-a, and 7-b.

Human interface device (HID) 140 may be configured to provide information to a user and/or collect information from a user. HID 140 may include at least one output equipment and one input equipment (not shown in FIG. 1). The output equipment may be configured to provide information to a user. The input equipment may be configured to collect information from a user.

The information provided by HID 140 to a user may be data including, for example, code, software, algorithm, signal, text, voice, image, video, or the like, or any combination thereof. The information may be obtained from HID 140, image analyzing engine 120, imaging device 110, network 160, and/or any other possible device of the information processing system 100. The information provided for a user may include a user interface (UI) to facilitate the operation. Image 135, information 138, or Image/video to be analyzed by image analyzing engine 120 may be displayed to a user by the UI.

The information collected by HID 140 from a user may be data including, for example, code, software, algorithm, data, signal, text, voice, image, video, or the like, or any combination thereof. The collected information may control HID 140, image analyzing engine 120, imaging device 110, network 160, and/or other possible devices of the information processing system 100. In some embodiments, image 135 or image/video to be analyzed may be input into image analyzing engine 120 through HID 140 by a user.

In some embodiments, HID 140 may be an independent device capable of computing and/or data processing. HID 140 may be a PC (personal computer), a laptop, a tablet PC, a mobile phone, a smart TV, a wearable device, a console, a supercomputer, or the like, or any combination thereof. In some embodiments, HID 140 may represent a collection of satellite assemblies of image analyzing engine 120. HID 140 may include a monitor, a projector, a mouse, a keyboard, a touch screen, a printer, a scanner, a camera, a button, a level, a speaker, a microphone, a port (e.g., a USB port, a network port, etc.), an optical drive, a siren, a remote control, a signal light, a meter, a sensor, an electrode, or the like, or any combination thereof.

Network 160 may be configured to transfer information. Network 160 may be optional in information processing system 100. In some embodiments, network 160 may transfer information between devices/components of information processing system 100. In some embodiments, network 160 may acquire information from, e.g., database 150, or a remote sever. Network 160 may be an independent network or a combination of different networks. Network 160 may include a local area network (LAN), a wide area network (WAN), a public switched telephone network (PSTN), a virtual network (VN), or the like, or any combination thereof. Network 160 may include a plurality of network access points. Network 160 may be a wired network, a wireless network, or a combination thereof. The wired network may be constructed by metal cables, optical cables, and/or hybrid cables. The wireless network may use one or may communication methods or protocols, including Bluetooth™, Wi-Fi, ZigBee™ near field communication (NFC), cellular network (for example, GSM, CDMA, 3G, 4G, etc.), or the like, or any combination thereof.

In information processing system 100, one or more devices/components may be connected directly or indirectly. For example, image analyzing engine 120 and HID 140 may be configured directly connected to cables, or be configured to communicate information via a filter, a router, a server, a transceiver, a network (e.g., network 160), or the like, or any combination thereof.

It should be noticed that above description about information processing system 100 is merely for illustration purposes, and not limit the scope of the present disclosure. It is understandable that, after learning the major concept and the mechanism of the present disclosure, a person of ordinary skill in the art may alter information processing system 100 in an uncreative manner. The alteration may include combining and/or splitting certain devices/components/modules/units, adding or removing optional devices/components/modules/units, changing the connection state of the devices/components/modules/units, applying information processing system 100 in a relative field, or the like, or any combination thereof. However, those variations and modifications do not depart the scope of the present disclosure.

FIG. 2 illustrates a schematic diagram of an exemplary hardware and/or software components of an exemplary computing device according to some embodiments of the present disclosure. Computing device 200 may be configured to implement a device/component/module/unit of information processing system 100. In some embodiments, computing device 200 may be configured to implement image analyzing engine 120. Computing device 200 may include a bus 210, a processing unit (CPU or processor) 220, a read-only memory (ROM) 230, a random-access memory (RAM) 240, a storage device 250, an input/output (I/O) port 260, and a communication port 270.

In some embodiments, computing device 200 may be a single device. In some embodiments, computing device 200 may include a plurality of devices. One or more components of computing device 200 may be implemented by one or more independent devices. For example, processing unit 220 and/or storage device 250 may be implemented by one or more computers.

Bus 210 may couple various components of computing device 200 and transfer data among them. Bus 210 may be any of several types of bus structures including a memory bus or memory controller, a peripheral bus, and a local bus using any of a variety of bus architectures.

I/O port 260 may transfer data between bus 210 and a device belonging or not belonging to computing device 200, for example, HID 140, imaging device 110, etc. I/O port 260 may include USB port, COM port, PS/2 port, HDMI port, VGA port, or the like, or any combination thereof. Communication port 270 may transfer data between bus 210 and a device belonging or not belonging to computing device 200, for example, network 160, imaging device 110, etc. Communication port 270 may be a network interface card (NIC).

Processing unit 220 may include any general purpose processor. The processing unit 220 may include multiple cores or processors, caches, etc. A multicore processor may be symmetric or asymmetric. Processing unit 220 may essentially be a completely independent computing system with similar structure as computing device 200. ROM 230, RAM 240, and storage device 250 may be configured to store data, e.g., data 252. ROM 230 may store a basic input/output (BIOS) which may provide the basic routine that helps to transfer information between devices/components within computing device 200, such as during initializing of a computer operating system. Storage device 250 may provide nonvolatile storage for data 252. Storage device 250 may connect to bus 210 through a drive interface. Storage device 250 may include a hard disk, a solid state disk (SSD), a flash memory card, a magnetic disk drive, an optical disk drive, tape drive, or the like, or any combination thereof. Data 252 may be transferred through bus 210 to RAM 240 before being processed by processing unit 220.

Data 252 may include data or code implementing computer readable instructions, data structures, images, information, temporary data, and others. Computer readable instruction may be executed by processing unit 220 to perform various functions, such as the functions of image analyzing engine 120, functions of imaging device 110, functions of HID 140, functions of identifying system 150, functions of network 160, functions of constructing, destroying, and operating a data structure, e.g., neural network, and any other function. A group of related computer readable instructions may be packaged as software. Images may include image 135, images from database 150 and any other image. Information may include information 138, information stored in database 150, etc. Temporary data may be data generated by processing unit 220 while performing any computer readable instructions.

Figure 3:
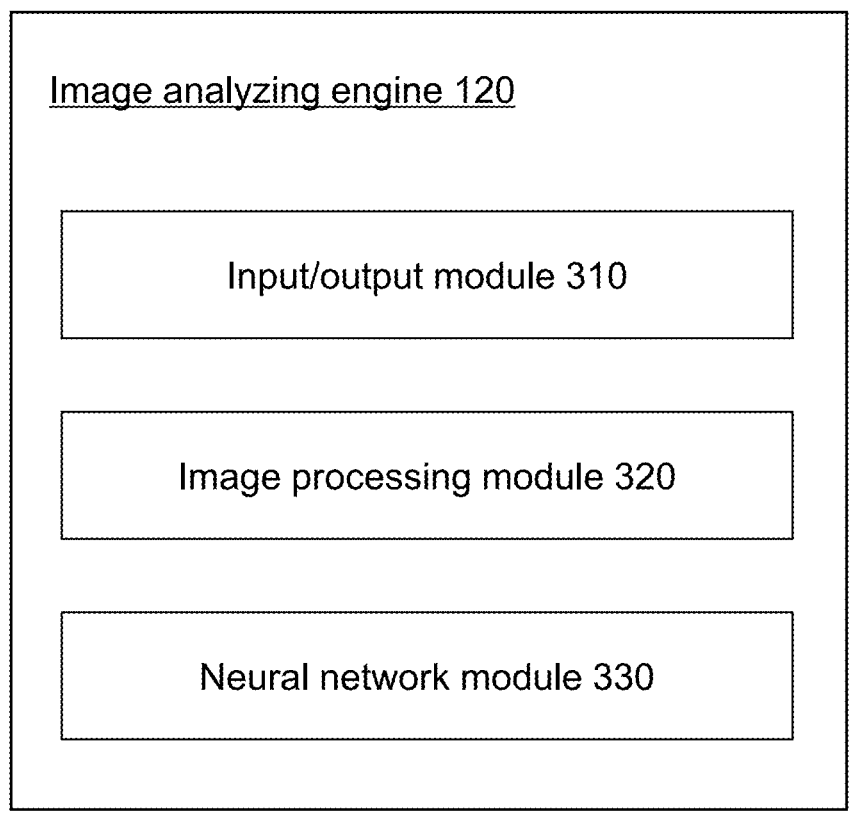
FIG. 3 illustrates a block diagram of an exemplary image analyzing engine according to some embodiments of the present disclosure.

FIG. 3 illustrates a block diagram of an exemplary image analyzing engine according to some embodiments of the present disclosure. Image analyzing engine 120 may be configured to analyze image data, such as video data, one or more images, etc. The image data may be two dimensional (2D), three dimensional (3D), etc. Image analyzing engine 120 may obtain the image data from imaging device 110, HID 140, network 160, and/or any other device that is capable of providing image data. An image 135 may be generated based on the image data (e.g., by decoding the image data, filtering the image data, and/or processing the image data in any other suitable manner). Image 135 may include a bitmap image, a grayscale image, a color image, a binary image, or any other suitable image. Image 135 may have any suitable size (e.g., have any suitable number of pixels). Image 135 may be further processed and/or analyzed by image analyzing engine 120. For example, image analyzing engine 120 may process and/or analyze image 135 by performing one or more operations described in connection with FIGS. 3-23 below.

Image analyzing engine 120 may include an input/output module 310, an image processing module 320, and a neural network module 330. Other modules, such as a module configured to control imaging device 110 (not shown in FIG. 3), may also be included in image analyzing engine 120. The functions of modules/units of image analyzing engine 120 may be implemented through executing data 252 and/or other data by processing unit 220.

Input/output module 310 may be configured to communicate (e.g., acquire, receive, send, etc.) data for image analyzing engine 120. The data may include image data (e.g., image(s) or video to be analyzed, image 135, information 138, etc.), temporary data generated by image analyzing engine 120, instructions for operating image analyzing engine 120 and/or its modules/units, etc. The data may be acquired/received from or send to imaging device 110, HID 140, or network 160. Within a computing device 200, the data may be acquired/received from or send to storage device 250, I/O port 260, communication port 270, processing unit 220, or RAM 240 through bus 210.

Image processing module 320 may be configured to process image data. The image data may be acquired and/or received through input/output module 310. Image processing module 320 may generate an image 135 based on the image data using one or more image processing techniques. The image processing techniques may include, for example, format converting, cropping, snapshotting, scaling, denoising, rotating, recoloring, subsampling, background elimination, normalization, or the like, or any combination thereof. Image processing module 320 may further process image 135 to generate one or more feature vectors that may be used as the input of a neural network.

A feature vector may be generated by extracting corresponding features from, or perform a series of procedures upon, an image (e.g., image 135) and/or a feature vector (e.g., a feature vector generated based on image 135). For illustration purposes, the feature vectors to be processed by neural network module 330 may be defined as preliminary feature vectors and the corresponding features may be referred to as preliminary features (e.g., color-based feature vectors, texture-based feature vectors, normalization-based feature vectors, gradient-based feature vectors, etc.). The feature vectors obtained by processing preliminary feature vectors through neural network module 330 may be referred to as deep feature vectors and the corresponding features may be referred to as deep features. In some embodiments, a feature vector may be viewed as an image or a plurality of stacked images. A feature vector may have a width and height corresponding to its coordinate information (as shown in FIG. 9-a).

In some embodiments, one or more feature vectors may be generated by performing one or more operations described in connection with FIGS. 5-9-b below.

Image processing module 320 may be configured to obtain preliminary feature vectors based on image 135. The preliminary feature vectors may then be processed by neural network module 330 to obtain deep feature vectors.

In some embodiments, image processing module 320 may generate one or more sub-images based on image 135. Each of the sub-images may include one or more portions of image 135. Each of the sub-images may have any suitable size (e.g., including any number of pixels) and/or shape. The sub-images may correspond to different portions of image 135. In some embodiments, image processing module 320 may generate one or more preliminary feature vectors based on each sub-image. The preliminary feature vectors may be used as input of a neural network.

Image preprocessing module 320 may generate a standard version of input image 135 from the initial version through a further preprocessing procedure to fulfill the format standard of neural network module 330. Image processing module 320 may be discussed in more detail in connection with FIGS. 5 and 6 below.

Neural network module 330 may be configured to construct one or more neural networks and process preliminary feature vectors and/or input image 135 through the neural network.

The neural network may be determined in multiple ways. In some embodiments, the neural network may be constructed and trained by neural network module 330. In some embodiments, an untrained or half-trained neural network may be inputted into image analyzing engine 120 through HID 140 or network 160, and neural network module 330 may train and/or optionally modify this neural network. In some embodiments, a trained neural network may be inputted into image analyzing engine 120 through HID 140 or network 160.

The neural network obtained may include a feature extraction part and an output generation part. The feature extraction part may extract deep features based on one or more preliminary feature vectors and/or generate one or more deep feature vectors. The output generation part may further process the obtained feature vectors and generate the output of the whole neural network. Each part of the neural network may be viewed as one sub-neural network or a plurality of sub-neural networks. In the present disclosure, the term "sub-neural network" may refer to a neural network that serves as a building block of a more complex neural network, or represents a local neural network (certain connected layers) of a bigger neural network.

The feature extraction part may include one or more sub-neural networks belonging to one or more convolutional neural networks, which may be referred to herein as "CNNs." The CNNs may or may not be independent from each other. The CNNs may be same or different with respect to the number of layers, the size of each of the layers, kernel parameters, etc. One CNN may process one or more preliminary feature vectors. In some embodiments, multiple CNNs may be dedicated to process specific preliminary feature vectors. For example, a particular CNN may be dedicated to process a particular preliminary feature vector. A deep feature vector may be obtained at the last layer of each CNN.

In some embodiments, one or more functions of CNN are described in connection with FIGS. 8-10 below.

The output generation part may also be referred to herein as output generating sub-neural network. The sub-neural network is also referred herein as "ONN." An ONN may include one or more layers. An input layer of ONN may be connected to the last layer(s) of one or more CNNs and receive the same number of deep feature vectors. The output of the whole neural network may be generated by the output layer of the ONN. Based on the configuration of the ONN, the output may be various. The output may represent a match result, a category property, one or more desired values (e.g., the yaw angle and pitch angle), etc. In some embodiments functions of ONN may be described in connection with FIGS. 11, 13a, and 13b below.

Neural network module 330 and the neural network may be described in connection with FIGS. 7, 8-13, and 16-18.

Figure 4:
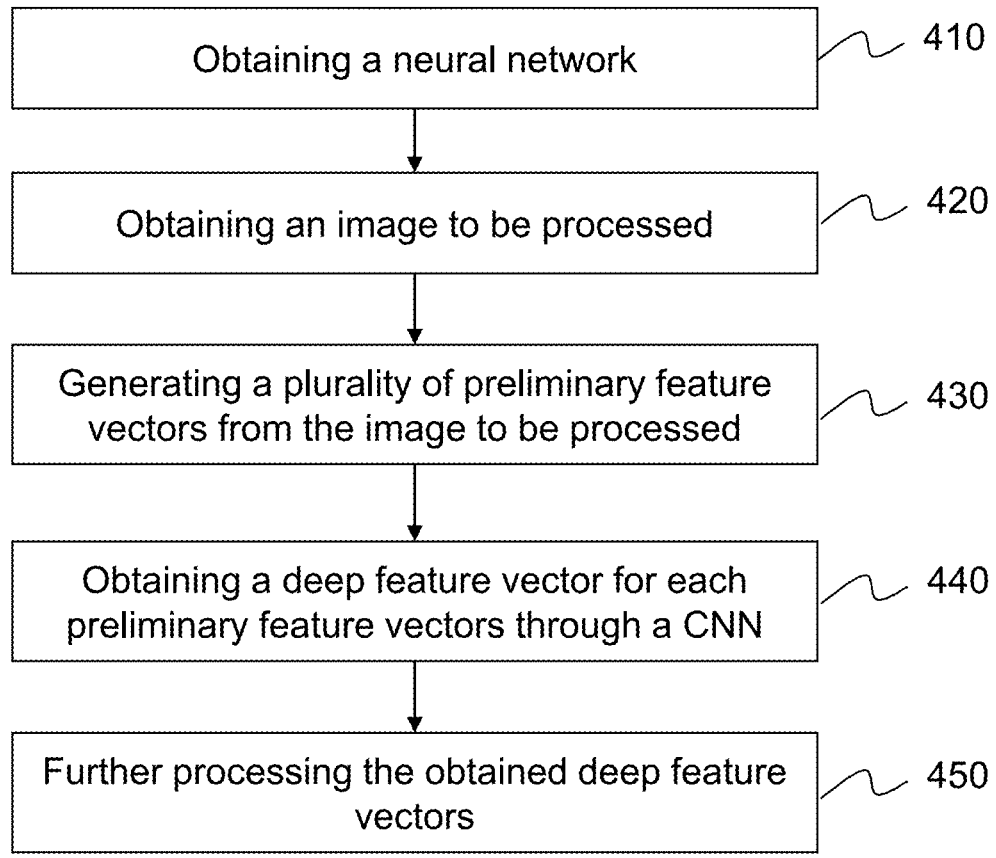
FIG. 4 illustrates a flowchart of an exemplary process for image processing according to some embodiments of the present disclosure.

FIG. 4 illustrates a flowchart of an exemplary process for image processing according to some embodiments of the present disclosure. Process 400 may be executed by information processing system 100. For example, process 400 may be implemented as a set of instructions (e.g., an application) stored in a storage device in image analyzing engine 120. Image analyzing engine 120 may execute the set of instructions and may accordingly be directed to perform process 400 in the information processing system 100.

In 410, a neural network may be obtained. The obtained neural network may be used by neural network module 330 for processing preliminary feature vectors and/or images. Step 410 may be performed by input/output module 310 and/or neural network module 330 in image analyzing engine 120.

In some embodiments, a trained neural network may be directly obtained by input/output module 310. This trained neural network may be packaged as a software module expansion pack, a downloadable content, an upgrade patch, or the like.

In some embodiments, input/output module 310 may obtain an untrained, a half-trained, and/or a completely trained neural network, which may then be optionally modified and trained by neural network module 330. This neural network may also be packaged as a software module expansion pack, a downloadable content, an upgrade patch, or the like. In some embodiments, before applying the neural network for usage, it may be trained or tuned.

In some embodiments, neural network module 330 may construct and train a neural network. Neural network module 330 may build the neural network from the beginning, starting from a single neural unit. A plurality of single neural units may then be connected to construct the desired neural network. Some tools/modules/software may be provided for generating neural units and connecting neural units. The training may be carried out during or after the construction.

In some embodiments, a plurality of sub-neural networks, e.g., CNNs and the output generation sub-neural network, may be generated starting from neural units. The required neural network may be constructed by connecting the sub-neural networks. The sub-neural networks may be trained before or during the connecting. In some embodiments, a plurality of trained, half-trained, or untrained sub-neural networks may be directly obtained by input/output module 310, or be generated automatically or semi-automatically by some tools/modules/software. The construction of the required neural network may start with the sub-neural networks instead of neural units. In some embodiments, a plurality of CNNs may be obtained at first, then new layers may be added at the end of the CNNs to build the required neural network.

The training of the neural network may be carried out part by part. For example, the CNNs may be trained first and then the output generation network may be trained afterwards. In some embodiments, only part of the neural networks may be trained. In some embodiments, the whole neural network may be trained. In some embodiments, after the training has been carried out, one or more CNNs may be optionally tuned. In some embodiments, constructions of a neural network may be described in connection with FIGS. 8 to 18 below.

In 420, an input image including a human face may be obtained. In some embodiments, the input image may be obtained from the image or video to be analyzed. Image 135 may be generated from the image or video to be analyzed.

The image or video to be analyzed may be obtained by input/output module 310. Then a preprocessing procedure may be carried out by image processing module 320. The preprocessing procedure may include cropping, snapshotting, scaling, denoising, rotating, recoloring, subsampling, background elimination, normalization, or the like, or any combination thereof. For example, image 135 may be obtained by cropping a certain area of the image to be analyzed; image 135 may be obtained from a frame of the video to be analyzed, etc. In some embodiment, a plurality of sub-images may be obtained from image 135. Each sub-image may be a different part of image 135. The sub-images may all be processed in the following steps and processed by a neural network.

In 430, one or more preliminary feature vectors may be generated based on the input image (e.g., image 135 or the sub-images obtained from image 135). Step 430 may be performed by image processing module 320. The preliminary feature vectors may be obtained by extracting a certain feature from image 135 or its sub-images. Depending on image quality, light condition, task the neural network may solve, or the like, or any combination thereof, different preliminary feature vectors may be obtained at step 430.

A preliminary feature vector may be a feature descriptor of an object. The preliminary feature vectors may include color-based feature vectors (e.g., RGB vectors, greyscale vectors, etc.), texture-based feature vectors (e.g., Local Binary Pattern (LBP) feature vectors, etc.), normalization-based feature vectors (e.g., illumination normalized feature vectors, color normalized feature vectors, etc.), gradient-based feature vectors (e.g., histogram of oriented gradients (HOG) feature vector, gradient location and orientation histogram (GLOH) feature vector, etc.), or the like, or any combination thereof. The preliminary feature vectors may be obtained by image processing module 320.

Preliminary feature vectors may be generated by extracting corresponding features from, or performing a series of procedures upon, image 135, or any other feature vectors generated based on image 135. For example, a normalization-based feature vector may be generated by performing one or more normalization procedures upon a color-based feature vector generated based on image 135. In some embodiments, an image 135 may be used directly as a color-based feature vector. For example, image 135 of RGB formatting may be directly used as an RGB vector. In some embodiments, Preliminary feature vectors and their generation may be discussed in more detail in connection with FIG. 5 below.

In some embodiments, more than one feature vectors may be generated during one feature extracting process. For example, during the extracting of HOG feature, a feature vector representing the gradient amplitude and a feature vector representing the direction of the gradient may be generated from image 135. The two feature vectors may be stacked as one preliminary feature vector and then served as an input of a CNN.

In some embodiments, the color-based feature vector (may be image 135 itself), a texture-based feature vector, a normalization-based feature vector, and a gradient-based feature vector may be obtained from image 135 for further processing.

In some embodiments, the color-based feature vector, a first texture-based feature vector, and a second texture-based feature vector may be obtained from image 135 for further processing.

In some embodiments, a plurality of sub-images may be obtained from image 135. In a more particular example, a color-based feature vector and a normalization-based feature vector may be obtained from each sub-images for further processing.

It may be noticed that, in the embodiments of the present disclosure, optionally, the sub-images may be generated and preliminary feature vectors may be extracted from each sub-image. Preliminary feature vectors representing other features not mentioned in the present disclosure may also be obtained by a person of ordinary skill in the art and further processed by certain CNNs.

In some embodiments, preliminary feature vectors and their generation may be described in connection with FIG. 5 below.

In 440, one or more deep feature vectors may be obtained based on the preliminary feature vector(s) using the neural network. As mentioned above, the neural network may include a plurality of CNNs, and each CNN may process a certain preliminary feature vector. For example, a CNN may be configured to process the normalization-based feature vector. In some embodiments, functions of CNN may be described in connection with FIGS. 8 to 10-c below.

In some embodiments, the color-based feature vector, the texture-based feature vector, and the gradient-based feature vector may be processed by three CNNs, respectively. The obtained deep features may be further processed by the output generation part of the neural network.

In some embodiments, a color-based feature vector, a first texture-based feature, and a second texture-based feature vector may be processed by three CNNs, respectively. The obtained deep features may be further processed by the output generation part of the neural network.

In some embodiments, a plurality of sub-images may be obtained from image 135, a color-based feature vector and a normalization-based feature vector may be obtained from each sub-image. The neural network may include a first plurality of CNNs to process color-based feature vectors and a second plurality of CNNs to process normalization-based feature vectors. There may be a one-to-one correspondence between the color-based feature vectors and the first plurality of CNNs. There may also be a one-to-one correspondence between the normalization-based feature vectors and the second plurality of CNNs. The normalization-based feature vector and the color-based feature vector may be obtained from each sub-image. The obtained deep features vectors may be further processed by the output generation part of the neural network.

In 450, the obtained deep feature vectors may be further processed and the output of the whole neural network may be generated. Based on the nature of the output generation sub-neural network, the deep feature vectors may be processed by different output generation sub-neural networks and different outputs may be obtained accordingly.

In some embodiments, a match score may be generated from the obtained deep feature vectors. The match score may determine a similarity degree between targets (e.g., a human face, a fingerprint, etc.) on different images.

In some embodiments, a feature vector may be generated from the obtained deep feature vectors. The feature vector may be used for face recognition or memorization of an artificial intelligent device.

In some embodiments, one or more values may be generated from the obtained deep feature vectors. The value(s) may reflect some facial features (e.g., yaw angle, pitch angle, possible age, possible race, etc.). In some embodiments, the values may be a category property being used for classify the face included in image 135.

During the steps mentioned above, image 135, the final results, and other data or images generated during the whole image analyzing process may be sent to HID 140, identifying system 150, network 160 by input/output module 310 for displaying or saving. Within computing device 200, the images and data may be sent to storage device 250, RAM 240, processing unit 220, I/O port 260, and/or communication port 270 by input/output module 310 through bus 210.

Figure 5:
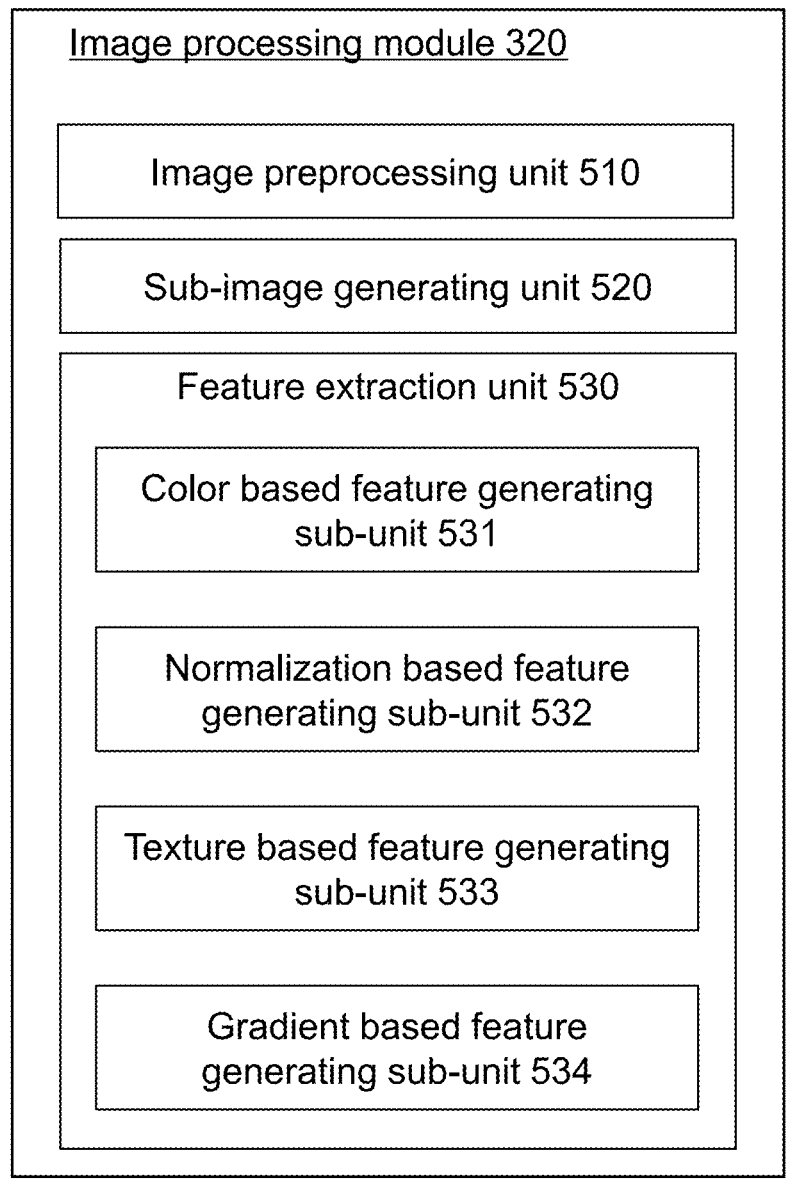
FIG. 5 illustrates a block diagram of an exemplary image processing module according to some embodiments of the present disclosure.

FIG. 5 illustrates a block diagram of an exemplary image processing module according to some embodiments of the present disclosure. Image processing module 320 may include an image preprocessing unit 510, a sub-image generating unit 520, and a feature extraction unit 530.

Image preprocessing unit 510 may obtain an input image (image 135) from images or videos to be analyzed. Image preprocessing unit 510 may preprocess the images or videos. The preprocessing may include format converting, cropping, snapshotting, scaling, denoising, rotating, recoloring, sub-sampling, background elimination, normalization, or the like, or any combination thereof. After the preprocessing, the obtained image 135 may generate sub-images and/or preliminary feature vectors. In some embodiments, image 135 may be used directly as a color-based feature vector. In some embodiments, an image to be analyzed may be directly used as image 135 and image preprocessing unit 510 may be optional.

In some embodiments, during the image preprocessing process, a region of interest (e.g., eyes in a human face) may be recognized and located. Optionally, image preprocessing unit 510 may recognize and locate part of the face to determine an area where eyes are searched for. The eyes searching may be based on color, morphology, topology, anatomy, symmetry, experience, or the like, or any combination thereof. A preprocessed version of image 135 may be used for the eyes searching. After the eyes are located, the image (image 135 or any other image generated therefrom) may be scaled based on the distance between the eyes and/or the size of the face. Then the image may be cropped to a predetermined size based on the location of the eyes to obtain image 135 or a temporary image which may generate image 135.

Sub-image generating unit 520 may obtain a plurality of sub-images from image 135. The sub-images may be different parts of image 135. The two of the sub-images may be overlapping parts, partially overlapping parts, or separated apart (as shown in FIG. 9-b) in image 135. In some embodiments, the sub-images may be obtained based on the location of eyes or other organs. In some embodiments, the sub-images may be obtained according to a plurality of predetermined coordinate ranges of image 135. In some embodiments, the sub-images may be generated according to the pixel value distribution of image 135, e.g., a histogram. Sub-image generating unit 520 may be optional in some embodiments.

Feature extraction unit 530 may obtain one or more preliminary feature vectors based on image 135 and/or the sub-images generated based on image 135. Feature extraction unit 530 may include one or more of subunits for generating various features and/or feature vectors based on image data. For example, as illustrated in FIG. 5, feature extraction unit 530 may include a color-based feature generating subunit 531, a normalization-based feature generating subunit 532, a texture-based feature generating subunit 533, a gradient-based feature generating sub-unit 534, etc. Additional subunits may also be incorporated into feature extraction unit 530 for generating preliminary feature vectors of other kind (not shown in FIG. 5, e.g. geometry-based features vectors, statistic-based feature vectors, etc.) based on image data.

Color-based feature generating sub-unit 531 may generate one or more preliminary feature vectors (may be referred to as color-based feature vectors) based on image data by extracting color related features. A color-based feature vector may descript the color of one or more pixels of the image data in any suitable color space (e.g., RGB feature, greyscale, RGBA, CIE XYZ, CMYK, HSL, HSV, Munsell, NCS, OSA-UCS, Coloroid, etc.). The extraction may be performed on a certain type of images, images of different formats, images using different color systems, compressed images, or the like, or any combination thereof. The function of color-based feature generating sub-unit 531 may be referred to as format conversion in some particular embodiments.

In some embodiments, color-based feature generating sub-unit 531 may be configured to extract the RGB feature from an image (e.g., image 135) and generate a preliminary feature vector (may also be referred to as an RGB vector) correspondingly. Additionally or alternatively, color-based feature generating sub-unit 531 may be configured to extract the greyscale feature from an image (e.g., image 135) or a color-based feature vector (e.g., an RGB vector) and generate a preliminary feature vector (may also be referred to as a greyscale vector) correspondingly. In some embodiments, color-based feature generating sub-unit 531 may be configured to extract other color-based features (e.g., CIE XYZ, CMYK, HSL, HSV, Munsell, NCS, OSA-UCS, Coloroid, etc.) from an image (e.g., image 135) and generate a preliminary feature vector correspondingly (e.g., a CIE XYZ vector, a CMYK vector, an HSL vector, an HSV vector, a Munsell vector, an NCS vector, a OSA-UCS vector, a Coloroid vector, etc.).

In some embodiments, color-based feature generating sub-unit 531 may generate one or more RGB vectors based on image data. An RGB vector may be referred to as an RGB image in some particular embodiments. The basic data unit of the RGB vector may be referred to as a pixel. The pixel of the RGB vector may include three pixel values and optionally other value(s) or data. Each pixel value may specifically relate to one of the three color channels: Red, Green, and Blue. So an RGB vector may also be viewed as three feature vectors representing three color channels stacked together (for example, a three-layered feature vector). An RGB bitmap image may be directly used as an RGB vector, or be optionally normalized by color-based feature generating sub-unit 531 to generate an RGB vector. An image of other format and/or of other color system may be processed by color-based feature generating sub-unit 531 (e.g., format conversion) to generate an RGB vector.

In some embodiments, color-based feature generating sub-unit 531 may generate one or more greyscale vectors based on image data, or another color-based feature vector (e.g., an RGB vector). A greyscale vector may be referred to as a greyscale image in some particular embodiments. The basic data unit of the greyscale vector may also be referred to as a pixel. The pixel of the greyscale vector may include a pixel value, and optionally other value(s) or data. The pixel value may relate to the color intensity or illumination intensity of the greyscale vector (or image). So a greyscale vector may be a mono-layered feature vector. A greyscale bitmap image may be directly used as a greyscale vector, or be optionally normalized by color-based feature generating sub-unit 531 to generate a greyscale vector. An image of other format and/or of other color system may be processed by feature generating sub-unit 531 (e.g., format conversion) to generate a greyscale vector.

Normalization-based feature generating sub-unit 532 may generate one or more preliminary feature vectors (may be referred to as normalization-based feature vectors) by performing one or more normalization (e.g., color normalization or illumination normalization) related procedures upon image data. A normalization-based feature vector may enhance or preserve essential elements of visual appearance (e.g., edges, corners, etc.) of the object (e.g., a human face) represented by image data as well as to counter the effects of the imaging condition variations (e.g., illumination condition, shadowing, highlight, hue/saturation, etc.). The normalization may be performed upon a certain type of images, images of different formats, images using different color systems, compressed images, color-based feature vectors, or the like, or any combination thereof.

In some embodiments, normalization-based feature generating sub-unit 532 may generate one or more illumination normalized feature vectors based on image 135 or a color-based feature vector generated based on image 135. For example, an illumination normalized feature vector may be generated based on a greyscale vector of an image (or a grayscale image). More particularly, for example, normalization-based feature generating sub-unit 532 may perform a contrast optimization (e.g., a Gamma correction) on the greyscale image and/or greyscale vector to generate a corrected vector. The contrast optimization may be performed to enhance the local dynamic range of the image in dark or shadowed regions, and to compress the local dynamic range in bright regions and at highlights. In some embodiments, the corrected vector may be generated based on the equation below:

$$I' = \begin{cases} I^\gamma, & \gamma \in (0, 1] \\ \log(I), & \gamma = 0 \end{cases}, \quad (1)$$

where I may represent pixel value(s) of the greyscale vector and/or greyscale image; I' may represent the corrected vector; and γ is a Gamma parameter. γ may be a predefined value. γ may have any suitable value. For example, the value of γ may fall within a predetermined range (e.g., [0,1] or any other range). In a more particular example, γ may fall within a range of [0.05,0.5]. In another more particular example, γ may fall within a range of [0.1,0.3]. In some embodiments, γ may be 0.2 or any other suitable value.

In some embodiments, normalization-based feature generating sub-unit 532 may further process the corrected vector using one or more feature enhancement algorithms and/or corner detection techniques. For example, a difference of Gaussian (DoG) filter may be performed to the corrected vector to generate a filtered vector. In some embodiments, the filtered vector may be generated based on the equation below:

$$I_d = (G(x,y,\sigma_1) - G(x,y,\sigma_0)) * I', \quad (2)$$

where $I_d$ may represent the filtered vector; I' may represent the corrected vector; and G may represent a Gaussian function. In some embodiments, function G may be expressed as:

$$G(x, y, \sigma) = \frac{1}{\sqrt{2\pi}\,\sigma} e^{\frac{-(x^2+y^2)}{2\sigma^2}}, \quad (3)$$

where x may represent a distance between a given point and a reference point in the filter in the x direction; and y may represent a distance between the given point and the reference point in the y direction. The reference point may be the central point of the filter or a point near the central point (e.g., within a 1-2 pixel distance). "*" may be a convolution operator. $\sigma_0$ and $\sigma_1$ may be Gaussian variances. $\sigma_0$ and $\sigma_1$ may be predefined values. $\sigma_0$ and $\sigma_1$ may have any suitable values. For example, the value of $\sigma_0$ may fall within a predetermined range (e.g., (0,1] or any other range), the value of $\sigma_1$ may fall within another predetermined range (e.g., [2,4] or any other range). In a more particular example, $\sigma_0$ may fall within a range of [0.5,1], $\sigma_1$ may fall within a range of [2,3]. In some embodiments, $\sigma_0$ may be 1.0 or any other suitable value, $\sigma_1$ may be 2.0 or any other suitable value.

In some embodiments, the filtered vector may be masked to generate a masked vector. For example, one or more masks may be applied to the filtered vector to remove data that may be irrelevant to a face image (e.g., data corresponding to hairs, facial hairs, etc.).

In some embodiments, normalization-based feature generating sub-unit 532 may normalize the filtered vector and/or the masked vector to generate a normalized vector. For example, a contrast equalization may be carried out on the masked vector (or the filtered vector if the masking is skipped). The contrast equalization may globally rescale the image intensities to standardize a measure of overall contrast or intensity variation. In some embodiments, the median of the absolute value may be used for contrast equalization. In some embodiments, a process indicated below may be performed for contrast equalization. The process may be expressed as:

$$I(x, y) = \frac{I(x, y)}{(\text{mean}(|I(x', y')|^a))^{\frac{1}{a}}}, \quad (4)$$

$$I(x, y) = \frac{I(x, y)}{(\text{mean}(\min(\tau, |I(x', y')|^a)))^{\frac{1}{a}}}, \quad (5)$$

where (x,y) may represent the coordinate of any pixel. (x', y') may represent the coordinate of any pixel of the unmasked part of the vector. In some embodiments, the masking may not be carried out, then (x',y') may be replaced by (x,y). Function I may return the pixel value of the inputted point. a may be a compressive exponent having a predefined value. For example, the value of a may fall within a predetermined range (e.g., (0,1] or any other range). In a more particular example, a may fall within a range of [0.05,0.5]. In another more particular example, a may fall within a range of [0.08,0.2]. $\tau$ may be a predetermined threshold having a predefined value. For example, the value of may $\tau$ fall within a predetermined range (e.g., [1,50] or any other range). In a more particular example, may fall within a range of [5, 20]. In some embodiments, a may be 0.1 or any other suitable value, and may be 10 or any other suitable value. After the contrast equalization, there may still be extreme values in the resultant vector. The resultant vector may be processed with a nonlinear function. In some embodiments, the nonlinear function which may be expressed as:

$$I(x, y) = \lambda \tanh \frac{I(x, y)}{\lambda}, \quad (6)$$

where $\lambda$ may be a coefficient. $\lambda$ may be a predefined value. $\lambda$ may have any suitable value. For example, the value of $\lambda$ may fall within a predetermined range (e.g., [5,20] or any other range). In some embodiments, $\lambda$ may be 10 or any other suitable value. In some embodiments, $\lambda$ and $\tau$ may be set with the same value.

In some embodiments, normalization-based feature generating sub-unit 532 may generate an illumination normalized feature vector 620 as illustrated in FIG. 6. As shown, illumination normalized feature vector 620 may be generated based on a corresponding greyscale vector 610.

In some embodiments, normalization-based feature generating sub-unit 532 may generate an illumination normalized feature vector by performing illumination normalization according to the methods described in Enhanced Local Texture Feature Sets for Face Recognition under Difficult Lighting Conditions, IEEE transactions on image processing, 2010, 19(6): 1635-1650. This method is integrated into the present disclosure for illustration purposes. None or minor modifications may be applied to the original method to generate one or more illumination normalized feature vectors.

Texture-based feature generating sub-unit 533 may generate one or more preliminary feature vectors (may be referred to as texture-based feature vector) by extracting one or more texture based features from image data. A texture-based feature vector may be associated with the texture information or property of the image data. The extraction may be performed upon a certain type of images, images of different formats, images using different color systems, compressed images, color-based feature vectors, or the like, or any combination thereof.

Texture-based feature generating sub-unit 533 may be configured to extract one or more types of texture-based features from a color-based feature vector (e.g., an RGB vector, a greyscale vector) and generate one or more corresponding preliminary feature vectors. In some embodiments, texture-based feature generating sub-unit 533 may generate a first texture-based feature vector, a second texture-based feature vector, a third texture-based feature vector, and so on. In some embodiments, each of the texture-based feature vectors may be generated by performing one or more operations described in connection with equations 7-18 below. While three types of texture-based feature vectors are described herein, this is merely illustrative. Texture-based feature generating sub-unit 533 may generate any suitable number of texture-based feature vectors that may represent one or more texture features of one or more images.

In some embodiments, texture-based feature generating sub-unit 533 may generate one or more texture-based feature vectors by determining one or more local binary patterns (LBP) features of image data. Each of the LBP features may be an image descriptor which may be used for texture classification. In some embodiments, a LBP feature may be determined based on a color-based feature vector (e.g., an RGB vector, greyscale vector).

In some embodiments, one or more LBP vectors may be generated based on the LBP features, for example, by performing one or more operations described in connection with equations 7-10. In some embodiments, other LBP features may also be determined to generate texture-based feature vectors. These LBP features may include, for example, over-complete LBP (OCLBP), transition LBP (tLBP), direction coded LBP (dLBP), modified LBP (mLBP), multi-block LBP, volume LBP (VLBP), RGB-LBP, or the like, or any combination thereof.

For example, during the LBP feature extraction, texture-based feature generating sub-unit 533 may obtain an LBP value of a pixel (also referred to herein as the "central pixel") based on a plurality neighboring pixels around the central pixel.

In some embodiments, the neighboring pixels may be the points evenly distributed on a circle centered at the central pixel point. The coordinates of a neighboring pixel $P_i(x_i, y_i)$ may be expressed as:

$$x_i = x_c - R \sin\left(\frac{2\pi i}{N}\right), \quad (7)$$

$$y_i = y_c + R \cos\left(\frac{2\pi i}{N}\right), \quad (8)$$

where $(x_c, y_c)$ may represent coordinates of the central pixel. N may represent the number of the neighboring pixels. N may be a predefined value. N may have any suitable value (e.g., 4, 5, 6, 7, 8, 9, etc.). i may represent an integer fall within the range of [0, N−1]. R may represent the radius of the circle. R may be a predefined value. R may have any suitable value. For example, the value of R may fall within a predetermined range (e.g., [1.0, 3.0] or any other range). FIG. 7-*a* illustrates a diagram of an exemplary central pixel 710 and the corresponding neighboring pixels (e.g., pixel 720) with R=2.0 and N=8.

In some embodiments, the neighboring pixels may be the pixels around the central pixel in a square array of pixels. FIG. 7-*b* illustrates a diagram of an exemplary central pixel 750 and its corresponding neighboring pixels (e.g., pixel 760) in a 3*3 square array of pixels.

Other methods for obtaining neighboring pixels may also be applicable.

In some embodiments, the LBP value of a pixel $P_c$ (central pixel) may be obtained with function/operator LBP expressed as:

$$LBP(P_c) = \sum_{i=0}^{N-1} s(I_i, I_c) \times 2^i, \quad (9)$$

where $I_c$ may represent the pixel value of $P_c$, $I_i$ may be the pixel value of a neighboring pixel $P_i$, N may represent the number of the neighboring pixels (e.g., 8), i may represent an integer fall within the range of [0, N−1]. Function s may be expressed as:

$$s(I_i, I_c) = \begin{cases} 1, & I_i \geq I_c \\ 0, & I_i < I_c \end{cases}, \quad (10)$$

The pixel value $I_i$ of a neighboring pixel $P_i$ may be determined by the pixel $I_i$ falling into or estimated by interpolation. Texture-based feature generating sub-unit 533 may perform function LBP upon the pixels of the greyscale vector convolutionally and generate a texture-based feature vector.

In some embodiments, as the neighboring pixels of the pixels may locate outside the greyscale vector, the LBP feature extracting may not be performed upon the pixels at or near the edge of the original greyscale vector. A decreased-sized texture-based feature vector may be obtained as a result. In the present disclosure, a size of a feature vector may relate to the width and height of this vector (as shown in FIG. 9-*a*).

In some embodiments, texture-based feature generating sub-unit 533 may pad the input vector with zeroes and/or other values on its border to control the size of the output vector. The obtained texture-based feature vector and the original greyscale vector may share the same size (e.g., with the same width and the same height).

In some embodiments, texture-based feature generating sub-unit 533 may generate one or more texture-based feature vectors by determining one or more local directional patterns (LDP) features representing based on image data (e.g., a color-based feature vector). For example, texture-based feature generating subunit 533 may determine one or more LDP features by determining directional edge responses for a pixel of an image in multiple directions. Subunit 533 may then compare the directional edge responses and determine a code (e.g., a binary code) for the pixel based on the comparison. In some embodiments, one or more LDP feature vectors may be generated based on edge response values in eight directions and/or any other suitable number of directions. In some embodiments, one or more LDP feature vectors may be generated by performing one or more operations described in connection with equations 11-13 below.

The method for generating the texture-based feature vector by extracting LDP feature is described herein, this is merely illustrative. Texture-based feature generating sub-unit 533 may generate LDP feature by using any suitable methods.

For example, a texture-based feature vector may be generated based on a greyscale vector of an image (or a greyscale image). During the LDP feature extraction, texture-based feature generating sub-unit 533 may obtain an LDP value of a pixel based on a plurality of neighboring pixels around it. The pixel may be referred to herein as "the central pixel" based on a plurality neighboring pixels around the central pixel. The neighboring pixels may be, for example, the pixels around the central pixel in a square array of pixels.

In some embodiments, texture-based feature generating sub-unit 533 may find the maximum edge strength of the central pixel in a few predetermined directions using an edge detector (e.g., a Kirsch operator). In some embodiments, a set of Kirsch masks may be applied by Kirsch operator. For example, an eight-directional Kirsch operator may be used and this Kirsch operator may apply eight Kirsch masks. The pixel square array and the Kirsch masks may share the same size. FIG. 8 illustrates a diagram of exemplary eight-directional 3*3 Kirsch masks.

In some embodiments, a vector $V_K$ may be obtained with:

$$V_K = |\{V_0, V_1, \ldots, V_n\}| = \{|I_G \cdot M_0|, |I_G \cdot M_1|, \ldots |I_G \cdot M_n|\}, \quad (11)$$

where $I_G$ may represent the pixel square array, $M_0$, $M_1, \ldots, M_n$ may represent a total number of n+1 Kirsch masks. The Kirsch masks may be arranged in a predetermined sequence.

In some embodiments, the kth maximum value of $V_K$, $V_{kMAX}$, may be determined. k may be an integer falling within the range [1, n+1]. In a more particular example, a may fall within a range of [0.05,0.5]. In another more particular example, a may fall within a range of [0.08,0.2]. For example, when n is 7, k may fall within the range of [1, 8]. In a more particular example, when n is 7, k may fall within a range [2, 4]. In some embodiments, n may be 7, and k may be 3 or any other suitable value.

In some embodiments, the LDP value of the central pixel of $I_G$ may be obtained with function/operator LDP expressed as:

$$LDP(P_c) = \sum_{i}^{n} s(V_i, V_{kMAX}) \times 2^i, \quad (12)$$

where $P_c$ may represent the central pixel of $I_G$, i may represent an integer fall within the range of [0, n]. Function s may be expressed as:

$$s(V_i, V_{kMAX}) = \begin{cases} 1, & V_i \geq V_{kMAX} \\ 0, & V_i < V_{kMAX} \end{cases}, \quad (13)$$

Texture-based feature generating sub-unit 533 may process the pixels of the greyscale vector convolutionally based on equations 12 and 13 and generate a texture-based feature vector.

In some embodiments, the LDP feature extracting may not be performed upon the pixels at or near the edge of the original greyscale vector as the neighboring pixels of the pixels may locate outside the greyscale vector. A decreased-sized texture-based feature vector may be obtained as a result.

In some embodiments, texture-based feature generating sub-unit 533 may pad the input vector with zeroes and/or other values on its border to control the size of the output vector. The obtained texture-based feature vector and the original greyscale vector may share the same size (e.g., with the same width and the same height).

Other Kirsch masks, e.g., eight-directional 5*5 Kirsch masks or other kinds of Kirsch masks operators may also be used in some embodiments.

In some embodiments, texture-based feature generating sub-unit 533 may generate one or more of LDP features and/or LDP feature vectors by performing one or more operations described in Local Directional Pattern (LDP) for Face Recognition, IEEE International Conference on Consumer Electronics, 2010: 329-330.

In some embodiments, texture-based feature generating sub-unit 533 may generate one or more texture-based feature vectors by performing one or more local ternary patterns (LTP) feature extraction related procedures (original version or modified version) upon a color-based feature vector (e.g., RGB vector, greyscale vector). LTP feature may be generated according to Enhanced Local Texture Feature Sets for Face Recognition under Difficult Lighting Conditions, IEEE transactions on image processing, 2010, 19(6): 1635-1650. This method is integrated into the present disclosure for illustration purposes, none or minor modifications may be applied to the original method to generate one or more LTP feature. LTP feature may be an extension of LBP feature.

The method for generating the texture-based feature vector by extracting LTP feature is described, this is merely illustrative. Texture-based feature generating sub-unit 533 may generate LTP feature by using any suitable methods.

For example, a texture-based feature vector may be generated based on a greyscale vector of an image (or a greyscale image). During the LTP feature extraction, texture-based feature generating sub-unit 533 may obtain two LTP values of a pixel based on a plurality of neighboring points around it. The pixel may be referred to herein as "the central pixel" based on a plurality neighboring pixels around the central pixel. The procedures of obtaining neighboring pixels for LTP feature extraction may be similar to the procedures of obtaining neighboring pixels for LBP feature extraction. In some embodiments, the neighboring pixels may be, for example, the pixels around the central pixel in a 3*3 pixel square array. Other methods for obtaining neighboring pixels may also be used.

In some embodiments, two LTP values of a pixel $P_c$ (central pixel) may be obtained with functions/operators $LTP_1$ and $LTP_2$ expressed as:

$$LTP_1(P_c) = \sum_{i=0}^{N-1} f_1(s(I_i, I_c)) \times 2^i, \quad (14)$$

$$LTP_2(P_c) = \sum_{i=0}^{N-1} f_2(s(I_i, I_c)) \times 2^i, \quad (15)$$

where $I_c$ may represent the pixel value of $P_c$. $I_i$ may represent the pixel value of a neighboring pixel $P_i$. N may represent the number of the neighboring pixels (e.g., 8). i may represent an integer fall within the range of [0, N−1]. The pixel value $I_i$ of a neighboring pixel $P_i$ may be determined by the pixel $P_i$ falls into or estimated by interpolation. Function s may be expressed as:

$$s(I_i, I_c, t) = \begin{cases} 1, & I_i \geq I_c + t \\ 0, & |I_i - I_c| < t, \\ -1, & I_i \leq I_c - t \end{cases} \quad (16)$$

Function $f_1$ may be expressed as:

$$f_1(v) = \begin{cases} 1, & v = 1 \\ 0, & v \neq 1 \end{cases}, \quad (17)$$

Function $f_2$ may be expressed as:

$$f_2(v) = \begin{cases} 1, & v = -1 \\ 0, & v \neq -1 \end{cases}, \quad (18)$$

Texture-based feature generating sub-unit 533 may perform function $LTP_1$ and $LTP_2$ upon the pixels of the greyscale vector convolutionally and generate two feature vectors corresponding to $LTP_1$ values and $LTP_2$ values. The two feature vectors may be stacked to form a two-layered vector, which may serve as a texture-based feature vector.

In some embodiments, as the neighboring pixels of the pixels may locate outside the greyscale vector, the LTP feature extracting may not be performed upon the pixels at or near the edge of the original greyscale vector. A decreased-sized texture-based feature vector may be obtained as a result.

In some embodiments, Texture-based feature generating sub-unit 533 may pad the input vector with zeroes and/or other values on its border to control the size of the output vector. The obtained texture-based feature vector and the original greyscale vector may share the same size (e.g., with the same width and the same height).

Gradient-based feature generating sub-unit 534 may generate one or more preliminary feature vectors (may be referred to as gradient-based feature vector) by extracting one or more gradient based features from image data. A gradient-based feature vector may be associated with the gradient and/or orientation information or property of the image data. The extraction may be performed upon a certain type of images, images of different formats, images using different color systems, compressed images, color-based feature vectors, or the like, or any combination thereof.

Gradient-based feature generating sub-unit 534 may be configured to extract one or more different gradient-based features from a color-based feature vector (e.g., an RGB vector, a greyscale vector) and generate one or more corresponding preliminary feature vectors. In some embodiments, gradient-based feature generating sub-unit 534 may generate a first gradient-based feature vector, a second gradient-based feature vector, a third gradient-based feature vector, and so on. In some embodiments, each of the gradient-based feature vectors may be generated by performing one or more operations described in connection with equations 19-22 below. While three types of gradient-based feature vectors are described herein, this is merely illustrative. Gradient-based feature generating sub-unit 534 may generate any suitable number of gradient-based feature vectors that may represent one or more gradient-based features of one or more images.

In some embodiments, gradient-based feature generating sub-unit 534 may generate one or more gradient-based feature vectors by performing one or more histogram of oriented gradients (HOG) feature extraction related procedures (original version or modified version) upon a color-based feature vector (e.g., an RGB vector, a greyscale vector). HOG feature is a gradient based feature which may count occurrences of gradient orientation in localized portions of an image.

One method for generating the gradient-based feature vector by extracting HOG feature may be described herein for illustration purposes. However, variants of HOG feature and the corresponding extraction techniques may also be used to generate gradient-based feature vectors. These HOG features may include, for example, gradient field HOG (GF-HOG), histogram of oriented residuals (HOR), or the like, or any combination thereof. Alternatively or additionally, none or minor modifications may be applied to the method described herein to generate gradient-based feature vector(s).

For example, a gradient-based feature vector may be generated based on a greyscale vector of an image (or a greyscale image). During the HOG feature extraction, gradient-based feature generating sub-unit 534 may obtain two HOG values of a pixel based on a plurality neighboring pixels around it. The pixel may be referred to herein as "the central pixel" based on a plurality neighboring pixels around the central pixel. In some embodiments, the neighboring pixels may be, for example, the pixels around the central pixel in a 3*3 pixel square array. Other methods for obtaining neighboring pixels may also be used.

In some embodiments, for a pixel $P_c$ (central pixel), its gradient in the x direction $G_x$ and its gradient in the y direction $G_y$ may be obtained with equations expressed as:

$$G_x(x,y)=I(x+1,y)-I(x-1,y), \quad (19)$$

$$G_y(x,y)=I(x,y+1)-I(x,y-1), \quad (20)$$

where (x,y) is the coordinate of pixel $P_e$. Function I may return the pixel value of the inputted pixel. The gradient magnitude and gradient direction of $P_c$ may be obtained with equations expressed as:

$$G(x, y) = \sqrt{G_x(x, y)^2 + G_y(x, y)^2}, \quad (21)$$

$$\theta(x, y) = \arctan\left(\frac{G_x(x, y)}{G_y(x, y)}\right), \quad (22)$$

where function G may return the gradient magnitude of the inputted pixel, function θ may return the gradient direction of the inputted pixel, function arctan may return the arctangent value of its input. Gradient-based feature generating sub-unit 534 may perform function G and θ upon the pixels of the greyscale vector convolutionally and generate two feature vectors corresponding to the gradient magnitude G and direction θ. The two feature vectors may be stacked to form a two-layer vector, which may serve as a gradient-based feature vector.

In some embodiments, the HOG feature extracting may not be performed upon the pixels at or near the edge of the original greyscale vector as the neighboring pixels of the pixels may locate outside the greyscale vector. A decreased-sized gradient-based feature vector may be obtained as a result.

In some embodiments, gradient-based feature generating sub-unit 534 may pad the input vector with zeroes and/or other values on its border to control the size of the output vector. The obtained gradient-based feature vector and the original greyscale vector may share the same size (e.g., with the same width and the same height).

It should be noted that the feature extracting methods described above may be modified by a person of ordinary skills in the art. For example, some parameters may be altered, optional procedures may be added or removed, neighboring pixels determining method may be changed in LBP, LDP, LTP, or HOG feature extraction, alternative Kirsch masks or other kinds of masks may be used in LTP feature extraction, etc. The equations and/or functions illustrated above may also be expressed differently without changing their functions or results.

Feature extraction unit 530 may include other sub-units to extract other preliminary features. The feature extracting methods may be based on geometrical features (e.g., geometrical feature points, curvatures of face contour lines, etc.), statistical feature (e.g., Karhunen-Loève Transform (KLT), Singular Value Decomposition (SVD), etc.), elastic graph matching, support vector machine (SVM), Hidden Markov model (HMM), etc.

FIG. 9-a illustrates an exemplary method for generating preliminary feature vectors according to some embodiments of the present disclosure. Image 900 may be image 135, or an image generated based on image 135 using image preprocessing unit 510.

In some embodiments, image 900 may be processed by one or more sub-units of feature extraction unit 530. One or more preliminary feature vectors (e.g., feature vectors 910-1~910-4) may be generated accordingly. In some embodiments, one or more of the generated preliminary feature vectors may be further processed by feature extraction unit 530 to generate one or more preliminary feature vectors. A preliminary feature vector may be a mono-layer vector (with a depth as 1, e.g., a texture-based feature vector generated by determining an LBP feature) or a multi-layer vector (with a depth more than 1, e.g., a gradient-based feature vector generated by determining an HOG feature).

In some embodiments, multiple preliminary feature vectors may be of the same size (e.g., with the same width and the same weight). Multiple preliminary feature vectors of the same size may be stacked to form a combined preliminary feature vector 920. A combined preliminary feature vector may be processed by one or more CNNs to obtain one or more corresponding deep feature vectors. For example, multiple preliminary feature vectors of the same size-based feature vector and greyscale vector may be stacked to form a combined preliminary feature vector. In some embodiments, a combined preliminary feature vector 920 is not be formed and each preliminary feature vector may be processed by one CNN to obtain one corresponding deep preliminary feature. In some embodiments, all of the obtained preliminary feature vectors may be stacked to form one combined preliminary feature vector, which may be processed by one CNN to obtain one deep preliminary feature. In some embodiments, a plurality of combined preliminary feature vectors may be obtained.

In some embodiments, image 900 itself may serve as a color-based feature vector (e.g., an RGB vector, a greyscale vector, or any other color related feature vector). Image 900 may also be stacked with the one or more obtained preliminary feature vectors to form one or more combined preliminary feature vector.

FIG. 9-b illustrates another exemplary method for generating feature vector according to some embodiments of the present disclosure. Additional to the procedures described in FIG. 9-a, image 900 may be processed with sub-image generating unit 520 to form a plurality of sub-images (e.g., sub-images 930-1~910-4). Each sub-image may be processed with a plurality of sub-units of feature extraction unit 530 to obtain a plurality of preliminary feature vectors. In some embodiments, one or more of the obtained feature vectors may be further processed by feature extraction unit 530 to generate one or more preliminary feature vectors. In some embodiments, same kinds of preliminary feature vectors may be generated for each sub-image. In some embodiments, different kinds of preliminary feature vectors may be generated for different sub-images.

In some embodiments, multiple preliminary feature vectors of a sub-image may be of the same size. The multiple preliminary feature vectors of the same size of the same sub-image may be stacked to form a combined preliminary feature vector (e.g., combined preliminary feature vectors 940-1~940-4). Different sub-images may use the same stacking strategy or different stacking strategies. In some embodiments, no combined preliminary feature vector may be formed and each preliminary feature vector may be processed by one CNN respectively. In some embodiments, all of the obtained preliminary feature vectors of the same sub-image may be stacked to form one combined preliminary feature vector (e.g., feature vectors 940-1~940-4). In some embodiments, more than one combined preliminary feature vector may be obtained for a sub-image.

In some embodiments, a sub-image itself may serve as a color-based feature vector (e.g., an RGB vector, a greyscale vector, or any other color related feature vector). This sub-image may also be stacked with one or more obtained preliminary feature vectors to form one or more combined preliminary feature vector.

FIG. 10 illustrates a block diagram of an exemplary neural network module according to some embodiments of the present disclosure. Neural network module 330 may be configured to construct a neural network, train or tune a neural network, and process images through a neural network. In some embodiments, neural network module 330 may obtain a trained, half-trained, or untrained neural network by input/output module 310. Neural network module 330 may include a construction unit 1010 and a training/tuning unit 1020.

The construction unit 1010 may be configured to construct a neural network. In some embodiments, the neural network may be constructed in parts. For example, one or more CNNs may be constructed first, then new layers may be added with at least one of them connecting to the constructed CNN(s) to form the required neural network.

As described elsewhere in the present disclosure, the neural network may include a feature extraction part and an output generation part. The feature extraction part may include one or more sub-neural networks (e.g., CNNs). A CNN may be obtained by CNN sub-unit 1011. In some embodiments, a CNN may be constructed starting from neural units. In some embodiments, an untrained or half-trained CNN may be automatically generated by some tools/modules/software. In some embodiments, functions of CNN may be described in connection with FIGS. 11 to 13-c below.

The output generation part may be considered as one sub-neural network. An output generation sub-neural network may be referred to as an ONN in the present disclosure. An ONN may be obtained by ONN sub-unit 1012. ONN sub-unit 1012 may connect the output layer of a CNN to the input layer of an ONN. In some embodiments, the ONN may be obtained as an independent neural network, then CNNs and ONN may be connected by ONN sub-unit 1012. In some embodiments, the ONN may be built starting from CNN(s). The input layer of the ONN may be built first connecting to the output layer(s) of the CNN(s). Then the rest part of the ONN may be built layer by layer.

In some embodiments, an ONN may be constructed starting from neural units. Alternatively, an ONN may be constructed starting from layers. In some embodiments, the whole ONN part may be automatically or semi-automatically generated by some tools/modules/software. In some embodiments, functions of ONN may be described in connection with FIGS. 11 to 13-c below.

Training/tuning unit 1020 may be configured to train the untrained neural networks and/or tune a pre-trained neural network. Training and tuning are processes making a neural network "learn" to perform specific tasks, which may be substantially the optimization of parameters of the neural network. The term "training" in the present disclosure may relate to the learning process of an untrained neural network. The parameters of said untrained neural network are neither optimized before nor generated based on optimized parameters. The term "tuning" in the present disclosure may relate to the learning process of a trained or half-trained neural network. The parameters of said trained or half-trained may have been optimized (e.g., through training), or generated based on optimized parameters.

Training/tuning unit 1020 may train or tune a neural network or a sub-neural network. In some embodiments, training/tuning unit 1020 may train a plurality of connecting layers of a neural network (or a sub-neural network) and these layers may be trained like a single sub-neural network. In some embodiments, the connecting layers may include one or more layers of a CNN and/or ONN.

In some embodiments, training/tuning unit 1020 may tune the obtained neural network or some connected layers of the neural network. The connecting layers may include one or more layers of a CNN and/or ONN.

In some embodiments, training/tuning unit 1020 may train an untrained neural network or tune a pre-trained neural network obtained directly by input/output module 310.

In some embodiments, the training/tuning unit 1020 may include one or more algorithms to train or tune different types of neural networks (or sub-neural networks).

In some embodiments, a trained neural network may be obtained directly by input/output module 310. Training/tuning unit 1020 may tune this neural network or be removed.

In some embodiments, training or tuning methods may be described in connection with FIGS. 11, 12, and 14-b below.

FIG. 11 illustrates an exemplary neural unit according to some embodiments of the present disclosure. A neural unit may generate an output according to its input. A neural unit may also represent an input source, such as a pixel of an image, a feature extraction unit, a predetermined value, etc. As shown in FIG. 11, a neural unit 1101 may be configured to connect (or communicate data) with one or more neural unit (s). For illustration purposes, three connected neural units, unit 1102-1, 1102-2, and 1102-3, are described. Neural unit 1101 may receive input(s) from the neural unit(s) connecting to it and generate an output according to the input(s). Neural unit 1101 may connect to neural unit(s) using weighted connection(s). In some embodiments, a neural unit 1101 may receive its own output as an input. A weight may also be assigned to this self-connection.

The connected neural unit (e.g., 1102-1, 1102-2, 1102-3) may represent an input source, such as a pixel of an image, a feature extraction unit, a bias unit (e.g., a predetermined value), etc. The connected neural unit may also generate the input of neural unit 1101 from the data received from other neural units.

For a given neural unit 1101, it may receive a plurality inputs x with corresponding weight w. x may represent a pixel value, a predetermined value (e.g., 1 or −1 as a bias), an output of another neural unit, etc. In some embodiments, the output function $f(x)$ of a neuron unit 1101 may be expressed as:

$$f(x)=\varphi(\Sigma_i w_i x_i), \quad (23)$$

where $x_i$ may represent an input of the neural unit, $x_i$ may be a pixel value, a predetermined value (e.g., 1 or −1 as a bias), an output of another neural unit, etc., $x_i$ may be received and/or acquired from a connected neural unit (e.g., 1102-1, 1102-2, 1102-3). $w_i$ may represent the corresponding weight of $x_i$. N may represent the number of the connected neural units. $\varphi$ may be an activation function. An activation function $\varphi$ may take the form of non-linear function, linear function, step function, or the like, or any combination thereof. Based on the function $\varphi$ applied, the output of $f(x)$ may be binary, ternary, discrete, continuous, etc. The output of $f(x)$ may be within a certain range. The type of $\varphi$ may define the type of a neural unit. $\varphi$ may be a Sigmoid function, Tanh function, ReLU function, Leaky ReLU function, ELU function, Max function, SoftMax function, Gaussian function, or the like, or any combination thereof. A neural unit may be referred to according to its activation function. Merely by way of example, a neural unit with its activation function set as ReLU function may be referred to as a ReLU unit.

FIG. 12 illustrates an exemplary neural network according to some embodiments of the present disclosure. For illustration purposes, a neural network 1200 may be a simplified version of different kinds of neural networks. Neural network 1200 may be constructed by linking a plurality of neural units. The neural units may be of same or of different types. Neural network 1200 may receive an input and generate an output. The input may include an ensemble of binary vectors (e.g., images), an output generated by a neural network, an output generated by a feature extract unit, a predetermined value, or the like, or any combination thereof. Neural network 1200 may be trained to perform a specific task. Neural network 1200 may be a part of a more complex neural network (e.g., a sub-neural network).

Neural network 1200 may be viewed as a layered structure. Neural units configured to receive the input for neural network 1200 may form an input layer 1210. Neural units in input layer 1210 may be referred to as input units 1211. Neural units configured to generate the output of neural network 1200 may form an output layer 1220. Neural units in output layer 1220 may be referred to as output units 1221. One output unit 1221 may generate one value. The rest neural units (if any), being configured to build the data path(s) that may travers form input layer 1210 to output layer 1230, may be grouped into one or more hidden layers (e.g., hidden layer 1220). Neural units in hidden layers may be referred to as hidden units 1221.

Neural units of different layers may be of the same type or different types. Neural units of the same layer may be of the same type or different types. In some embodiments, neural units of the same layer may be of the same type, and the neural units of different layers may be of different types.

The number of neural units of each layer of neural network 1200 may range from one to millions. A neural unit of one layer may be configured to communicate data, for example, connect (e.g., the input or output illustrated in FIG. 11) with one or more neural units of another layer. A pair of adjacent layers may be fully or partially connected. In a pair of fully connected layers, every neural unit of one layer may be configured to connect to all the neural units of the other layer.

The output function of Neural network 1200 may be expressed as $f$, which may include a collection of $f(x)$. An $f(x)$ may be defined as a composition of a plurality of functions $g_i(x)$. Each one of the $g_i(x)$ may be further defined as a composition of another plurality of functions. x may represent the input vector of neural network 1200. x may also be viewed as the output of input units 1211. x may include one or more values, e.g., $[x_1, x_2, \ldots, x_n]$. $f(x)$ may represent the output function of an output unit (e.g., output unit 1231). $g_i(x)$ may represent the output functions of the ith neural unit connected to the output unit. The ith neural unit may belong to a layer prior to the output layer 1230 (e.g., hidden layer 1220) as shown in FIG. 12. An $f(x)$ may be expressed as:

$$f(x)=\varphi(\Sigma w_i g_i(x)), \quad (24)$$

where $\varphi$ is the activation function of the output unit; $w_i$ is the weight of the connection between the output unit and the ith neural units connected to the output unit. A $g_i(x)$ may also be expressed in a similar way. In some embodiments, neural units of the same layer may share the same activation function $\varphi$.

For illustration purposes, W (e.g., $W_1$ between layer 1210 and 1220, $W_2$ between layer 1220 and 1230) may represent a collection of weights between a pair of adjacent layers, and g may represent outputs of $g_i(x)$.

According to some embodiments, the depth of neural network 1200 may be two. In other words, there may be no hidden layers between input layer 1210 and output layer 1220, then g may be equivalent with the input x. In some embodiments, the output unit may receive its own output as a part of its input, the corresponding $g_i(x)$ in Equation 24 may be viewed as the output of this output unit at a prior time point. Neural network 1200 may have one or more output units 1231. Each output units 1231 may generate an output value.

In some embodiments, output layer 1230 may include a small number (e.g., one, two, etc.) of output units 1221. The output of the neural network 1200 may be a matched result, a desired value, an index number, a classification code, or the like, or any combination thereof. In some other embodiments, output layer 1230 may include a huge number (e.g., hundreds, thousands, millions, etc.) of output units 1231. The output of the neural network 1200 may be a feature vector. The feature vector generated by the neural network used by neural network module 330 may be referred to as a deep feature vector in the present disclosure.

Neural network 1200 may be trained or tuned to perform a specific task. The training of neural network 1200 may include adjusting or optimizing of weight vector(s) W and other possible parameters between a pair of connected layer pairs.

The training of neural network 1200 may entail a defined cost function C. C may be a measure of how far away a particular solution is from an optimal solution. C may be a function of the input x and the output (function) $f$. In some embodiments, C may be a measure of how far away a particular solution is from an optimal solution. In order to train/tune a neural network 1200, a training/tuning method may be applied to update W(s) and/or other parameters (if any) for minimizing the value of C. The training/tuning method may include supervised learning, unsupervised learning, semi-supervised learning, reinforcement learning, or the like, or any combination thereof, depending on the task to be solved and/or the type of the neural network 1200. Different training/tuning methods may have different cost functions C and/or different training/tuning algorithms. In some embodiments, C may be defined as an error function representing differences or mismatches between the actual output and a desired (or ideal) output (which may also be referred to as a supervisory output). The corresponding training/tuning algorithms may include backpropagation algorithms.

One or more parameters of neural network 1200 or the algorithm performed by the training/tuning method may be adjusted manually, automatically, or semi-automatically during the training/tuning. In some embodiments, the parameters may include depth of neural network 1200, size of a layer, connection configuration between a layer pair, weight of a connection, learning rate (determines the degree or rate of the adjustment), or the like, or any combination thereof.

During the training, a plurality of training data vectors (e.g., images, preliminary feature vectors, combined preliminary feature vectors, etc.) may be inputted into neural network 1200. One data vector may be inputted into neural network 1200 in one training cycle. The result of C may be determined for each training data vector. Parameters such as weights of connections may be updated to make the result of C toward a predetermined range or value (e.g., 0). The update may occur once, or multiple times after (or during) one training cycle, or occur once after multiple training cycles. One training cycle may be carried out repeatedly. The training may be completed after the output of C is within a predetermined range or below a predetermined threshold (e.g., 0.1, 0.02, 0.005, etc.).

Neural network 1200 may be a sub-neural network CNN and ONN may be embodiments of neural network 1200. In some embodiments, functions of CNNs may be described in connection with FIGS. 13-$a$ to 14-$b$ below.

According to some embodiments of the present disclosure, neural network 1200 may be used to illustrate the structure of an ONN. Input layer 1210 may be the output layer of a CNN, or a combined layer including the output layers of multiple CNNs. Input layer 1210 may be loaded with one or more deep feature vectors extracted by the CNN(s). The deep feature vector(s) may then be processed by one or more hidden layers (e.g., hidden layer 1220) of neural network 1200. Output layer 1230 may generate one or more output values based on the deep feature vector(s).

In some embodiments, there may be only one output unit in the output layer of an ONN. The output of the ONN may be, for example, a match result of a face identification, a classification result of the face owner, etc.

In some embodiments, there may be two output units in the output layer of an ONN. The output of the ONN may be, for example, the pitch and yaw angle of a human face in an image.

In some embodiments, there may be a plurality of output units in the output layer of an ONN. The output of the ONN may be a feature vector generated from the deep feature vector(s) obtained by CNN(s). The generated feature vector may be referred to as an ultimate feature vector. The ultimate feature vector may be stored as visual description data of a certain object (e.g., a human face) included in the image inputted into the CNN(s). The stored ultimate feature vector may be recalled for, e.g., face identification and/or face recognition, in a future time.

In some embodiments, the output layer (e.g., output layer 1230) of an ONN may output one or more values which may be used for face identification, face classification, etc. The data vector being loaded by the hidden layer (e.g., hidden layer 1220) connecting to the output layer may also be collected as the ultimate feature vector.

An ONN may be trained dependently or independently. In some embodiments, a neural network, including one ONN and one or more CNNs, may be trained as a whole. In some embodiments, a sub-neural network including one or more layers of an ONN and layers of CNN(s) may be trained as a whole and other layers of the ONN may not be trained. In some embodiments, an ONN may be trained as an independent neural network with the deep feature vector(s) obtained by trained CNN(s) as the training data.

In some embodiments, one or more weight vectors of an ONN may not be altered during the training or tuning. For example, the weight vector between the output layer (e.g., output layer 1230) of the ONN and the hidden layer (e.g., hidden layer 1220) connecting to the output layer may be configured as unchangeable. The weights of this unchangeable weight vector may be set with one or more predetermined numbers. In some embodiments, the training of the final neural network may not be carried out on the part of the neural network with unchangeable weight vectors.

FIGS. 13-$a$ and 13-$b$ illustrate an exemplary layer of a CNN according to some embodiments of the present disclosure. Layer 1300 may include a plurality of neural units 1310. A neural unit 1310 may connect to a region 1360 of the layer (e.g., layer 1350) before layer 1300. Region 1360 may be referred to as receptive field. The size of region 1360 may be arbitrary. Layer 1350 may be an image, a preliminary feature vector, another layer 1300, etc.

As shown in FIG. 13-$a$, neural units 1310 of layer 1300 may be arranged in three dimensions. Layer 1300 may be described with width, height, and depth. The width may represent the number of neural units 1310 in x direction. The height may represent the number of neural units 1310 in y direction. The depth may represent the number of neural units 1310 in z direction. The size of a layer 1300 may be expressed as width*height*depth. The coordinate of a unit 1310 may be used to determine its receptive field 1360.

Layer 1300 may also be illustrated as shown in FIG. 13-*b*, where layer 1300 may be viewed as including a plurality of sub-layers. A sub-layer may be referred to as a depth slice (e.g., depth slice 1330) in the present disclosure. Depth slice 1330 may include of neural units 1310 of the same depth. Neural units 1310 of the same depth slice 1330 may be of the same type. Neural units 1310 of the same layer 1300 but of different depth slices 1330 may be of the same type, or of different types.

Layer 1300 may be a convolutional layer or a pooling layer. In a CNN architecture, a plurality of layers 1300 may be connected sequentially in a cascade manner as shown in FIG. 14-*a*. A CNN may include different types of layers 1300, which may be described below.

Layer 1300 may be configured as a convolutional layer. Each neural unit (e.g., neural unit 1310) of the convolutional layer may connect to the neural units or pixels of the prior layer (e.g., layer 1350) or other input vector (e.g., a preliminary feature vector) within its receptive field (e.g., region 1360). The connections may be local in space (along width and height). The neural units in the same depth slice (e.g., depth slice 1330) may be configured to use the same set of weights and bias, which may be referred to as a filter or kernel. The size of a kernel may be arbitrary. In some embodiments, a kernel may be configured in the form of a weight square array. The size of a kernel may be 3*3, 5*5, etc.

The receptive fields of the neural units of the same convolutional layer may share the same size. The receptive field of the neural units with the same coordinate except the depth may cover the same region. Neural units of different depth slices may learn to activate for different features, for example, various oriented edges, blobs of color, etc.

In some embodiments, an input vector (e.g., a preliminary feature vector) may include a plurality of stacked sub-vectors. In some embodiments, the kernel of a convolutional layer may extend through the full or part of depth of the input vector including all the sub-vectors. For example, a kernel may extend through the full depth of an input vector which may be a combined preliminary feature vector formed by stacking a plurality of preliminary feature vectors (e.g., a color-based feature vector, a first texture-based feature vector, and a second texture-based feature vector, etc.). As another example, a kernel may extend through the full depth of an input vector which may be a single preliminary feature vector including multiple sub-vectors (e.g., an RGB vector may include three sub-vectors, a texture-based feature vector and a gradient-based feature vector may include two sub-vectors.).

In some embodiments, the concept of kernel may not be applied and neural units 1310 in each depth slice 1330 may be configured to use different sets of weights and bias. Each set may extend through the full or part of depth of the input vector.

During a convolution operation, each kernel may be convolved across the width and height of the input vector (e.g., a preliminary feature vector, layer 1350). The convolution operation may perform functions, for example, computing the dot product between the entries of the kernel and the input vector, and produce a two-dimensional activation map (or feature map) of that kernel. The full output vector of the convolution layer may be formed by stacking the activation maps along the depth dimension of it.

In some embodiments, the input vector may be padded with zeroes or other values on its border to control the size of the output vector.

In some embodiments, the neural units 1310 of a convolutional layer 1300 may be ReLU units or other suitable units.

Layer 1300 may be configured as a pooling layer. A pooling layer may down-sampling or pooling the output vector generated by a convolutional layer in order to reduce the amount of parameters and/or computation in the neural network, and hence to control overfitting. Pooling layers may be optional in a CNN architecture.

In some embodiments, a pooling layer and the convolutional layer prior to it (e.g., layer 1350) may have the same depth. Each depth slice of pooling layer (e.g., depth slice 1330) may operate independently on the corresponding depth slice (may also be referred to as an activation map) of its input vector and resizes it spatially.

The output vector of pooling layer 1300 may be formed by stacking the down-sampled vectors generated by each depth slice along the depth dimension of the pooling layer. The depth dimension of the input vector and the resultant vector may be the same.

During a pooling operation, a depth slice of the input vector may be divided into a set of non-overlapping regions. Each neural unit 1310 of pooling layer 1300 may connect to one of this region (may also be referred to as the receptive field). The size of the receptive field may be arbitrary. For example, the size of the receptive field may be 2*2, 3*3, 2*3, etc. The pooling method may include max pooling, average pooling, L2-norm pooling, etc. In some embodiments, max pooling may be used by the pooling layer. A max pooling operation may output the max value over all the values in a receptive field. In a CNN architecture, different pooling layers may use the same pooling method or different pooling methods.

In some embodiments, a set of pooling layers may be periodically or aperiodically inserted in-between successive convolutional layers in a CNN architecture. For example, periodically or aperiodically, after a predetermined number (e.g., 1, 2, etc.) of convolutional layers, a pooling layer 1300 may be added for pooling. The pooling layers may provide a form of translation invariance.

FIGS. 14-*a* and 14-*b* illustrate an exemplary sub-network with a convolutional neural network (CNN) architecture according to some embodiments of the present disclosure. CNN 1400 may be a sub-neural network of the feature extracting part of the neural network used by neural network module 330. CNN 1400 may include a plurality of layers. For illustration purposes, layers 1420, 1425, 1430, 1435, and 1440 are shown in FIG. 14-*a*. In some embodiments, more layers may be involved in a CNN 1400. For convenience, CNN 1400 illustrated in FIG. 14-*a* may also be illustrated as shown in FIG. 14-*b*.

Layer 1420 may be a convolutional layer which may extract features from an input vector (e.g. a preliminary feature vector or a combined preliminary feature vector). A neural unit 1421 of layer 1420 may have a receptive field 1411. The kernels of each depth slice of layer 1420 may extend through the full depth of input vector 1410. After a convolution operation, an activation map may be generated by each depth slice of layer 1420. The obtained activation maps may be stacked as the output vector of layer 1420.

Layer 1425 may partially connect to layer 1420. A neural unit 1426 of layer 1425 may have a receptive field 1421.

Layer 1425 may process the output vector of layer 1420. Layer 1425 may have a decreased size (width and height) compared with layer 1420.

In some embodiments, layer 1425 may be a pooling layer. Layer 1425 and Layer 1420 may have the same depth. Each depth slice of layer 1425 may down-sample the activation map of the corresponding depth slice of layer 1420.

In some embodiments, layer 1425 may be a second convolutional layer. Layer 1425 may have the same depth or an increased depth compared with layer 1420. The kernels of each depth slice of layer 1425 may extend through the full depth of the output vector of layer 1420.

Layer 1430 may partially connect to layer 1425. The output vector of layer 1425 may be processed by layer 1430. In some embodiments, layer 1425 may be a convolutional layer, layer 1430 may be a convolutional layer or a pooling layer, and layer 1430 may have the same depth or an increased depth compared with layer 1425. In some embodiments, layer 1425 may be a pooling layer, layer 1430 may be a convolutional layer, and layer 1430 and Layer 1425 may have the same depth.

Layer 1435 may be configured as the layer connecting to the last layer (e.g., layer 1440) of CNN 1400. In FIGS. 14-*a* and 14-*b*, layer 1435 is illustrated as the layer next to layer 1430. However, in some embodiments, there may be one or more convolutional layers and/or pooling layers between layer 1430 and layer 1435. Layer 1435 and each of the layers not shown in FIG. 14-*a* or 14-*b* may be a convolutional layer or a pooling layer. The description of these layers may be similar to the description of layer 1430.

In some embodiments, layers 1420-1435 (with layers not shown in FIG. 14-*a* or 14-*b*) may all be convolutional layers. Alternatively, the convolutional layers and pooling layers may be arranged alternatively in CNN 1400.

Layer 1440 may be the last layer of CNN 1400. Layer 1440 may also be mentioned as a feature layer. Layer 1440 may fully connect to layer 1435. For example, every neural unit of layer 1440 may connect to every neural unit of layer 1435. Layer 1440 may partially connect to layer 1435. For example, at least one of the neural units of layer 1440 does not connect to layer 1435. Feature layer 1440 may be viewed as a one-dimensional structure. For illustration purposes, the size of layer 1440 may be expressed as 1*1*N. The output vector of feature layer 1440 may be the above-mentioned deep feature vector. The deep feature vector may be further processed by the ONN part connecting to CNN 1400 in a neural network.

FIG. 15-*a* and FIG. 15-*b* illustrate an exemplary methods about a sub-network with a convolutional neural network (CNN) architecture processing an input vector with multiple sub-vectors according to some embodiments of the present disclosure. Input vector 1530 may include a plurality of sub-vectors (e.g., sub-vectors 1531-1 and 1531-2). Preliminary feature vector 1530 may be a combined preliminary feature vector (a feature vector formed by stacking a plurality of preliminary feature vectors.). A sub-vector may be a single-layered preliminary feature vector (e.g., a greyscale vector, a texture-based feature vector generated by extracting LBP feature, etc.), or a multi-layered preliminary feature vector (e.g., a texture-based feature vector generated by extracting LTP feature, etc.).

As shown in FIG. 15-*a*, input vector 1530 may be processed by a CNN 1500. CNN 1500 may include a plurality of convolutional layers and optionally a plurality of pooling layers. Merely for illustration purposes, CNN 1500 may include layers 1510-1, 1510-2, and 1510-3. CNN 1500 may also include a feature layer 1520, which may be fully connected to layer 1510-3. During the processing of input vector 1530, the kernels of layer 1510-1 may extend through the full depth of preliminary feature vector 1530, and one deep feature vector may be obtained at feature layer 1520.

As shown in FIG. 15-*b*, input vector 1530 may be processed by more than one CNNs (e.g., CNN 1501 and CNN 1502). CNN 1501 and CNN 1502 may belong to the same neural network system. Sub-vector 1531-1 and sub-vector 1531-2 may be processed by CNN 1501 and CNN 1502 separately.

CNN 1501 may include a plurality of convolutional layers and optionally a plurality of pooling layers (e.g., layers 1511-1, 1511-2, and 1511-3). CNN 1501 may also include a feature layer 1521, which may be fully connected to layer 1511-3. During the processing of sub-vector 1531-1, the kernels of layer 1511-1 may extend through the full depth of sub-vector 1531-1 (single-layered or multi-layered), and one deep feature vector corresponding to sub-vector 1531-1 may be obtained at feature layer 1521.

CNN 1502 may include a plurality of convolutional layers and optionally a plurality of pooling layers (e.g., layers 1512-1, 1512-2, and 1512-3). CNN 1502 may include a feature layer 1522, which may be fully connected to layer 1521-3. During the processing of sub-vector 1531-2, the kernels of layer 1512-1 may extend through the full depth of sub-vector 1531-1 (single-layered or multi-layered), and one deep feature vector corresponding to sub-vector 1531-1 may be obtained at feature layer 1522.

The deep feature vectors obtained by CNN 1501 and CNN 1502 may be further processed by the ONN part (not shown in FIG. 15-*b*) connecting to both CNN 1501 and CNN 1502 in a neural network to generate the output of the whole neural network.

In some embodiments, CNN 1501 and CNN 1502 may share the same or similar network structure with respect to the numbers of layers, the sizes and depths of each corresponding layers, and the types of neural units of each corresponding layers, etc.

In some embodiments, CNN 1501 and CNN 1502 may have different network structures. For example, the numbers of layers in CNN 1501 and CNN 1502 may be different.

FIGS. 16-*a*, 16-*b*, and 16-*c* illustrate exemplary linking methods between one or more convolutional sub-neural-network parts and an output-generating-neural-network part to form a neural network according to some embodiments of the present disclosure. The feature layer(s) of one or more CNNs may be connected to the ONN part to form a complete neural network, for example, neural networks 1600, 1610, or 1620. Each CNN may receive an input vector, which may be a single preliminary feature vector or a combined preliminary feature vector. The ONN part may generate the output of the whole neural network based on one input vector (e.g., neural networks 1600) or multiple input vectors (e.g., neural networks 1610 and 1620). The output may be, for example, one or more desired values, an ultimate feature vector, a matching or classifying result, etc., based on the specific structure of ONN.

As shown in FIG. 16-*a*, neural network 1600 may include one CNN 1601. CNN 1601 may receive an input vector (e.g., a preliminary feature vector, or a combined preliminary feature vector). The last layer of CNN 1601 may be illustrated as feature layer 1602 which may load the deep feature vector generated based on the feature vector. Other layers of CNN 1601 may be hided in FIG. 16-*a*. ONN 1604 may include an output layer 1606. In some embodiments, ONN 1604 may include one or more hidden layers (e.g., layer 1605). Alternatively, ONN 1604 may not include any hidden layers. For illustration purposes, one hidden layer 1605 is illustrated in FIG. 16-*a*. However, FIG. 16-*a* does not apply restrictions to the number of hidden layer in the present disclosure.

Output layer 1606 may generate the output of neural network 1600. The first layer of ONN (e.g., hidden layer 1605, or output layer 1606 if no hidden layer 1605 is included in ONN 1604) may fully connect to feature layer 1602. The adjacent layers in ONN 1604 may be fully or partially connected. Neural network 1604 may be trained as a whole and optionally tuned afterwards.

As shown in FIG. 16-*b*, neural network 1610 may include more than one CNNs (e.g., CNN 1611-1 and CNN 1611-2). CNN 1611-1 and CNN 1612-2 may each receive an input vector (e.g., a preliminary feature vector, or a combined preliminary feature vector). The last layers of CNN 1611-1 and 1611-2 may be illustrated as feature layer 1612-1 and feature layer 1612-2 respectively. Layer 1611-1 and layer 1612-2 may be of the same size or of different sizes. Feature layers 1612-1 and 1612-2 may each load a deep feature vector generated based on their respective input vector. Other layers of CNN 1611-1 and CNN 1611-2 may be hided in FIG. 16-*b*.

ONN 1614 may include an output layer 1616. In some embodiments, ONN 1614 may include one or more hidden layers (e.g., layer 1615). Alternatively, ONN 1614 may not include any hidden layers. For illustration purposes, one hidden layer 1615 is illustrated in FIG. 16-*b*. However, FIG. 16-*b* does not apply restrictions to the number of hidden layer in the present disclosure. Output layer 1616 may generate the output of neural network 1610. The adjacent layers in ONN 1614 may be fully connected or partially connected.

The first layer of ONN 1614 (e.g., a hidden layer 1615 or output layer 1616 if no hidden layer 1615 exists in ONN 1614), may fully connect to feature layers 1612-1 and 1612-2. The two feature layers 1612-1 and 1612-2 may be viewed as a single layer 1617. As more than one deep feature vectors may be received by ONN 1614, the feature vectors may be fused for further processing.

In some embodiments, the obtained deep feature vectors may be serially fused. For example, the obtained deep feature vectors may be placed one after another to form a combined vector with a size equaling to the sum of the sizes of the deep feature vectors being fused. In some embodiments, the serial fusion of two deep feature vectors may be expressed as:

$$F_{sf}=[w_1F_1, w_2F_2], \quad (25)$$

where $F_{sf}$ may represent the serially fused feature vector. $F_1$ and $F_2$ may represent the deep feature vector being fused. $w_1$ and $w_2$ may represent corresponding weights of $F_1$ and $F_2$. The weights $w_1$ and $w_2$ may be predetermined values (e.g., 1.0, 2.0, 0.5, 0.8, etc.), or be obtained self-adaptively. The weights $w_1$ and $w_2$ may also be updated during the training. In some particular embodiments, both $w_1$ and $w_2$ may be set with 1 and nonupdatable. More than two feature vectors may also be serially fused with a similar expression.

In some embodiments, the obtained deep feature vectors may be parallelly fused. For example, the obtained deep feature vectors may be processed to form a combined vector. The parallel fusion of two deep feature vectors may be expressed as:

$$F_{pf}=w_1F_1+w_2F_2i, \quad (26)$$

where $F_{pf}$ may represent the fused feature vector. $F_1$ and $F_2$ may represent the deep feature vector being fused. i may represent the imaginary unit. $w_1$ and $w_2$ may represent corresponding weights of $F_1$ and $F_2$. The weights $w_1$ and $w_2$ may be predetermined values (e.g., 1.0, 2.0, 0.5, 0.8, etc.), or be obtained self-adaptively. The weights $w_1$ and $w_2$ may also be updated during the training. In some particular embodiments, both $w_1$ and $w_2$ may be set with 1 and nonupdatable. If $F_1$ and $F_2$ are under different dimensions, the vector of a lower dimension may be padded with zeroes. More than two feature vectors may also be serially fused with a similar expression. In some embodiments, $F_1$ and $F_2$ may be normalized before the parallel fusion.

The fusion (serial or parallel) of deep feature vectors may be carried out at the first layer of ONN 1614. The combined preliminary feature vector may be further processed by the rest part of ONN 1614 to generate the output.

As shown in FIG. 16-*c*, neural network 1620 may include more than one CNNs (e.g., CNN 1621-1 and CNN 1621-2). CNN 1621-1 and CNN 1622-2 may each receive an input vector (e.g., a preliminary feature vector, or a combined preliminary feature vector). The last layers of CNN 1621-1 and 1621-2 may be illustrated as feature layer 1622-1 and feature layer 1622-2 respectively. Layer 1611-1 and layer 1612-2 may be of the same size or of different sizes. Feature layers 1622-1 and 1622-2 may each load a deep feature vector generated based on their respective input vector. Other layers of CNN 1621-1 and CNN 1621-2 may be hide in FIG. 16-*c*.

ONN 1624 may include one or more layers (e.g., layers 1625-1, 1625-2 and output layer 1626). Output layer 1626 may generate the output of neural network 1620. The adjacent layers in ONN 1624 may be fully or partially connected.

Layer 1625-1 may fully connect to feature layer 1622-1. Layer 1625-2 may fully connect to 1612-2. Layer 1625-1 and layer 1625-2 may fully or partially connect to layer 1626. Layer 1625-1 and layer 1625-2 may be viewed as a single layer 1627. Neural units of layer 1627 may be divided into two or more groups. Neural units of different groups may connect to feature layers of different CNNs (e.g., feature layer 1622-1 and feature layer 1622-2) separately. The obtained deep feature vectors may be processed by layer 1625-1 and layer 1625-2, respectively, to obtain a plurality of vectors, values, or a combination thereof. The vectors and/or values may be further processed by the rest part of ONN 1624 to generate the output.

The training methods of neural networks 1600, 1610, and 1620 may include backpropagation algorithm. A classic or improved backpropagation algorithm may be carried out on the neural networks according to various literatures.

For neural network 1610, the error $\delta_C$ backpropagated to layer 1617 may be divided into two portions according to the numbers of neural units of feature layer 1612-1 and feature layer 1612-2. Each portion of error may be backpropagated through the corresponding CNN.

For neural network 1620, the error $\delta_C$ backpropagated to layer 1627 may be divided into two portions according to the number of neural units of layer 1625-1 and layer 1625-2. Each portion of error may be backpropagated through the corresponding CNN.

In some embodiments, a neural network may be built by combining neural networks 1600, 1610, and/or 1620. For example, two neural networks 1620 may be connected at layers 1626 with one or more additional layers; a neural network 1600 and a neural network 1610 may be connected at layer 1601 and layer 1616 (the number of layer 1605 and layer 1615 may be zero, one, or more) with one or more new layers, etc.

After the training of a neural network described above, one or more layers of the trained neural network may be tuned according to procedures described in FIGS. 19 and 20. Other tuning techniques may also be used. The tuning may be carried out for one or more times.

FIG. 17 illustrates a flowchart of an example 1700 of a process for determining a neural network according to some embodiments of the present disclosure. Process 1700 may be executed by information processing system 100. For example, process 1700 may be implemented as a set of instructions (e.g., an application) stored in a storage device in image analyzing engine 120. Image analyzing engine 120 may execute the set of instructions and may accordingly be directed to perform process 1700 in the information processing system 100.

In 1710, one or more CNNs may be obtained. Step 1710 may be performed by CNN sub-unit 1011. In some embodiments, a CNN may be constructed starting from neural units. Alternatively, an untrained or half-trained CNN may be automatically generated by some tools/modules/software.

In some embodiments, one CNN may be obtained in 1710. The CNN may include a plurality of convolutional layers and optionally a plurality of pooling layer. The structure of the CNN may be similar as the one shown in FIG. 14-*a*. The kernels of each layer may extend through the full depth of the previous layer. The CNN may receive an input vector which may be a mono-layered preliminary feature vector, a multi-layered preliminary feature vector, or a combined preliminary feature vector.

In some embodiments, multiple CNNs may be obtained in 1710. The kernels of each layer of each CNN may extend through the full depth of the previous layer. The CNNs may share a similar or different structure with respect to the number of their layers, the sizes, depths, types of neural units of their corresponding layers, or the sizes of receptive fields of their corresponding layers, etc. The CNNs may be trained for processing different input vectors.

In 1720, a new neural network may be constructed from the obtained CNN(s). Step 1720 may be performed by ONN sub-unit 1012. The ONN part of the neural network may be added at the feature layer(s) of the obtained CNN(s) at this step.

In some embodiments, the ONN may be obtained as an independent neural network. Then the obtained CNN(s) and ONN may be connected by partially or fully connecting the feature layer of one or more CNNs to the input layer (the first layer) of the obtained ONN. The ONN may be built starting from neural units or layers. Alternatively, a whole ONN part may be automatically or semi-automatically generated by some tools/modules/software.

In some embodiments, the input layer of the ONN may be built connecting to the feature layer(s) of the obtained CNN(s). Then the rest layers of the ONN may be built connecting to the last generated layer one by one.

In 1730, the obtained neural network may be trained. Step 1730 may be performed by training/tuning unit 1020. In some embodiments, the whole neural network may be trained and the weight vectors and biases (if any) may be updated to optimize the result. In some embodiments, only part of the neural network (a plurality of certain connecting layers) may be trained and the corresponding weight vectors and biases may be updated. In some embodiments some weights and/or biases of some layers of the neural network may be predetermined values and nonupdatable.

In 1740, the trained neural network may be tuned. The tuning may be optional or may be skipped in some embodiments of the present disclosure. The tuning may be carried out on the whole neural network, certain connected layers, or one or more specific layers. For example, the layers prior to the output layer of the neural network may be tuned. As another example, the layers representing the CNN(s) may be tuned. In some embodiments, the layers representing the CNN(s) and the layer(s) of ONN connecting to the feature layer(s) of CNN(s) may be tuned. In some embodiments, the tuning process may be described in connection with FIGS. 19 and 20 below. Additionally or alternatively, other tuning techniques may also be used. The tuning may be carried out for one or more times.

FIG. 18 illustrates a flowchart of an example 1800 of a process for determining a neural network according to some embodiments of the present disclosure. Process 1800 may be executed by information processing system 100. For example, process 1800 may be implemented as a set of instructions (e.g., an application) stored in a storage device in image analyzing engine 120. Image analyzing engine 120 may execute the set of instructions and may accordingly be directed to perform process 1800 in the information processing system 100.

In 1810, a plurality of CNNs may be obtained. Step 1810 may be performed by CNN sub-unit 1011. In some embodiments, the CNNs may be constructed starting from neural units. Alternatively, a plurality of untrained or half-trained CNNs may be automatically generated by some tools/modules/software. The kernels of each layer of each CNN may extend through the full depth of the previous layer. The CNNs may share a similar structure or have different structures. The CNNs may be trained for processing for different input vectors.

In 1820, some extra layers may be added to the obtained CNNs. Step 1820 may be performed by ONN sub-unit 1012. The extra layers may belong to ONN but may generate some preliminary results based on the deep feature vectors generated by CNN (e.g., layer 1625-1 or layer 1625-2). The preliminary results may be used to train the expanded CNNs.

The extra layers may be trained with the CNNs first, then the rest layer(s) of the ONN part may be appended on the layers. The training of rest layer(s) may not be required. For example, the rest layer(s) may have fixed weight vector(s). The rest layers may generate the final result from the preliminary results.

In some embodiments, step 1820 may be combined with step 1810. The obtained CNNs (e.g., CNN 1400), may have one or more layers appended after feature layer 1440 after its construction. The first layer of the appended layers may be fully connected to feature layer 1440. Other layers (if any) may then be appended in a cascade manner with full or partial connection. Under this situation, step 1820 may be performed by CNN sub-unit 1011.

In 1830, the expanded CNNs may be trained separately. The training may use a backpropagation algorithm or any other suitable algorithms. The CNNs may use the same or different training sets. Different criteria or the same criterion may be used for different CNNs.

In 1840, the trained CNNs may be tuned. The tuning may be optional and may be skipped in some embodiments of the present disclosure. The tuning may be carried out on the whole neural network, certain connected layers, or one or more specific layers. The tuning may be carried out on some CNNs or all the CNNs. For example, the layers prior to the output layer of the neural network may be tuned. As another example, the layers representing the CNNs may be tuned. In some embodiments, the layers representing the CNNs and the layers of ONN connecting to the feature layers of CNNs may be tuned. In some embodiments, the tuning process may be described in connection with FIGS. 19 and 20 below. Additionally or alternatively, other tuning techniques may also be used. The tuning may be carried out for one or more times.

In 1850, the trained and optionally tuned expanded CNNs may be connected by newly added layers to from a complete neural network. In some embodiments, the rest layers of ONN may be obtained as an independent neural network, then the expanded CNN(s) and the rest layers of ONN may be connected by partially connecting the last layers of the expanded CNNs to the same first layer (e.g., the connecting manner between layer 1617 and layer 1615) of the rest part of ONN. This independent ONN part may be built starting from neural units or layers. Alternatively, a full ONN part may be automatically or semi-automatically generated by some tools/modules/software.

In some embodiments, the first layer of the rest part of ONN may partially connect to the last layers of the expanded CNN(s), the rest layers may be appended one by one in a cascade manner until the last output layer is connected.

In some embodiments, step 1850 may be performed before step 1830. Then in 1830, the part of the formed neural network representing the expanded CNN(s) may be trained like independent neural network(s).

In some embodiments, step 1850 may be performed before step 1840. Then In 1840, the part of the formed neural network representing the expanded CNN(s) may be tuned like independent neural network(s).

FIG. 19 illustrates a flowchart of an exemplary process for tuning a neural network according to some embodiments of the present disclosure. Process 1900 may be included in step 1740 and/or step 1840. The tuning may be performed on a trained neural network or a trained expanded CNNs obtained in 1830. The trained neural network may be obtained in 1730 or 1850. Process 1900 may be executed by information processing system 100. For example, process 1900 may be implemented as a set of instructions (e.g., an application) stored in a storage device in image analyzing engine 120. Image analyzing engine 120 may execute the set of instructions and may accordingly be directed to perform process 1900 in the information processing system 100.

The tuning technique illustrated herein may be performed on one or more layers (e.g., a layer prior to the output layer of the neural network, the feature layer(s) of CNN(s), the layer(s) of ONN part connecting to the feature layer(s) of CNN(s), etc.) of the neural network used by image analyzing engine 120. The layer upon which the tuning is performed may be referred to as a "cluster layer" in the present disclosure, as the features generated at this layer may be grouped into a plurality of clusters during or after tuning. Optionally, the turning may be performed on multiple layers of the neural network used by image analyzing engine 120, for example, the feature layers of a plurality CNNs the network contains. In that case, process 1900 may be performed on each cluster layer.

At step 1910, a first plurality of features may be obtained from the cluster layer of a trained neural network. A plurality of tuning data vectors (e.g., images, preliminary feature vectors, combined preliminary feature vectors, etc.) may be inputted into the CNN(s) that the cluster layer belonging to or connecting to. Take neural network 1600 illustrated in FIG. 16 as an example, the cluster layer may be layer 1605, and the tuning data vectors may be inputted into CNN 1601. Take neural network 1610 illustrated in FIG. 16-b as another example, the cluster layer may be layer 1615, and two (or more if more CNNs are included) sets of tuning data vectors generated based on the same set of images may be inputted into corresponding CNNs (e.g., CNN 1611-1 and 1611-2). Take neural network 1620 illustrated in FIG. 16-b as another example, the cluster layer may be layer 1625-1 or layer 1622-1, the tuning data vectors may be inputted into CNN 1621-1. The tuning data vectors may be or may not be the training data vectors of the trained neural network. After the plurality of tuning data vectors being processed by the neural network, a feature extraction may be carried out on the cluster layer, and a first plurality of features may be obtained as a result.

At step 1920, the obtained first plurality of features may be normalized. The normalization may be linear or non-linear. In some embodiments, the normalization of a feature ft may be expressed as:

$$ft_N = \frac{ft}{\|ft\|}, \quad (27)$$

where $ft_N$ may be the normalized feature, "$\| \|$" may be the Euclidean norm operator. Perform equation 26 to the first plurality of features may obtain a corresponding plurality of normalized features.

At step 1930, the plurality of normalized features may be grouped into a plurality of clusters (e.g., clustering). The centroid of the clusters and the grouped features of each cluster may be obtained at step 1930. The centroid of a cluster may relate to the mean value of the cluster, or a feature the value of which equals to the mean value of the cluster. The clustering technique may be based on partition, hierarch, density, grid, static, correlation, or the like, or any combination thereof. The clustering technique may involve one or more algorithms, for example, c-means, fuzzy c-means algorithm (FCMA), k-means, k-medoids, clarans, birch, cure, chameleon, DBCAN, OPTICS, DENCLUE, STING, CLIQUE, WAVE-CLUSTER, or the like, or any combination thereof.

In some particular embodiments, the normalized features may be clustered based on c-means algorithm, which is described in connection with FIG. 20 below.

At step 1940, the neural network or part of the neural network may be tuned based on the centroid of clusters. At step 1930, a number of k clusters may be obtained. The tuning may be implemented by making the features of each cluster converge to the corresponding centroid. For example, the image used for tuning may be divided into a plurality of blocks for performing an end-to-end learning between a sample and a centroid. The end-to-end learning may entail a cost function C. In some embodiments, the cost function C may be expressed as:

$$C = \min \tfrac{1}{2} \Sigma_{i,j} (ft_{ij} - M_i)^2, \quad (28)$$

where $M_i$ may represent the centroid of the ith ($1 \le i \le k$) cluster which may include a number of $n_i$ features. $ft_{ij}$, may represent the jth ($1 \le j \le n_i$) feature of the ith cluster. The tuning may be implemented by minimizing C. During the tuning, the parameters of the cluster layer may be updated. The updating may be expressed by:

$$\delta = ft_{ij} - M_i, \quad (29)$$

$$b' = b + \varepsilon \cdot \delta, \quad (30)$$

$$W' = W + \varepsilon \cdot \delta \cdot ft, \quad (31)$$

where W may represent a weight vector. b may represent a bias. W' may represent the updated weight vector W. b' may represent the updated bias b. ε may represent a learning rate.

ε may be set or adjusted manually or automatically to affect the degree of updating. ε may be set or adjusted within a range which may improve the training efficiency as well as to avoid over-fitting. Merely by way of example, ε may be 0.1, 0.02, 0.005, etc.

FIG. 20 illustrates a flowchart of an exemplary process for clustering a plurality of normalized features during the tuning of neural network according to some embodiments of the present disclosure. The normalized features may be obtained in 1920. Process 2000 may be based on c-means algorithm and be included in 1930. Process 2000 may be executed by information processing system 100. For example, process 2000 may be implemented as a set of instructions (e.g., an application) stored in a storage device in image analyzing engine 120. Image analyzing engine 120 may execute the set of instructions and may accordingly be directed to perform process 2000 in the information processing system 100.

In 2005, a value c may be initialized as 1. Then in 2010, a number of c features may be randomly picked as cluster centroids (may also be referred to as original centroids in the following text). Next in 2015, the Euclidean distance between any feature and any centroid may be calculated. The features with the smallest Euclidean distance to a centroid may be grouped into the same cluster, and a number of c clusters may be obtained as result.

In 2020, a new centroid may be obtained for each cluster. The new centroid may be the mean of the features of the cluster. Then in 2025, the change of centroid may be determined for each cluster. If the new centroid remains to be the original centroid, step 2030 may be carried out to further refine the clusters. If the new centroid and the original centroid are different features, step 2015 may be carried out to re-cluster the features based on the new centroid.

In 2030, the Euclidean distance between any feature and the centroid may be calculated for each cluster. Then a determination may be made according to the obtained Euclidean distances (which may be expressed with a vector d) in 2035. $d_{MAX}$ may represent a predetermined threshold indicating the maximum acceptable Euclidean distance between a feature and a centroid. $c_{MAX}$ may be a predetermined threshold indicating the maximum number of clusters that is permitted. Function Max may return the maximum value of the inputted vector. If $Max(d) \geq d_{MAX}$ and $c \leq c_{MAX}$, the number of the current clusters(c) may be added with one and step 2010 may be re-carried out to divide the features into more clusters. Alternatively, step 2040 may be carried out to output the centroid and the grouped features of each cluster.

FIG. 21 illustrates an exemplary structure of a neural network according to some embodiments of the present disclosure. Neural network 2100 may be used by neural network unit 330 for face identification and/or face recognition. It may be noticed that neural network 2100 is merely one aspect of the present disclosure and will not limit the scope of the present invention.

Neural network 2100 may include a feature extraction part 2110 and an ONN part 2130. Feature extraction part 2110 may include one or more CNNs including, for example, CNN 2111, CNN 2113, and CNN 2115. The CNNs may have similar or different structures. Each CNN may include a plurality of convolutional layers and optionally a plurality of pooling layers. The feature layers of the CNNs may be feature layer 2121, feature layer 2123, and feature layer 2125, respectively. ONN 2130 may include two layers, for example, layer 2131 and 2132. Layer 2131 may fully connect to feature layer 2121, feature layer 2123, and feature layer 2125. Neural network 2100 may be trained by a backpropagation algorithm and optionally tuned as illustrated in FIGS. 19 and 20.

An image to be processed by neural network 2100 may be preprocessed by image preprocessing unit 510 to generate image 2150, or be directly used as image 2150. For illustration purposes, image 2150 may represent a human face and have a predetermined size (e.g., predetermined height and width). Merely by way of example, image 2150 may have a size of 32*32 in a particular embodiment.

In some embodiments, image 2150 may be processed by feature extraction unit 530 to generate three preliminary feature vectors: a color-based feature vector 2151 may be generated by color-based feature generating sub-unit 531, a texture-based feature vector 2153 may be generated by texture-based feature generating sub-unit 533, and a gradient-based feature vector 2155 may be generated by gradient-based feature generating sub-unit 534.

In some embodiments, color-based feature vector 2151 may be an RGB vector or a greyscale vector. It may be noticed that other kinds of color-based feature vectors may also be used in the present disclosure.

In some embodiments, texture-based feature vector 2153 may be generated by extracting LTP feature or a variant of LTP feature. It may be noticed that other kinds of texture-based feature vectors (e.g., LBP, LDP, etc.) may also be used.

In some embodiments, gradient-based feature vector 2155 may be generated by extracting HOG feature or a variant of HOG feature. It may be noticed that other kinds of gradient/orientation-based feature vectors may also be used.

In some embodiments, the three preliminary feature vectors may be processed by the three CNNs separately. For example, CNN 2111 may process color-based feature vector 2151, CNN 2113 may process texture-based feature vector 2153, CNN 2115 may process gradient-based feature vector 2155. The kernel of the first layer of each CNN may extend through the full depth of the corresponding preliminary feature vector. Three deep feature vectors may be obtained at feature layers 2121, 2123, and 2125. The deep feature vectors may be serially fused and processed by layer 2131 to generate an ultimate feature vector. Color-based feature vector 2151, texture-based feature vector 2153, and gradient-based feature vector 2155 may have the same size or different sizes.

Layer 2135 may generate the output of neural network 2100. Layer 2135 may be a classifier layer or a loss layer. For example, layer 2135 may be a loss layer, a sigmoid layer, a softmax layer, a softmax-loss layer, or the like, or any combination thereof. In some embodiments, layer 2135 may generate a classify code which may be used to classify the face owner into different categories. The categories may be set based on facial features (e.g., race, gender, attractiveness, possible health state, possible age, expression, etc.). In some embodiments, layer 2135 may generate a matching score by calculating the difference between the ultimate feature vectors generated form a sample image and a standard image. The matching score may be used to determine if the faces included in the sample image and the standard image belong to the same person.

The classify code and/or matching score may be used as the supervisory output to train neural network 2100 with a backpropagation algorithm. During the training, the error $\delta_C$ backpropagated at the feature layers of CNNs may be divided into three portions including, for example, $\delta_{color}$, $\delta_{texture}$, and $\delta_{gradient}$, based on the number of neural units of feature layers 2121, 2123, and 2125. $\delta_{color}$, $\delta_{texture}$, and $\delta_{gradient}$ may be backpropagated along CNN 2111, CNN 2113, and CNN 2115 respectively to update the parameters (e.g., weights and biases).

Optionally, a tuning may be performed on layer 2131 according to the process described in connection with FIGS. 19 and 20. Additionally or alternatively, other kinds of tuning techniques may be used. In some embodiments, tuning may not be required.

In some embodiments, color-based feature vector 2151, texture-based feature vector 2153, and gradient-based feature vector 2155 may be stacked to form a combined preliminary feature vector. Feature extraction part 2110 may be a single CNN (may be referred to as sCNN in this section). The combined preliminary feature vector may be processed by the sCNN. The kernel of the first layer of the sCNN may extend through the full depth of the combined preliminary feature vector. A deep feature vector may be obtained at the feature layer of the sCNN. The feature layer may fully connect to layer 2131, and the deep feature vector may be further processed to generate an ultimate feature vector at layer 2131. During the training of neural network 2100, the backpropagation algorithm may be carried out without dividing the error $\delta_C$ backpropagated at the feature layer of the sCNN.

In some embodiments, one or more additional preliminary feature vectors (e.g., texture-based feature vectors, gradient-based feature vectors, normalization-based feature vectors, combined preliminary feature vectors, and any other feature vectors mentioned or not mentioned in the present disclosure) may be generated by feature extraction unit 530 from image 2150. Feature extraction part 2110 may include additional CNN(s) to process the additional preliminary feature(s). The additional CNN(s) may also fully connect to layer 2131.

In some embodiments, one or more additional preliminary feature vector(s) may be generated and stacked with the preliminary feature vectors described above to form a combined preliminary feature vectors which may be processed by the sCNN.

In some embodiments, one or more additional layers may be added between layer 2131 and layer 2135. The ultimate feature vector may be obtained from the layer connecting to layer 2135. The tuning technique described in connection with FIGS. 19 and 20 may be performed on this layer.

In some embodiments, image 2150 may be one of the sub-images generated from the image to be processed. Other sub-images may be processed by additional neural network(s) with a structure similar to neural network 2100. The last layers (e.g., layers 2135) of the neural networks may be connected by additional layer(s). The matching scores or classify codes generated by the neural networks may be fused, and a final matching score or classify code may be generated therefrom. The final matching score or classify code may be the minimum, maximum, mean, sum, or other processing results of the matching scores or classify codes generated by neural networks.

In some embodiments, after the training, image 2150 may be processed by neural network 2100 to generate one or more corresponding ultimate feature vectors at layer 2131 as the output. The ultimate feature vectors may be used for, for example, face recognition, face memorization (by an artificial intelligent device), etc.

FIG. 22 illustrates an exemplary structure of a neural network according to some embodiments of the present disclosure. Neural network 2200 may be used by neural network unit 330 to analyze the pose of a human face included in an image. The pose of a face may be represented using one or more parameters, such as "pitch," "spin," and "yaw." As shown in FIG. 22, Pitch may be a parameter representing the angle of the face rotate along the z axis. Spin may be a parameter represent the angle of the face rotate along the y axis. Yaw may be a parameter represent the angle of the face rotate along the x axis. In some embodiment, the parameter Pitch and Yaw may be obtained through neural network 2200.

Neural network 2200 may include a feature extraction part 2210 and an ONN part 2230. Feature extraction part 2210 may include multiple CNNs, for example, CNN 2211, CNN 2213, and CNN 2215. The CNNs may or may not have different structures. Each CNN may include one or more convolutional layers and/or pooling layers. The CNNs may include one or more feature layers, such as feature layers 2221, 2223, and 2225. ONN 2130 may include layer 2231. Layer 2231 may fully connect to feature layers 2221, 2223, and 2225. Neural network 2200 may be trained using a backpropagation algorithm. In some embodiments, neural network 220 may be tuned as illustrated in FIGS. 19 and 20.

An image to be processed by neural network 2200 may be preprocessed by image preprocessing unit 510 to generate an image 2250. During the preprocessing, the eyes may be recognized and/or located. The parameter Spin may be obtained by measuring the angle between the line defined by the eyes and the horizontal line during the eye locating procedure. After the eyes are located, the image to be processed or a temporary image generated therefrom may be scaled based on the distance between the eyes and/or the size of the face. The image may be cropped to a predetermined size based on the location of the eyes to obtain image 2250 or a temporary image which may be used to generate image 2250. Image 2250 may have a predetermined size (e.g., a predetermined height and width). For example, image 2250 may have a size of 32*32 in a particular embodiment.

In some embodiments, image 2250 may be processed by feature extraction unit 530 to generate one or more preliminary feature vectors, such as greyscale vector 2251, texture-based feature vector 2253, and texture-based feature vector 2255.

In some embodiments, image 2250 may be processed by feature extraction unit 530 to generate three preliminary feature vectors including a color-based feature vector 2251 generated by color-based feature generating sub-unit 531, a first texture-based feature vector 2253 generated by texture-based feature generating sub-unit 533, and a second texture-based feature vector 2255 generated by texture-based feature generating sub-unit 533.

In some embodiments, color-based feature vector 2251 may be an RGB vector, a greyscale vector, and/or any other color-based feature vector.

In some embodiments, first texture-based feature vector 2253 may be generated by extracting LBP feature or a variant of LBP feature. It may be noticed that other kinds of texture-based feature vectors may also be used.

In some embodiments, second texture-based feature vector 2255 may be generated by extracting LDP feature or a variant of LDP feature. It may be noticed that other kinds of gradient/orientation-based feature vectors may also be used.

It may be noticed that first texture-based feature vector 2253 and second texture-based feature vector 2255 may be generated by extracting variants of the same kind of feature. For example, first texture-based feature vector 2253 may be generated by extracting a normal LBP feature, and second texture-based feature vector 2255 may be generated by extracting a LBP feature.

It may also be noticed that first texture-based feature vector 2253 and second texture-based feature vector 2255 may be generated by extracting the same kind of feature with one or more different procedures. For example, first texture-based feature vector 2253 may be generated by extracting LDP feature using a set of Kirsch masks, and second texture-based feature vector 2255 may be generated by extracting LDP feature using a different set of Kirsch masks.

In some embodiments, the three preliminary feature vectors may be processed by the three CNNs separately. For example, CNN 2211 may process color-based feature vector 2251, CNN 2213 may process first texture-based feature vector 2253, CNN 2215 may process first texture-based feature vector 2255. Three deep feature vectors may be obtained at feature layers 2221, 2223, and 2225. The deep feature vectors may be serially fused and processed by layer 2231. Greyscale vector 2251, texture-based feature vector 2253, and texture-based feature vector 2255 may have the same size or different sizes.

Layer 2231 may have two neural units which may fully connect to feature layer 2221. The two neural units may have a tanh activation function or any other suitable activation function. The output of the two neural units may include two values, Y and P, representing yaw and pitch respectively. In some embodiments, Y and P may fall within a range of (−1,1) (e.g., the corresponding activation function is tanh).

In some embodiments, Y and P may be expressed as:

$$Y = \text{Yaw}/\text{Yaw}_{MAX} \quad (32)$$

$$P = \text{Pitch}/\text{Pitch}_{MAX} \quad (33)$$

In some embodiments, $\text{Yaw}_{MAX}$ and $\text{Pitch}_{MAX}$ may represent the maximum Yaw angle and Pitch angle at which imaging device 110 may still be able to recognize a human face and obtain an image of it. In some embodiments, $\text{Yaw}_{MAX}$ and $\text{Pitch}_{MAX}$ may be the maximum Yaw angle and Pitch angle at which neural network 2210 may still be able to analyze the pose of human face with an acceptable accuracy (e.g., ±1%, ±5%, ±10%, ±20%, etc.).

For example, the value of $\text{Yaw}_{MAX}$ may fall within a range of (0°, 120°], the value of $\text{Pitch}_{MAX}$ may fall within a range of (0°, 90°]. In a more particular example, the value of $\text{Yaw}_{MAX}$ may fall within a range of [70°, 110°] and the value of $\text{Pitch}_{MAX}$ may fall within a range of [40°, 80°]. In some embodiments, $\text{Yaw}_{MAX}$ may be 90° or any other suitable value, $\text{Pitch}_{MAX}$ may be 60° or any other suitable value.

Y and P may be used as the supervisory output to train neural network 2200 with a backpropagation algorithm. During the training, the error $\delta_C$ backpropagated at the feature layers of CNNs may be divided into three portions, $\delta_{color}$, $\delta_{texture\ \#1}$, and $\delta_{texture\ \#2}$, based on the number of neural units of feature layers 2221, 2223, and 2225. $\delta_{color}$, $\delta_{texture\ \#1}$, and $\delta_{texture\ \#2}$ may be backpropagated along CNN 2211, CNN 2213, and CNN 2215 respectively to update the parameters (e.g., weights and bias).

After training, a sample image may be processed by neural network 2200. Two values, Y' and P', may be generated by neural network 2200. In some embodiments, the parameter Yaw and Pitch may be obtained by the following equations expressed as:

$$\text{Yaw} = Y' \cdot \text{Yaw}_{MAX}, \quad (34)$$

$$\text{Pitch} = P' \cdot \text{Pitch}_{MAX}, \quad (35)$$

In some embodiments, color-based feature vector 2251, first texture-based feature vector 2253, and second texture-based feature vector 2255 may be stacked to form a combined preliminary feature vector. Feature extraction part 2210 may be a single CNN (may be referred to as sCNN in this section). The combined preliminary feature vector may be processed by the sCNN. The kernel of the first layer of the sCNN may extend through the full depth of the combined preliminary feature vector. A deep feature vector may be obtained at the feature layer of the sCNN. The feature layer may fully connect to layer 2231, and the deep feature vector may be further processed to generate an ultimate feature vector at layer 2231. During the training of neural network 2200, the backpropagation algorithm may be carried out without dividing the error $\delta_C$ backpropagated at the feature layer of the sCNN.

In some embodiments, one or more additional preliminary feature vectors (e.g., normalization-based feature vectors, texture-based feature vectors, gradient-based feature vectors, combined preliminary feature vectors, and any other feature vectors mentioned or not mentioned in the present disclosure may be generated by feature extraction unit 530 from image 2250. Feature extraction part 2210 may include additional CNN(s) to process the additional preliminary feature(s). The additional CNN(s) may also fully connect to layer 2231.

In some embodiments, one or more additional preliminary feature vector(s) may be generated and stacked with the preliminary feature vectors described above to form a combined preliminary feature vectors which may be processed by the sCNN.

In some embodiments, one or more additional layers may be added between layer 2231 and the feature layer(s) of feature extracting part 2210. The additional layers may fully connect to the feature layer(s) of extracting part 2210 and/or layer 2231.

FIG. 23 illustrates an exemplary structure of a neural network according to some embodiments of the present disclosure. Neural network 2300 may be used by neural network unit 330 for face identification and/or face recognition under insufficient illumination conditions. Neural network 2300 may generate deep feature vectors from a standard image and a sample image. Neural network 2300 may further generate a matching score based on the obtained feature vectors. The matching score may determine if the face owner of the sample image is the face owner of the standard image. It may be noticed that neural network 2100 is merely one aspect of the present disclosure and will not limit the scope of the present invention.

Neural network 2300 may include a feature extraction part 2310 and an ONN part 2330. Feature extraction part 2310 may include a plurality of CNNs. For illustration purposes, four CNNs may be discussed, for example, CNN 2311, CNN 2312, CNN 2313, and CNN 2314. The CNNs may have similar or different structures. Each CNN may include a plurality of convolutional layers and optionally a plurality of pooling layers. The feature layers of the CNNs may include feature layers 2321, 2322, 2323, and 2324. ONN 2330 may include a plurality of layers, for example, layers 2331, 2332, 2333, 2334, 2341, 2342, and 2343. The layers may be grouped into different levels. For example, layers 2331, 2332, 2333, and 2334 may be grouped as level 1 (L1) layers. Layer 2341 and layer 2342 may be grouped as level 2 (L2) layers. Layer 2334 alone may serve as level 3 (L3) layer. Neural network 2300 may be trained by backpropagation algorithm and optionally tuned as illustrated in FIGS. 19 and 20.

An image, for example, a sample image or a standard image, may be preprocessed by image preprocessing unit 510 to generate image 2350 or be directly used as image 2350. Image 2350 may focus on a region of interest, for example, a human face. A predetermined number of sub-images may be generated from image 2350 by sub-image generating unit 520. The sub-images may be different parts of image 2350. The sub-images may have predetermined sizes and focus on different parts of the face. For illustration purposes, two sub-images may be illustrated in FIG. 23, for example, sub-image 2360 and sub-image 2370.

Sub-image 2360 and sub-image 2370 may be processed by feature extraction unit 530 to generate two preliminary feature vectors for each sub-image: color-based feature vectors 2361 and 2371 may be generated by color-based feature generating sub-unit 531, normalization-based feature vector 2363 and 2373 may be generated by normalization-based feature generating sub-unit 532. Color-based feature vectors 2361 and 2371 may be generated by performing the same process, similar processes, or substantially different processes. Normalization-based feature vector 2363 and 2373 may be generated by performing the same process, similar processes, or substantially different processes.

In a more detailed embodiment, color-based feature vector 2361 may be a greyscale vector. It may be noticed that other kinds of color-based feature vectors (e.g., RGB vector) may also be used.

In a more detailed embodiment, normalization-based feature vector 2363 may be generated by performing illumination normalization procedures provided in the description of normalization-based feature generating sub-unit 532 in the present disclosure. It may be noticed that other kinds of normalization techniques (color normalization techniques, illumination normalization techniques, etc.) may also be used.

The obtained preliminary feature vectors may be processed by the same number of CNNs separately. For example, CNN 2311 may process color-based feature vector 2361, CNN 2312 may process normalization-based feature vector 2363, CNN 2313 may process color-based feature vector 2371, CNN 2314 may process normalization-based feature vector 2373. Four deep feature vectors may be obtained at feature layers 2121, 2122, 2123, and 2124.

An L1 layer may generate a preliminary matching score for a CNN connecting to this L1 layer. The preliminary matching score may be referred to as an L1 score. The number of L1 layers may be the same as the number of CNNs. An L1 layer may fully connect to a feature layer of CNN. Take L1 layer 2331 as an example, feature layer 2321 may generate a standard deep feature vector based on a sub-image of a standard image, and a sample deep feature vector based on a sub-image of a sample image. An L1 score of color-based feature vectors 2361 of the standard image and the sample image may be generated by processing the two corresponding deep feature vectors at L1 layer 2331. L1 Layers 2332, 2333, and 2334 may each generate an L1 score for preliminary feature vectors 2363, 2371, and 2373, respectively.

A number of n sub-images may be generated based on image 2350. Image 2350 may be generated from a standard image or a sample image. A number of n CNNs (e.g., CNN 2311 and CNN 2313) may process n color-based feature vectors (e.g., color-based feature vector 2361 and 2371) generated from the n sub-images. For the ith (1≤i≤n) sub-image, the ith CNN may generate a deep feature vector $FC_i$ when image 2350 is generated from a sample image and a deep feature vector $FC_i'$ when image 2350 is generated from a standard image. At the corresponding L1 layer (e.g., L1 layer 2331 and L1 layer 2333), an L1 score corresponding to the color-based feature vector of that ith sub-image $SC_i$ may be generated. In some embodiments, $SC_i$ may be obtained by equation 35, which may be expressed by:

$$SC_i = \frac{FC_i \cdot FC_i'}{\|FC_i\|\|FC_i'\|}, \qquad (36)$$

where "$\|\ \|$" represent the Euclidean norm operator. Besides equation 35, other kinds of equations describing the difference between $FC_i$ and $FC_i'$ may also be used.

Another number of n CNNs (e.g., CNN 2312 and CNN 2314) may process n normalization-based feature vectors (e.g., normalization-based feature vectors 2363 and 2373) generated from the sub-images. For the ith sub-image, the ith CNN may generate a deep feature vector $FN_i$ when image 2350 is generated from a sample image and a deep feature vector $FN_i'$ when image 2350 is generated from a standard image. At the corresponding L1 layer (e.g., L1 layer 2332 and L1 layer 2334), an L1 score corresponding to the normalization-based feature vector of that ith sub-image $SN_i$ may be generated. In some embodiments, $SN_i$ may be obtained by equation 36, which may be expressed by:

$$SN_i = \frac{FN_i \cdot FN_i'}{\|FN_i\|\|FN_i'\|}, \qquad (37)$$

Besides equation 36, other kinds of equations describing the difference between $FN_i$ and $FN_i'$ may also be used.

The obtained L1 scores of a sub-image may be processed at the L2 layers (e.g., L2 layer 2341 and L2 layer 2342) to generate a plurality of secondary matching score. The secondary matching score may also be referred to as L2 score. The number of L2 layers may be the same as the number of sub-images. Take L2 layer 2341 as an example, an L1 score SG corresponding to the color-based feature vector may be obtained at L1 layer 2331. An L1 score ST corresponding to the normalization-based feature vector may be obtained at L1 layer 2332. An L2 score for sub-image 2360 may be obtained be processing SC and SN at L2 layer 2341. L2 layer 2342 may also generate an L2 score for sub-image 2370.

In some embodiments, for the ith sub-image, an L1 score $SC_i$, and an L1 score $SN_i$ may be obtained by corresponding L1 layers. At the L2 layer connecting to the L1 layers, an L2 score of the ith sub-image SS may be obtained by equation 37, which may be expressed as:

$$SS_i = f(SC_i, SN_i), \qquad (38)$$

Function $f$ may take the form of non-linear functions, linear functions, step functions, or the like, or any combination thereof. In some embodiments, function $f$ may return the maximum value or weighted maximum value of its inputs. For example, function $f$ may be a Maxout function. In some embodiments, function $f$ may return the average value or weighted average value of its inputs.

The obtained L2 scores of a plurality of sub-images may be processed at an L3 layer (e.g., L3 layer 2343). L3 layer may generate a final matching score based on the obtained L2 scores. The final matching score may be referred to as L3 score. In some embodiments, L3 score S for image 2350 may be obtained by equation 38, which may be expressed as:

$$S = g(SS), \qquad (39)$$

where SS may represent the plurality of obtained L2 scores. Function g may take the form of non-linear functions, linear functions, step functions, or the like, or any combination thereof. In some embodiments, function g may return the maximum value or weighted maximum value of its inputs. In some embodiments, function g may return the average value or weighted average value of its inputs.

Neural network 2300 may be trained with a backpropagation algorithm. In some embodiments, obtained L1 scores may be used as the supervisory output to train each CNN separately and the rest part of neural network 2300 may not have to be trained.

In some embodiments, obtained L2 scores may be used as the supervisory output to train each group of CNNs being configured to process the input vectors generated from the corresponding sub-image. For the ith sub-image (e.g., sub-image 2360), during the training, the error $\delta_{Ci}$ (e.g., $\delta_{C1}$) backpropagated at the L1 layers may be divided into two portions, $\delta_{color\ \#i}$ (e.g., $\delta_{color\ \#1}$), and $\delta_{norm\ \#i}$ (e.g., $\delta_{norm\ \#1}$), based on the number of neural units of the corresponding L1 layers (e.g., L1 layers 2331 and 2332). $\delta_{color\ \#i}$ and $\delta_{norm\ \#i}$ may be backpropagated along the corresponding CNNs (e.g., CNNs 2311 and 2312) respectively to update the parameters (e.g., weights and biases).

In some embodiments, obtained L3 score may be used as the supervisory output to train all the CNNs altogether. During the training, the error $\delta_{CB}$ backpropagated at the L2 layers may be divided into two (or other number based on the number of sub-images or L2 layers) secondary portions, $\delta_{C1}$ and $\delta_{C2}$ based on the number of neural units of the corresponding L2 layers (e.g., L2 layers 2341 and 2342) or other factors. $\delta_{C1}$ and $\delta_{C2}$ may be backpropagated to the corresponding L1 layers. An error obtained based on each portion of $\delta_{CB}$ at the corresponding L1 layers may be further divided according to the process of L2-score-supervised backpropagation provided previously.

Optionally, a tuning may be performed on feature layers 2321, 2322, 2333, and/or 2334 according to the process described in connection with FIGS. 19 and 20. Additionally or alternatively, other kinds of tuning techniques may be used. In some embodiments, tuning may not be required.

In some embodiments, a combined preliminary feature vector may be generated for each sub-image by stacking the greyscale vector and the normalization-based feature vector generated therefrom (e.g., color-based feature vector 2361 and normalization-based feature vector 2363 for sub-image 2360). One CNN (which may be referred to as a cCNN) may be configured to process each combined preliminary feature vector. The kernel of the first layer of the cCNNs may extend through the full depth of the corresponding combined preliminary feature vectors. A deep feature vector may be obtained at the feature layer of each cCNN. The layers of ONN 2330 may be grouped into two levels (e.g., L1 level and L2 level). Each cCNN may be configured to connect to one L1 layer, and an L2 layer may be configured to connect to the L1 layers. A preliminary matching score may be generated for each sub-image at the L1 layers. A final matching score may be generated by processing the obtained preliminary matching scores at the L2 layer.

In some embodiments, one or more additional preliminary feature vectors (e.g., texture-based feature vectors, gradient-based feature vectors, combined preliminary feature vectors, and any other preliminary feature vectors mentioned or not mentioned in the present disclosure) may be generated for each sub-image by feature extraction unit 530. Feature extraction part 2310 may include additional CNN(s) to process the additional preliminary feature(s), ONN part 2330 may include additional L1 layer(s) to generate the corresponding L1 score(s) for the additional preliminary feature(s), and more L1 scores may be processed to generate one L2 score.

In some embodiments, one or more additional preliminary feature vector(s) may be generated for each sub-image and be stacked with the preliminary feature vectors described above to form a plurality of combined preliminary feature vectors, which may be processed by the cCNNs.

In some embodiments, one or more preliminary feature vectors (e.g., texture-based feature vectors, gradient-based feature vectors, or any other feature vectors mentioned or not mentioned in the present disclosure) may be generated based on the normalization-based feature vector. The generated feature vectors may be used to replace the normalization-based feature vector, or may serve as one or more additional preliminary feature vectors described previously to be processed by the neural network.

In some embodiments, one or more additional layers may be added between one or more feature layers of CNN and one or more corresponding L1 layers. In some embodiments, The L1 layers may be viewed as a single L1 layer which may partially connect to the feature layers of CNNs. In some embodiments, The L2 layers may be viewed as a single L2 layer which may partially connect to the L1 layers or the single L1 layer described above.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

In addition, part of the present disclosure may be applied as a computer program product, e.g., a computer program instruction, which, when being executed by a computer, may invoke or provide a method and/or technical solution according to the present disclosure through operation of the computer. The program instruction that invokes a method or a procedure of the present disclosure may be stored in a fixed or mobile recording medium, and/or transmitted through broadcast and/or a data flow in other signal carrier medium, and/or stored in a work memory running according to the program instruction in a computer device. Here, an embodiment according to the present disclosure includes an apparatus that includes a memory for storing computer program instructions and a processor for executing program instructions, wherein when being executed by the processor, the computer program instruction triggers the apparatus to carry out the methods and/or technical solutions according to various embodiments of the present disclosure.

To those skilled in the art, it is apparent that the present disclosure is not limited to the details of the above exemplary embodiments, and the present disclosure may be implemented in other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall within the meaning and scope of equivalent elements of the claims should be covered by the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

What is claimed is:

1. A method, comprising:
   obtaining a neural network comprising a first sub-neural network and a second sub-neural network, wherein the network layers contained in the first sub-neural network and the second sub-neural network are divided into a plurality of groups, at least one group of the plurality of groups corresponds to a region of interest, the region of interest is a sub-image of a target image, and the target image includes a standard image and a currently acquired image;
   generating a plurality of preliminary feature vectors based on the sub-image, the plurality of preliminary feature vectors comprising a color-based feature vector, and the plurality of preliminary feature vectors including standard preliminary feature vectors and currently acquired image preliminary feature vectors;
   obtaining at least one input feature vector based on the plurality of preliminary feature vectors;
   generating a plurality of deep feature vectors based on the at least one input feature vector using the network layers contained in the first sub-neural network in the at least one group, the plurality of deep feature vectors including standard deep feature vectors and currently acquired image deep feature vectors; and
   recognizing a human face based on the plurality of deep feature vectors by:
      generating a plurality of matching scores based on the standard deep feature vectors and the currently acquired image deep feature vectors using the network layers contained in the second sub-neural network in the at least one group; combining the plurality of matching scores to generate a final matching score; and
      recognizing the human face based on the final matching score.

2. The method of claim 1, wherein the recognizing a human face based on the plurality of deep feature vectors comprises:
   generating an output using the network layers contained in the second sub-neural network in the at least one group based on the plurality of deep feature vectors; and
   recognizing the human face based on the output.

3. The method of claim 2, wherein the recognizing a human face based on the plurality of deep feature vectors further comprises:
   determining a pose of the human face based on the output.

4. The method of claim 3, wherein the output comprises at least one posing parameter, and wherein the posing parameter comprises at least one of a yaw parameter or a pitch parameter.

5. The method of claim 2, wherein the generating an output using the second sub-neural network based on the plurality of deep feature vectors comprises:
   fusing the plurality of deep feature vectors to form an ultimate feature vector; and
   generating the output using the second sub-neural network based on the ultimate feature vector.

6. The method of claim 2, wherein the target image includes a first image and a second image, and the generating a plurality of preliminary feature vectors includes further:
   generating a plurality of first sub-images based on the first image;
   generating a plurality of first preliminary feature vectors based on at least one of the plurality of the first sub-images;
   generating a plurality of second sub-images based on the second image;
   generating a plurality of second preliminary feature vectors based on at least one of the plurality of second sub-images; and
   the obtaining at least one input feature vector based on the plurality of preliminary feature vectors includes:
      obtaining at least one first input feature vector based on the plurality of first preliminary feature vectors;
      obtaining at least one second input feature vector based on the plurality of the second preliminary feature vectors;
   the generating a plurality of deep feature vectors based on the at least one input feature vector includes:
      generating a first deep feature vector based on the at least one first input feature vector using the network layers contained in the first sub-neural network in the at least one group;
      generating a second deep feature vector based on the at least one second input feature vector through the network layers contained in the first sub-neural network in the at least one group; and
   the generating an output using the network layers contained in the second sub-neural network in the at least one group based on the one or more deep feature vectors includes:
      generating the output using the network layers contained in the second sub-neural network in the at least one group based on the first deep feature vector and the second deep feature vector.

7. The method of claim 6, wherein the generating the output using the network layers contained in the second sub-neural network in the at least one group based on the first deep feature vector and the second deep feature vector further comprises:
   generating a first intermediate associated with at least one of the plurality of second sub-images based on the first deep feature vector and the second deep feature vector;
   generating a second intermediate based on the first intermediates associated with the at least one of the second sub-images; and
   generating the output based on the second intermediate.

8. The method of claim 1, wherein the first sub-neural network includes one or more secondary sub-neural networks with convolutional network architecture, and wherein the one or more secondary sub-neural networks include a feature layer configured to generate the one or more deep feature vectors.

9. The method of claim 8, wherein the feature layer is fully connected to a layer within at least one of the one or more secondary sub-neural networks.

10. The method of claim 9, further comprising:
    training the neural network by performing a backpropagation operation, comprising:
       determining an error at the feature layer of the one or more secondary sub-neural networks;

dividing the error into a plurality of error portions, wherein the number of the error portions corresponds to the number of the one or more secondary sub-neural networks; and performing the backpropagation operation on the one or more secondary sub-neural networks based on the plurality of error portions.

11. The method of claim 10, further comprising:
dividing the error into the plurality of error portions based on the number of neural units of the feature layer of the one or more secondary sub-neural networks.

12. The method of claim 1, wherein the obtaining at least one input feature vector based on the plurality of preliminary feature vectors comprises:
using at least one of the plurality of preliminary feature vectors as the at least one input feature vector.

13. The method of claim 12, wherein the plurality of preliminary feature vectors includes at least one of a texture-based feature vector or a gradient-based feature vector.

14. The method of claim 1, wherein the obtaining at least one input feature vector based on the plurality of preliminary feature vectors further comprises:
generating a combined preliminary feature vector by stacking at least two of the plurality of preliminary feature vectors; and
using the combined preliminary feature vector as the at least one input feature vector.

15. The method of claim 14, wherein the plurality of preliminary feature vectors includes at least one of a first texture-based feature vector or a second texture-based feature vector.

16. The method of claim 1, wherein the generating a plurality of preliminary feature vectors includes:
generating a plurality of sub-images based on the target image, wherein the plurality of sub-images corresponds to a plurality of parts of the target image; and
generating the plurality of preliminary feature vectors based on at least one of the plurality of the sub-images.

17. The method of claim 1, further comprising:
training at least part of the neural network comprising the first sub-neural network and the second sub-neural network; and
tuning the at least part of the neural network.

18. The method of claim 17, wherein the tuning the at least part of the neural network further comprises:
obtaining a plurality of second features at a first feature layer of the first sub-neural network or a layer connecting to the feature layer;
obtaining a plurality of normalized features by normalizing the plurality of second features;
clustering the normalized features into at least one cluster, the cluster comprising a feature determined as a centroid; and
tuning the at least part of the neural network based on at least one centroid.

19. A system, comprising:
at least one non-transitory computer-readable storage medium configured to store data and instructions; and
at least one processor in communication with the at least one non-transitory computer-readable storage medium, wherein when executing the instructions, the at least one processor is directed to:
obtaining a neural network comprising a first sub-neural network and a second sub-neural network, wherein the network layers contained in the first sub-neural network and the second sub-neural network are divided into a plurality of groups, at least one group of the plurality of groups corresponds to a region of interest, the region of interest is a sub-image of a target image, and the target image includes a standard image and a currently acquired image;
generating a plurality of preliminary feature vectors based on the sub-image, the plurality of preliminary feature vectors comprising a color-based feature vector, and the plurality of preliminary feature vectors including standard preliminary feature vectors and currently acquired image preliminary feature vectors;
obtaining at least one input feature vector based on the plurality of preliminary feature vectors;
generating a plurality of deep feature vectors based on the at least one input feature vector using the network layers contained in the first sub-neural network in the at least one group, the plurality of deep feature vectors including standard deep feature vectors and currently acquired image deep feature vectors; and
recognizing a human face based on the plurality of deep feature vectors by:
generating a plurality of matching scores based on the standard deep feature vectors and the currently acquired image deep feature vectors using the network layers contained in the second sub-neural network in the at least one group; combining the plurality of matching scores to generate a final matching score; and
recognizing the human face based on the final matching score.

20. A non-transitory computer readable medium, comprising executable instructions that, when executed by at least one processor, direct the at least one processor to perform a method, the method comprising:
obtaining a neural network comprising a first sub-neural network and a second sub-neural network, wherein the network layers contained in the first sub-neural network and the second sub-neural network are divided into a plurality of groups, at least one group of the plurality of groups corresponds to a region of interest, the region of interest is a sub-image of a target image, and the target image includes a standard image and a currently acquired image;
generating a plurality of preliminary feature vectors based on the sub-image, the plurality of preliminary feature vectors comprising a color-based feature vector, and the plurality of preliminary feature vectors including standard preliminary feature vectors and currently acquired image preliminary feature vectors;
obtaining at least one input feature vector based on the plurality of preliminary feature vectors;
generating a plurality of deep feature vectors based on the at least one input feature vector using the network layers contained in the first sub-neural network in the at least one group, the plurality of deep feature vectors including standard deep feature vectors and currently acquired image deep feature vectors; and
recognizing a human face based on the plurality of deep feature vectors by:
generating a plurality of matching scores based on the standard deep feature vectors and the currently acquired image deep feature vectors using the network layers contained in the second sub-neural network in the at least one group; combining the plurality of matching scores to generate a final matching score; and recognizing the human face based on the final matching score.

\* \* \* \* \*